(12) United States Patent
Matsuzaki et al.

(10) Patent No.: US 9,776,615 B2
(45) Date of Patent: Oct. 3, 2017

(54) VEHICLE

(71) Applicant: Kubota Corporation, Osaka-shi (JP)

(72) Inventors: Yushi Matsuzaki, Sakai (JP);
Yoshitomo Fujimoto, Sakai (JP);
Michita Kono, Sakai (JP); Shigeki Hayashi, Sakai (JP); Atsushi Shinkai, Sakai (JP); Keishiro Nishi, Sakai (JP);
Hisao Mukai, Sakai (JP)

(73) Assignee: Kubota Corporation, Osaka (JP)

(*) Notice: Subject to any disclaimer, the term of this patent is extended or adjusted under 35 U.S.C. 154(b) by 0 days.

(21) Appl. No.: 14/342,854

(22) PCT Filed: Mar. 14, 2013

(86) PCT No.: PCT/JP2013/057227
§ 371 (c)(1),
(2) Date: Mar. 5, 2014

(87) PCT Pub. No.: WO2014/045613
PCT Pub. Date: Mar. 27, 2014

(65) Prior Publication Data
US 2016/0046278 A1 Feb. 18, 2016

(30) Foreign Application Priority Data

Sep. 24, 2012 (JP) .................. 2012-210087
Sep. 24, 2012 (JP) .................. 2012-210088
(Continued)

(51) Int. Cl.
*B60K 25/06* (2006.01)
*B60K 6/547* (2007.10)
(Continued)

(52) U.S. Cl.
CPC ............... *B60W 20/10* (2013.01); *B60K 6/12* (2013.01); *B60K 6/485* (2013.01); *B60K 6/547* (2013.01);
(Continued)

(58) Field of Classification Search
CPC ...... B60W 20/10; B60W 10/30; B60W 10/08; B60W 10/11; B60W 2510/06;
(Continued)

(56) References Cited

U.S. PATENT DOCUMENTS 7,173,396 B2 * 2/2007 Gunji .................. B60K 6/485
320/132
7,549,945 B2 6/2009 Shibata et al.
(Continued)

FOREIGN PATENT DOCUMENTS

EP 2479078 A2 7/2012
JP 2102835 A 4/1990
(Continued)

OTHER PUBLICATIONS

Wikipedia article Common Rail, printed Feb. 3, 2016.*

*Primary Examiner* — Redhwan k Mawari
*Assistant Examiner* — Alan D Hutchinson
(74) *Attorney, Agent, or Firm* — The Webb Law Firm

(57) ABSTRACT

Disclosed is a hybrid work vehicle capable of smooth work travel using a work device with a low output internal combustion engine, while avoiding battery exhaustion. The vehicle includes an internal combustion engine that supplies drive power to a travel device and a work device via power transmission means, a motor generator that is driven by a battery, a load information generation part that generates load information representing a sudden increase in rotational load, an assist characteristic determination part that determines motor assist characteristics defining an assist amount
(Continued)

and an assist time period of assist control based on load information, and a motor control unit that controls the motor generator based on the motor assist characteristics.

6 Claims, 34 Drawing Sheets

(30) Foreign Application Priority Data

Sep. 24, 2012 (JP) ................................ 2012-210089
Sep. 27, 2012 (JP) ................................ 2012-215235

(51) Int. Cl.
| | |
|---|---|
| B60W 10/08 | (2006.01) |
| B60W 10/11 | (2012.01) |
| B60W 10/30 | (2006.01) |
| B60W 20/00 | (2016.01) |
| B60W 20/10 | (2016.01) |
| B60K 6/485 | (2007.10) |
| B60L 11/14 | (2006.01) |
| B60W 10/06 | (2006.01) |
| B60W 10/103 | (2012.01) |
| B60W 30/192 | (2012.01) |
| B60L 11/18 | (2006.01) |
| B60L 15/20 | (2006.01) |
| B60W 20/19 | (2016.01) |
| B60K 6/12 | (2006.01) |
| B60W 10/10 | (2012.01) |
| B60W 30/18 | (2012.01) |
| F02D 29/02 | (2006.01) |
| B60K 17/28 | (2006.01) |

(52) U.S. Cl.
CPC .............. *B60K 25/06* (2013.01); *B60L 11/14* (2013.01); *B60L 11/1862* (2013.01); *B60L 15/2054* (2013.01); *B60W 10/06* (2013.01); *B60W 10/08* (2013.01); *B60W 10/10* (2013.01); *B60W 10/103* (2013.01); *B60W 10/11* (2013.01); *B60W 10/30* (2013.01); *B60W 20/19* (2016.01); *B60W 30/18027* (2013.01); *B60W 30/192* (2013.01); *B60K 17/28* (2013.01); *B60L 2200/40* (2013.01); *B60L 2240/421* (2013.01); *B60L 2240/423* (2013.01); *B60L 2240/441* (2013.01); *B60L 2240/443* (2013.01); *B60L 2240/547* (2013.01); *B60L 2240/549* (2013.01); *B60L 2250/12* (2013.01); *B60L 2250/26* (2013.01); *B60W 2510/06* (2013.01); *B60W 2710/08* (2013.01); *B60W 2710/10* (2013.01); *B60W 2710/30* (2013.01); *B60Y 2200/221* (2013.01); *F02D 29/02* (2013.01); *Y02T 10/6226* (2013.01); *Y02T 10/6286* (2013.01); *Y02T 10/645* (2013.01); *Y02T 10/70* (2013.01); *Y02T 10/7005* (2013.01); *Y02T 10/705* (2013.01); *Y02T 10/7044* (2013.01); *Y02T 10/7077* (2013.01); *Y02T 10/72* (2013.01); *Y02T 10/7275* (2013.01); *Y10S 903/919* (2013.01); *Y10S 903/93* (2013.01)

(58) Field of Classification Search
CPC ......... B60W 2710/10; B60W 2710/30; B60W 2710/08; B60K 6/485; B60K 6/547; Y10S 903/93; Y10S 903/919
See application file for complete search history.

(56) References Cited

U.S. PATENT DOCUMENTS

| | | | | |
|---|---|---|---|---|
| 2007/0254764 | A1* | 11/2007 | Shibata ................. | B60K 6/365 475/117 |
| 2008/0196952 | A1* | 8/2008 | Soliman ................. | B60K 6/48 180/65.25 |
| 2008/0243324 | A1 | 10/2008 | Harris | |
| 2010/0173745 | A1 | 7/2010 | Hase et al. | |
| 2010/0174429 | A1 | 7/2010 | Hase et al. | |
| 2010/0219007 | A1 | 9/2010 | Dalum et al. | |
| 2011/0077810 | A1* | 3/2011 | Katou ................. | B60W 10/108 701/22 |
| 2011/0174559 | A1 | 7/2011 | Saito et al. | |
| 2012/0191307 | A1* | 7/2012 | Matsuzaki ............ | B60W 10/06 701/51 |
| 2012/0248922 | A1 | 10/2012 | Imazawa et al. | |

FOREIGN PATENT DOCUMENTS

| | | |
|---|---|---|
| JP | 4258505 A | 9/1992 |
| JP | 4325736 A | 11/1992 |
| JP | 5338474 A | 12/1993 |
| JP | 2749733 B2 | 2/1998 |
| JP | 200097056 A | 4/2000 |
| JP | 2002252904 A | 9/2002 |
| JP | 200646576 A | 2/2006 |
| JP | 201173573 A | 4/2011 |
| JP | 2011194985 A | 10/2011 |
| JP | 201291572 A | 5/2012 |
| JP | 2012162248 A | 8/2012 |
| JP | 2012210087 A | 10/2012 |
| JP | 2012210088 A | 10/2012 |
| JP | 2012210089 A | 10/2012 |
| JP | 2012215235 A | 11/2012 |
| WO | 2009109825 A1 | 9/2009 |

* cited by examiner

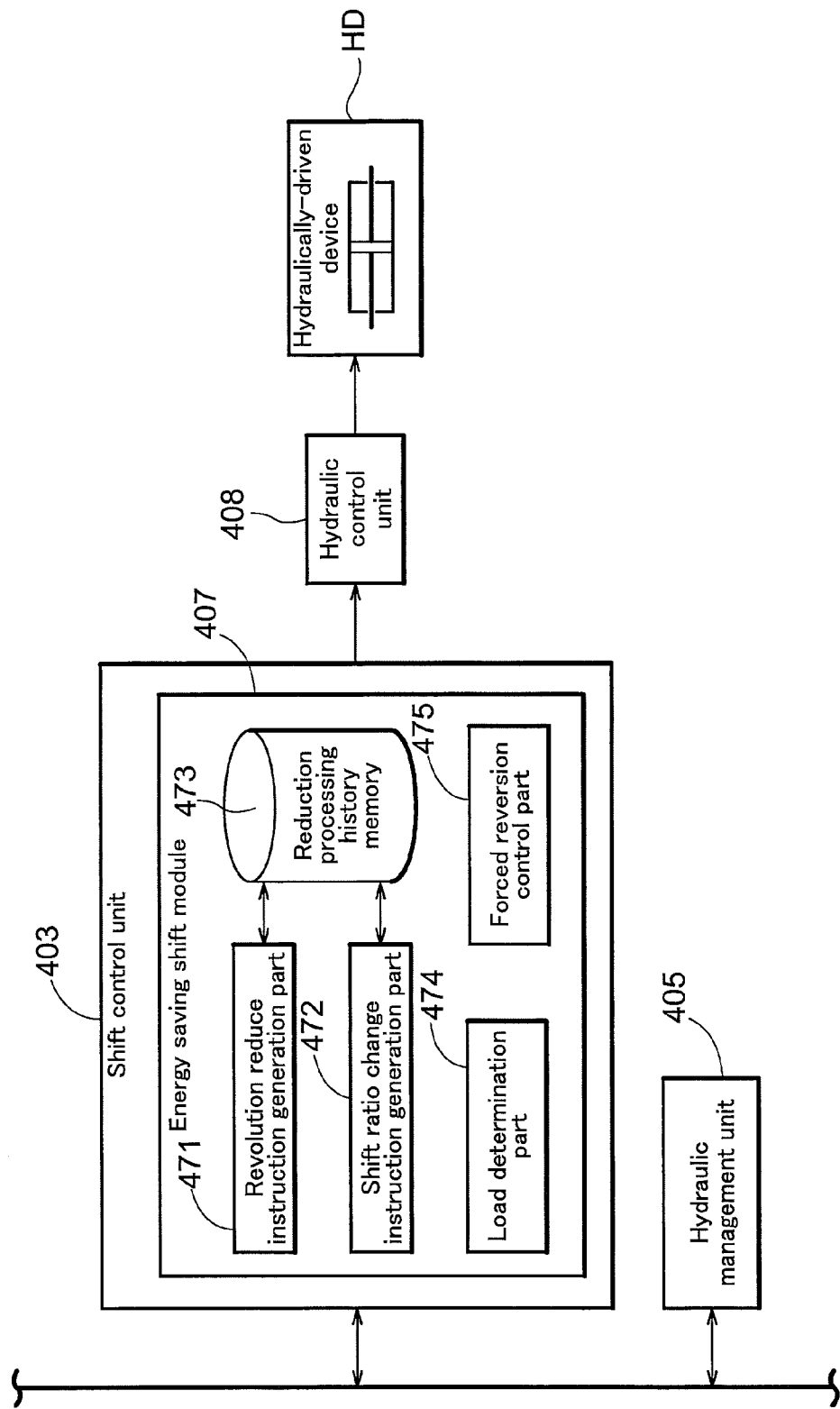

VEHICLE

CROSS-REFERENCE TO RELATED APPLICATIONS

This application is the United States national phase of International Application No. PCT/JP2013/057227 filed Mar. 14, 2013, and claims priority to Japanese Patent Application Nos. 2012-210087, 2012-210088, and 2012-210089, all filed Sep. 24, 2012, and 2012-215235 filed Sep. 27, 2012, the disclosures of which are hereby incorporated in their entirety by reference.

TECHNICAL FIELD

The present invention relates to a vehicle provided with an internal combustion engine.

BACKGROUND ART

[1] With a hybrid work vehicle in which a motor generator assists an internal combustion engine, the vehicle travels with power from the internal combustion engine, and when the internal combustion engine is under a heavy load, the motor generator is operated as a motor and vehicle travel is assisted by power that is output from this motor generator. The motor generator is also operated as a generator to charge the battery.

For example, a hybrid power unit equipped with an electric motor that provides torque assist to the internal combustion engine when the vehicle starts travelling and is accelerating according to Patent Document 1 detects the charge state of the battery, computes the amount of auxiliary torque (assist amount) that can be supplied to the internal combustion engine from the electric motor based on the detected charge state, and changes the load ratio of the electric motor and the amount of fuel that is provided to the internal combustion engine based on the computed amount of auxiliary torque. Battery exhaustion is thereby prevented by stopping supply of electricity to the electric motor if the charging rate is low.

With a hybrid power unit according to Patent Document 2, two control maps having different assist patterns (relationship between the number of engine revolutions and torque) of the motor generator assisting the internal combustion engine are prepared, and assist control is performed by switching the control maps depending on state information such as the state of charge (SOC) of the battery, vehicle speed, the state of the transmission and the temperature of the internal combustion engine. The aim is to thereby realize favorable operability using a small horsepower internal combustion engine.

[2] With a typical hybrid car in which a motor generator assists an internal combustion engine, the vehicle travels with power from the internal combustion engine, and the motor generator is operated as a motor according to driving conditions (vehicle speed, operation amount of accelerator (accelerator position), operational state of internal combustion engine, road surface conditions, shift position, remaining battery charge, etc.) to assist vehicle travel with power that is output from the motor generator. The motor generator can also be operated as a generator, thus also enabling the battery to be supplied with electricity and charged. This hybrid vehicle is constituted such that when the motor generator is operated as a motor, torque that the motor generator is responsible for providing (assist torque) can be produced according to the load ratio (derived based on driving conditions, etc.) of the internal combustion engine and the motor generator relative to the vehicle drive torque required by the driver (target vehicle drive torque; derived, for example, based on the accelerator pedal operation by the driver) by controlling the torque produced by the motor generator.

The hybrid power unit equipped with an electric motor for providing torque assist to the internal combustion engine when the vehicle starts travelling and is accelerating according to Patent Document 1 detects the charge state of the battery, computes the amount of auxiliary torque (assist amount) that can be supplied to the internal combustion engine from the electric motor based on the detected charge state, and changes the load ratio of the electric motor and the amount of fuel that is provided to the internal combustion engine based on the computed amount of auxiliary torque. Battery exhaustion is thereby prevented by stopping supply of electricity to the electric motor if the charging rate is low.

With the hybrid power unit according to Patent Document 2, two control maps having different assist patterns (relationship between the number of engine revolutions and torque) of the motor generator assisting the internal combustion engine are prepared, and assist control is performed by switching the control maps depending on state information such as the state of charge (SOC) of the battery, vehicle speed, the state of the transmission and the temperature of the internal combustion engine. Favorable operability is thereby realized using a small horsepower internal combustion engine.

[3] With vehicles such as described above, it is possible to keep the speed of the vehicle constant both at high and low engine revolutions through cooperative control of an engine control unit and a shift control unit. For example, Patent Document 3 describes a mobile agricultural machine that is provided with a shift actuator for operating a continuously variable shift mechanism and changes travel speed (the speed of the vehicle) steplessly by controlling the shift actuator. With this mobile agricultural machine, an accelerator actuator and a rotation sensor for detecting and adjusting engine revolutions are provided, and the shift ratio of the continuously variable shift mechanism and the engine revolutions are correlatively (cooperatively) controlled by operating these actuators so as to achieve a prescribed travel speed. The intent is to run the vehicle economically by setting the engine to revolutions at which the fuel consumption rate is low when travelling under a light load, and to run the vehicle to maintain a prescribed speed by setting the engine to high output when travelling under a heavy load.

The ability to reduce engine revolutions while keeping the speed of vehicle constant is advantageous in terms of lowering energy consumption (hereinafter, referred to as energy saving) as a result of the reduced fuel consumption rate. However, a problem arises in that the engine is more likely to stall when engine torque approaches its maximum, causing the vehicle to lose travel stability. Whether or not there is room to increase engine torque depends on the travel state of the vehicle, that is, on road conditions, work conditions and the like, for example. Travelling up a steep incline or along a muddy road naturally results in engine torque approaching its maximum. While the driver is able to get a grasp of the situation, the vehicle according to Patent Document 3 is not provided with a shift operation system that enables the driver's grasp of the situation to be tied in with energy saving driving as referred to above.

A vehicle that realizes shift operation that allows the driver's feel for the excess capacity of the engine to be applied to energy saving driving is disclosed in Patent Document 4. With this vehicle, a revolution reduction instruction for reducing engine revolutions set by the engine control unit by a prescribed amount based on an operation instruction sent out as a result of an operation by the driver is given to the engine control unit, and a shift ratio change instruction for requesting the shift control unit to change the shift ratio to compensate for the reduction in engine revolutions resulting from the revolution reduction instruction is given to the shift control unit in order to maintain the speed of the vehicle. Accordingly, with this well-known vehicle, a revolution reduction instruction for reducing engine revolutions by a prescribed amount can be given to the engine control unit, by the driver operating an operation device when he or she feels that there is room to increase engine torque and wants to reduce engine revolutions for the purpose of energy saving driving or the like. Moreover, the shift ratio is changed commensurate with the reduced engine revolutions and the speed of the vehicle is maintained. In other words, driving that reduces engine revolutions while maintaining the speed of the vehicle is realized, simply by operating an operation device when the vehicle is cruising. However, engine torque approaches its maximum when engine revolutions are excessively reduced while maintaining the speed of the vehicle, causing the vehicle to lose travel stability with a slight increase in engine load and giving rise to the risk of the engine stalling, and it thus becomes necessary to revert to the original number of engine revolutions. Particularly in the case of an inexperience driver, the problem arises of the operations for reducing and increasing engine revolutions being repeatedly performed.

[4] With work vehicles such as described above, it is possible to keep the speed of the work vehicle constant both at high and low engine revolutions through cooperative control of an engine control unit and a shift control unit. For example, Patent Document 3 describes a mobile agricultural machine that is provided with a shift actuator for operating a continuously variable shift mechanism and changes travel speed (the speed of the work vehicle) steplessly by controlling the shift actuator. With this mobile agricultural machine, an accelerator actuator and a rotation sensor for detecting and adjusting engine revolutions are provided, and the shift ratio of the continuously variable shift mechanism and the engine revolutions are correlatively (cooperatively) controlled by operating these actuators so as to achieve a prescribed travel speed. The intent is to run the work vehicle economically by setting the engine to revolutions at which the fuel consumption rate is low when travelling under a light load, and to run the work vehicle to maintain a prescribed speed by setting the engine to high output when travelling under a heavy load.

The ability to reduce engine revolutions while keeping the speed of the work vehicle constant is advantageous in terms of lowering energy consumption (hereinafter, referred to as energy saving) as a result of the reduced fuel consumption rate. However, a problem arises in that the engine is more likely to stall when engine torque approaches its maximum, causing the work vehicle to lose travel stability. Also, if engine revolutions are low, the rotations of a hydraulic pump that is driven by power from the engine will also be low, resulting in a reduction in the amount of operating oil supplied by the hydraulic pump.

A work vehicle that realizes shift operation that allows the driver's feel for the remaining capacity of the engine to be applied to energy saving driving is disclosed in Patent Document 4. With this work vehicle, a revolution reduction instruction for reducing engine revolutions set by the engine control unit by a prescribed amount based on an operation instruction sent out as a result of an operation by the driver is given to the engine control unit, and a shift ratio change instruction for requesting the shift control unit to change the shift ratio to compensate for the reduction in engine revolutions resulting from the revolution reduction instruction is given to the shift control unit in order to maintain the speed of the work vehicle. Accordingly, with this well-known work vehicle, a revolution reduction instruction for reducing engine revolutions by a prescribed amount can be given to the engine control unit, by the driver operating an operation device when he or she feels that there is room to increase engine torque and wants to reduce engine revolutions for the purpose of energy saving driving or the like. Moreover, the shift ratio is changed commensurate with the reduced engine revolutions and the speed of the work vehicle is maintained. In other words, driving that reduces engine revolutions while maintaining the speed of the vehicle is realized, simply by operating an operation device when the vehicle is cruising. However, engine torque approaches its maximum when engine revolutions are excessively reduced while maintaining the speed of the work vehicle, causing the vehicle to lose travel stability with a slight increase in engine load and giving rise to the risk of the engine stalling, and it thus becomes necessary to revert to the original number of engine revolutions. Particularly in the case of an inexperience driver, the problem arises of the operations for reducing and increasing engine revolutions being repeatedly performed. Also, even if an experienced driver is able to grasp whether the engine has excess capacity from the travel state or the like, consideration is not given to the supply of operating oil to hydraulically-actuated devices. Thus, a reduction in engine revolutions gives rise to the possibility of work using hydraulically-actuated devices no longer being carried out smoothly due to being unable to ensure sufficient supply of operating oil.

PRIOR ART DOCUMENTS

Patent Documents

Patent Document 1: JP 4-325736A (para. [0006] to [0021], FIG. 1, FIG. 2)
Patent Document 2: JP 2002-252904A (para. [0001] to [0026], FIG. 1, FIG. 2)
Patent Document 3: JP 5-338474A (para. [0004], FIG. 10)
Patent Document 4: JP 2012-162248A (para. [0020] to [0022], FIG. 1, FIG. 2)

SUMMARY OF THE INVENTION

Technical Problem

[1] Problems with Background Art [1] are as Follows.
The hybrid vehicles dealt with in Patent Documents 1 and 2 are general-purpose vehicles such as passenger cars, and the necessity for providing torque assist to the internal combustion engine can typically be determined by how much the accelerator operated by the driver is pressed down and the like, with the torque assist process being controlled in this way in Patent Documents 1 and 2. In contrast, with a hybrid work vehicle such as a tractor or the like provided with an internal combustion engine that supplies drive power to travel devices and work devices via a power transmission shaft and a motor generator that assists the internal combustion engine by outputting power to the power transmission shaft, a large workload that is received by a work device extends to the power transmission shaft and, consequently, to the internal combustion engine, thus preventing the assist technology disclosed by Patent Documents 1 and 2 from being directly appropriated.

Particularly in the case of a work vehicle such as a tractor equipped with a tilling device or the like that does earth work as a work device, a workload is placed on the internal combustion engine as rotational load. However, when such a workload is constantly shouldered by assist from the motor generator, battery charge runs out in a short time. Installing a large capacity battery for this reason must also be avoid from the viewpoint of energy saving.

In view of the above situation, there is demand for a hybrid work vehicle with which smooth work travel using a work device can be realized with a low output internal combustion engine while avoiding battery exhaustion.

[2] Problems with Background Art [2] are as Follows.

The hybrid vehicles dealt with in Patent Documents 1 and 2 are general-purpose vehicles such as passenger cars, and the necessity for providing torque assist to the internal combustion engine can typically be determined by how much the accelerator operated by the driver is pressed down and the like, with the torque assist process being controlled in this way in Patent Documents 1 and 2. In contrast, with a hybrid work vehicle such as a tractor or the like provided with an internal combustion engine that supplies drive power to travel devices and work devices via a power transmission shaft and a motor generator that assists the internal combustion engine by outputting power to the power transmission shaft, a large workload that is received by a work device extends to the power transmission shaft and, consequently, to the internal combustion engine, thus preventing the assist technology disclosed by Patent Documents 1 and 2 from being directly appropriated.

Particularly in the case of a work vehicle such as a tractor equipped with a tilling device or the like that does earth work as a work device, a workload is placed on the internal combustion engine as rotational load. However, when such a workload is constantly shouldered by assist from the motor generator, battery charge runs out in a short time. Installing a large capacity battery for this reason must also be avoid from the viewpoint of energy saving.

In view of the above situation, there is demand for a hybrid work vehicle with which smooth work travel using a work device can be realized with a low output internal combustion engine while avoiding battery exhaustion.

[3] Problems with Background Art [3] are as Follows.

In view of the above situation, there is demand for a vehicle that realizes energy saving driving and is easily able to handle unexpected increases in engine load, while reducing engine revolutions to the maximum extent possible without the engine stalling.

[4] Problems with Background Art [4] are as Follows.

In view of the above situation, there is demand for a technology for appropriately supplying operating oil to hydraulically-actuated devices, while reducing engine revolutions as much as possible in order to implement energy saving driving.

Solution to Problem

[1] The Solution to Problem [1] is as Follows.

A hybrid work vehicle according to the present invention includes an internal combustion engine that supplies drive power to a travel device and a work device via power transmission means, a transmission provided to the power transmission means, a shift control unit that adjusts a shift ratio of the transmission, a motor generator connected to the power transmission means, a motor control unit that performs motor assist control for assisting the internal combustion engine by outputting power from the motor generator to the power transmission means, a battery that receives charging power using the motor generator and provides drive power to the motor generator, a load information generation part that generates load information representing an increase in rotational load received by the internal combustion engine, and an assist control determination part that executes the motor assist control, in order to eliminate the increase in rotational load, in priority to mechanical assist control for assisting the internal combustion engine by adjusting (usually increasing) the shift ratio of the transmission through the shift control unit.

With a hybrid work vehicle having the above configuration according to the present invention, two measures are provided in order to eliminate an increase in rotational load occurring on the internal combustion engine. One measure is motor assist for assisting the internal combustion engine by driving a motor generator and outputting power from the motor generator to power transmission means. The other measure is mechanical assist for assisting the internal combustion engine by adjusting the shift ratio of a transmission of the power transmission means through a shift control unit. The inventor found that in the case of a work vehicle that performs work using a work device, the workload spikes suddenly, that is, for only a very short time (about several seconds) when the work vehicle is performing running work or starting on a hill, and remains average at other times. Highly responsive motor assist is preferred in response to the sudden occurrence of a high load, and mechanical assist that does not consume the battery is preferred in response to a sustained load. Accordingly, it is appropriate to execute motor assist first when there is an increase in load, and to execute mechanical assist instead of motor assist if the increased load is sustained. As a result of the assist control determination part thus executing motor assist control in priority to mechanical assist control, smooth work travel using a work device is realized with a low output internal combustion engine while avoiding battery exhaustion.

In order to more effectively assist the internal combustion engine, an appropriate amount of assist needs to be performed according to the increase in rotational load that is placed on the internal combustion engine. Thus, in one preferred embodiment of the present invention, a motor assist characteristic calculation part that calculates a motor assist characteristic for motor assist control based on the load information, and a mechanical assist shift ratio calculation part that calculates the shift ratio for the mechanical assist control are provided.

Although motor assist is effective against a sudden load increase, it is important to shift to mechanical assist after a prescribed short period of time has elapsed when the load increase is sustained, because of the need to avoid continuation of motor assist for prolonged periods from the viewpoint of battery consumption. For this reason, it is important to define not only the assist amount but also the assist time period in the motor assist characteristic that determines the assist drive behavior of the motor generator. Motor assist control can thereby be adapted to only sudden load increases, and wasteful battery consumption is avoided.

In the case where assist by the motor generator is essentially applied with respect to sudden load increases, people riding in the vehicle notice the change when assist is abruptly stopped at the end of a short assist process. In order to suppress this problem, in one preferred embodiment of the present invention, the motor assist characteristic is constituted by a start motor assist characteristic area in which a constant assist amount is maintained for a prescribed time period, and an end motor assist characteristic area in which the assist amount is reduced to zero over time. Assist is thereby able to end smoothly.

With earth work such as tilling while traveling and the like, a sudden load increase occurs when the work device digs into the ground or the like or unexpectedly encounters something hard. The duration of such sudden load increases can be investigated both experimentally and empirically. Accordingly, it is preferable to determine the motor assist characteristic in advance based on statistical evaluation of the results of such investigation. As one preferred embodiment of the present invention, it is proposed that the start motor assist characteristic area has a time period of 1.5 to 2.5 seconds, and that the end motor assist characteristic area has a time period of 1.5 to 2.5 seconds. It is advantageous to map a number of motor assist characteristics calculated under such conditions, so as to enable selection by the amount of load, type of work, and the like.

With the hybrid work vehicle according to the present invention, rather than achieving energy saving by charging the battery using a regenerative brake as is the case with typical hybrid cars, the objective is to make the internal combustion engine more compact and improve fuel efficiency by providing assist with a motor generator when sudden loads occur. For this reason, a compact battery is installed, thus requiring that care be taken to avoid a dead battery which will cause the internal combustion engine to stop. To this end, in one preferred embodiment of the present invention, an assist control prohibition determination part that prohibits execution of subsequent assist control for a prescribed time period after the assist control has been executed is provided. Motor assist control is executed first when an increase in rotational load is detected on the internal combustion engine, and thereafter mechanical assist control is executed, although in the case where the increase in rotational load is for a short period of time, assist control either ends with only motor assist control being executed or with mechanical assist control also being executed for a short period of time. Then, when an increase in rotational load on the internal combustion engine is subsequently detected again, motor assist control is executed. In such cases, motor assist control will be repeatedly executed for short periods of time, leading to high battery consumption. Such short-term repetition of motor assist can be suppressed by appropriately setting the prohibition period for which the assist control prohibition determination part prohibits motor assist control. Furthermore, this assist control prohibition determination part can be provided with an additional function of forcibly prohibiting assist of the internal combustion engine by the motor generator in the case where the charge amount of the battery is determined to be less than a prescribed value.

In one specific preferred embodiment of the present invention in the case where the internal combustion engine is driven with a common rail method, the load information generation part generates the load information with common rail control information as the input parameter. In other words, a control part that executes common rail control has a function of estimating load torque from internal combustion engine data such as the fuel injection timing, the amount of fuel injection and the number of engine revolutions or vehicle data such as vehicle speed, calculating the fuel injection timing and the amount of fuel injection required in order to maintain a prescribed number of engine revolutions or to maintain a prescribed torque, and executing these controls. Accordingly, detection or estimation of a sudden drop in engine revolutions is performed using common rail control information relating to these common rail controls. The motor assist characteristics are determined based on load information generated in this way.

As another embodiment of the present invention, a load information generation part may be constituted so as to generate the load information with the revolution behavior of the internal combustion engine as the input parameter. Specifically, the change in the number of revolutions or the change in revolution speed per prescribed unit time is calculated from measurement data obtained by measuring the number of rotations of the output shaft or the power transmission shaft of the internal combustion engine, which can be acquired comparatively easily. Load information is generated by calculating or estimating the increase or decrease in load from the above calculation result using a map or the like, and is used in determining the motor assist characteristics.

[2] The Solution to Problem [2] is as Follows.

Given that, in the case of a work vehicle that performs work using a work device, the workload spikes suddenly, that is, for only a very short time (about several seconds) when the work vehicle is performing running work or starting on a hill, and remains average at other times, the present invention is based on findings that indicate that an internal combustion engine having a comparatively small output can be used without issue if these sudden high loads can be overcome.

In view of this, a hybrid work vehicle according to the present invention includes an internal combustion engine that supplies drive power to a travel device and a work device via power transmission means, a motor generator that assists the internal combustion engine by outputting power to the power transmission means, a battery that receives charging power using the motor generator and provides drive power to the motor generator, a load information generation part that generates load information representing a sudden increase in rotational load received by the internal combustion engine, an assist characteristic determination part that determines an assist characteristic defining an assist amount and an assist time period of assist control for assisting the internal combustion engine using the motor generator with respect to the sudden increase in rotational load based on the load information, and a motor control unit that controls the motor generator based on the assist characteristic.

With a work vehicle having the above configuration according to the present invention, when a sudden high load occurs, the motor generator is assist driven based on assist characteristics set in advance in order to handle a sudden load increase, thus enabling the internal combustion engine to be protected from a rapid drop in revolutions and engine stall caused by the high load. The motor generator, being highly responsive, can reliably handle sudden load increases. Also, because not only the assist amount but also the assist time period is defined in the assist characteristics that determine the assist drive behavior of the motor generator, assist control can be adapted to only sudden load increases, and wasteful battery consumption is avoided.

With the hybrid work vehicle according to the present invention, rather than achieving energy saving by charging the battery using a regenerative brake as is the case with typical hybrid cars, the objective is to make the internal combustion engine more compact and improve fuel efficiency by providing assist with a motor generator when sudden loads occur. For this reason, a compact battery is installed, thus requiring that care be taken to avoid a dead battery which will cause the internal combustion engine to stop. To this end, in one preferred embodiment of the present invention, an assist control prohibition determination part that prohibits execution of subsequent assist control for a prescribed time period after the assist control has been executed is provided. Assist control being continuously executed and the battery being quickly consumed when a sustained load occurs are thereby avoided. Furthermore, this assist control prohibition determination part can be provided with an additional function of forcibly prohibiting assist of the internal combustion engine by the motor generator in the case where the charge amount of the battery is determined to be less than a prescribed value.

As described above, with a hybrid work vehicle according to the present invention, assist by the motor generator is limited to when a sudden load occurs, although the high rotational load may not be completely eliminated depending on the type of work being performed. A rapid drop in revolutions (revolution drop) and engine failure of the internal combustion engine need to be avoided. However, battery consumption increases when the assist time period of assist by the motor generator becomes longer. In order to solve such problems, in one preferred embodiment of the present invention, the power transmission means includes a transmission that is capable of adjusting a shift ratio through a shift control unit, the shift control unit includes a load-following shift ratio control part that executes load-following shift ratio control for changing the shift ratio so as to reduce a load increase on the internal combustion engine due to the rotational load, and the load-following shift ratio control is executed selectively with the assist control, or is mixed and executed at least partially with the assist control. Because the load placed on the internal combustion engine can thereby be at least partially reduced by changing the shift ratio, the load on the battery also decreases. Particularly preferably, when a configuration is employed in which the assist control is executed prior to the load-following shift ratio control, a sudden load increase can be handled with assist by the motor generator, and the subsequent drop in revolutions of the internal combustion engine following the load increase can be handled by adjusting (usually increasing) the shift ratio.

Because assist by the motor generator is essentially applied with respect to sudden load increases, people riding in the vehicle will notice the change when assist is abruptly stopped at the end of a short assist process. In order to suppress this problem, in one preferred embodiment of the present invention, the assist characteristic is constituted by a start assist characteristic area in which a constant assist amount is maintained for a prescribed time period, and an end assist characteristic area in which the assist amount is reduced to zero over time. Assist is thereby able to end smoothly.

With earth work such as tilling while traveling and the like, a sudden load increase occurs when the work device digs into the ground or the like or unexpectedly encounters something hard. The duration of such sudden load increases can be investigated both experimentally and empirically. Accordingly, it is preferable to determine the assist characteristic in advance based on statistical evaluation of the results of such investigation. As one preferred embodiment of the present invention, it is proposed that the start motor assist characteristic area has a time period of 1.5 to 2.5 seconds, and that the end motor assist characteristic area has a time period of 1.5 to 2.5 seconds. It is advantageous to map a number of assist characteristics calculated under such conditions, so as to enable selection by the amount of load, type of work, and the like. One specific example of mapping an assist characteristic involves representing the assist characteristic by mapping a function in which a percentage of a reference assist amount and elapsed time are variables. At this time, a plurality of assist characteristics are prepared so as to be selectable depending on a load amount obtained from the load information, and the assist amount is calculated by multiplying a percentage derived from a selected map by the reference assist amount. Selecting and using optimal assist characteristics from among a large number of assist characteristics is thereby facilitated.

In one specific preferred embodiment of the present invention in the case where the internal combustion engine is driven with a common rail method, the load information generation part generates the load information with common rail control information as the input parameter. In other words, a control part that executes common rail control has a function of estimating load torque from internal combustion engine data such as the fuel injection timing, the amount of fuel injection and the number of engine revolutions or vehicle data such as vehicle speed, calculating the fuel injection timing and the amount of fuel injection required in order to maintain a prescribed number of engine revolutions or to maintain a prescribed torque, and executing these controls. Accordingly, detection or estimation of a sudden drop in engine revolutions is performed using common rail control information relating to these common rail controls. The assist characteristics are determined based on load information generated in this way.

As another embodiment of the present invention, a load information generation part may be constituted so as to generate the load information with the revolution behavior of the internal combustion engine as the input parameter. Specifically, the change in the number of revolutions or the change in revolution speed per prescribed unit time is calculated from measurement data obtained by measuring the number of rotations of the output shaft or the power transmission shaft of the internal combustion engine, which can be acquired comparatively easily. Load information is generated by calculating or estimating the increase or decrease in load from the above calculation result using a map or the like, and is used in determining assist characteristics.

[3] The Solution to Problem [3] is as Follows.

A hybrid vehicle according to the present invention is a so-called hybrid vehicle that includes an engine that supplies drive power to a travel device via power transmission means, an engine control unit that sets a number of engine revolutions of the engine, a transmission provided to the power transmission means, a shift control unit that adjusts a shift ratio of the transmission, a motor (electric motor) unit that assists the engine by outputting power to the power transmission means, a load information generation part that generates load information representing an increase in rotational load received by the engine, a motor control unit that performs assist control for outputting power from the motor unit to the power transmission means based on the load information, a battery that provides drive power to the motor unit, and a shift module that is provided with an operation device configured to output an operation instruction as a result of an operation of a driver, and that gives to the engine control unit a revolution reduction instruction for reducing the number of engine revolutions set by the engine control unit by a prescribed amount based on the operation instruction, and gives a shift ratio change instruction for requesting the shift control unit to change the shift ratio so as to compensate for the reduction in engine revolutions resulting from the revolution reduction instruction in order to maintain vehicle speed.

According to this configuration, a revolution reduction instruction for reducing engine revolutions by a prescribed amount is given to the engine control unit, by the driver operating an operation device such as a button or a level, for example, when he or she feels that there is room to increase engine torque and wants to reduce engine revolutions for the purpose of energy saving driving or the like. At the same time, a shift ratio change instruction is given to a shift control unit so as to change the shift ratio commensurate with the reduced engine revolutions and maintain the speed of the vehicle. A driving operation that reduces engine revolutions is thereby easily realized, while maintaining the speed of the vehicle, simply by operating an operation device when the vehicle is cruising at a constant speed or during work travel. Furthermore, because the load information generation part generates load information representing an increase in rotational load in the case where engine rotational load increases for a given reason, assist control for outputting power from the motor unit to the power transmission means is executed by the motor control unit, based on this load information. As a result, a drop in engine revolutions and engine stall are avoided. In particular, the motor generator, being highly responsive, can reliably handle sudden load increases.

Battery consumption when assist of the engine by the motor unit is executed in not insignificant. Assist control thus needs to be executed appropriately. In the case where engine revolutions are reduced for energy saving driving, there is a greater possibility of the engine stalling with a sudden increase in load, this being the preferred timing for assist control. For this reason, in one preferred embodiment of the present invention, assist control is performed with respect to an increase in rotational load that arises after the revolution reduction instruction has been given to the engine control unit.

In the case of handling excessive engine load with motor assist provided by driving the motor unit, the amount of battery consumption becomes a problem when motor assist is executed for a prolonged period of time. For this reason, in one preferred embodiment of the present invention, the motor unit is constituted as a motor generator, and the battery is able to receive charging power from the motor generator. In other words, in the case where motor assist is not required, the occurrence of a dead battery can be suppressed by driving the motor unit as a generator and charging the battery when needed.

Although the workload spikes suddenly, that is, for only a very short time (about several seconds) when a vehicle is starting on a slope, or even when performing normal running work in the case of the vehicle being a work vehicle that performs work using a work device, an engine having a comparatively small output can be used if these sudden load increases can be overcome. In view of this, in one preferred embodiment of the present invention, an assist characteristic determination part that determines an assist characteristic defining an assist amount and an assist time period of the assist control based on the load information is provided, and the motor control unit performs assist control by the motor unit based on the assist characteristic. According to this configuration, when a sudden high load occurs, the motor generator is assist driven based on assist characteristics set in advance in order to handle a sudden load increase, thus enabling the internal combustion engine to be protected from a rapid drop in revolutions and engine stall caused by the high load. Because not only the assist amount but also the assist time period is defined in the assist characteristics that determine the assist drive behavior of the motor generator, assist control can be adapted to only sudden load increases, and wasteful battery consumption is avoided.

Because assist by the motor generator essentially targets sudden load increases, people riding in the vehicle will notice the change when assist is abruptly stopped at the end of a short assist process. In order to suppress this problem, in one preferred embodiment of the present invention, the assist characteristic is constituted by a start assist characteristic area in which a constant assist amount is maintained for a prescribed time period, and an end assist characteristic area in which the assist amount is reduced to zero over time. Assist is thereby able to end smoothly.

In the case of particular types of travel, such as travel over rocky surfaces if the vehicle is an off-road vehicle or travel while performing earth work such as tilling using a front loader or the like if the vehicle is a work vehicle, for example, a predictable sudden load increase occurs. However, the duration of such sudden load increases can be investigated both experimentally and empirically. Accordingly, it is preferable to determine the assist characteristic in advance based on statistical evaluation of the results of such investigation. As one preferred embodiment of the present invention, it is proposed that the start assist characteristic area has a time period of 1.5 to 2.5 seconds, and that the end assist characteristic area has a time period of 1.5 to 2.5 seconds. It is advantageous to map a number of assist characteristics calculated under such conditions, so as to enable selection by the amount of load, type of work, and the like.

With the hybrid work vehicle according to the present invention, rather than achieving energy saving by charging the battery using a regenerative brake as is the case with typical hybrid vehicles, the objective is to make the engine more compact and improve fuel efficiency by providing assist with a motor generator when sudden loads occur. For this reason, a compact battery is installed, thus requiring that care be taken to avoid a dead battery which will cause the internal combustion engine to stop. To this end, in one preferred embodiment of the present invention, execution of subsequent assist control is prohibited for a prescribed time period, after the assist control has been executed. Assist control being continuously executed and the battery being quickly consumed when a sustained load occurs are thereby avoided. Furthermore, a function of forcibly prohibiting assist of the internal combustion engine by the motor generator in the case where the charge amount of the battery is determined to be less than a prescribed value is also preferably provided.

Engine torque approaches its maximum when engine load rises again during the period in which assist control is prohibited, resulting in vehicle losing travel stability and giving rise to the risk of the engine stalling. In order to avoid this, in one preferred embodiment of the present invention, a load determination part that determines whether engine load exceeds a prescribed level based on the load information is provided, and in a case where it is determined that engine load exceeds the prescribed level in the assist control prohibition period, a reversion operation instruction for canceling the reduction in engine revolutions based on the operation instruction and the change in the compensation shift ratio is output. With this configuration, in the case where an increase of engine load occurs during prohibition of assist control, engine torque can be increased by forcibly increasing engine revolutions.

It is also possible to leave this increase in engine revolutions during prohibition of assist control up to the driver. In other words, a function is provided that enables a reversion operation instruction for canceling the reduction in engine revolutions based on the operation instruction and the change in the compensation shift ratio to be sent to the operation device. According to this configuration, in the case where a driver feels that the vehicle is travelling unstably during the period in which assist control is prohibited, he or she is able to revert to the original number of engine revolutions with a simple operation. The driver is preferably informed of the assist control prohibition period with a lamp or the like.

Other features, aspects and advantages of the present invention will become apparent from the following description of the invention by reference to the following drawings.

[4] The Solution to Problem [4] is as Follows.

A work vehicle according to the present invention includes a motive power unit that supplies power to a travel device via power transmission means and includes at least an engine, an engine control unit that sets a number of engine revolutions of the engine, a transmission provided to the power transmission means, a shift control unit that adjusts a shift ratio of the transmission, a hydraulic pump in which a supplied amount of operating oil changes depending on the number of revolutions of the power supplied from the motive power unit, a hydraulically-driven device that is driven with operating oil supplied from the hydraulic pump, a hydraulic operation implement that operates the hydraulically-driven device, a required operating oil amount calculation part that calculates a required amount of operating oil required by the hydraulically-driven device based on operation information for the hydraulically-driven device, a revolution increase instruction generation part that gives to the engine control unit an engine revolution increase instruction for increasing the number of engine revolutions set by the engine control unit, in a case where it is determined there is a shortage of operating oil supplied to the hydraulically-driven device based on the required amount of operating oil, and a shift ratio change instruction generation part that gives to the shift control unit a shift ratio change instruction for changing the shift ratio so as to offset the increase in engine revolutions resulting from the engine revolution increase instruction in order to maintain work vehicle speed.

According to this configuration, in the case where, when performing work with engine revolutions reduced as much as possible for energy saving driving, there is considered to be a shortage of operating oil due to the supplied amount of operating oil being less than the amount of operating oil required by hydraulically-actuated devices, engine revolutions are increased, and the supplied amount of operating oil is raised by increasing the rotations of the hydraulic pump. Furthermore, because the shift ratio is changed so as to offset this increase in engine revolutions, a sudden acceleration of the work vehicle is avoided. Adjusting the shift ratio so as to almost completely offset the increase in engine revolutions is advantageous when performing work at a constant speed or travelling at a constant speed (cruising), because vehicle speed remains substantively unchanged. It should be obvious that in the case of only avoiding a sudden acceleration of the work vehicle caused by an increase in engine revolutions, the shift ratio does not have to be adjusted to correspond exactly to the increase in engine revolutions, and need only be adjusted to avoid a sudden acceleration.

The amount of operating oil required by a hydraulically-actuated device that is operated by the driver at the time of work travel or the like can be estimated by the operation behavior on the corresponding operation implement. Accordingly, in one preferred embodiment of the present invention, the required amount of operating oil is calculated based on an operation input of the hydraulic operation implement included in the operation information.

As described above, from the viewpoint of achieving energy saving by driving with engine revolutions reduced as much as possible, the work vehicle according to the present invention is also effective in environmental measures when constituted as a hybrid work vehicle equipped with an engine and a motor unit for assisting the engine.

In one preferred embodiment of the present invention, in a case where the operating oil supply shortage will be eliminated even if the number of engine revolutions is reduced, an engine revolution reversion instruction that cancels the engine revolution increase instruction is given to the engine control unit, and a shift ratio change instruction for changing the shift ratio so as to offset the reduction in the number of engine revolutions resulting from the engine revolution reversion instruction in order to maintain work vehicle speed is given to the shift control unit.

With this configuration, even though the length of time for which a large amount of operating oil is required is short, processing for increasing engine revolutions in order to increase the supplied amount of operating oil and processing for reducing engine revolutions in order to revert to the original number of engine revolutions is performed automatically with respect to work where this occurs frequently, thus enabling the driver to concentrate on operations involved in work travel, while performing energy saving driving.

The amount of operating oil supplied to hydraulically-actuated devices differs depending on the type of hydraulically-actuated device and the type of hydraulic work, and the supplied amounts of operating oil that are required also respectively differ slightly. As a result, it is preferable that the number of engine revolutions and the shift ratio are finely adjustable, and, if possible, steplessly adjustable. For this reason, in one preferred embodiment of the present invention, the transmission includes a continuously variable transmission, and the engine revolution increase instruction and the engine revolution reversion instruction target the continuously variable transmission.

Phenomena that increase the amount of operating oil supplied to hydraulically-actuated devices substantively occur during running travel at low-speed. Accordingly, it is preferable that the abovementioned adjustment of the number of engine revolutions and consequent adjustment of the shift ratio are performed only when the work vehicle is in a work travel state. Thus, in one preferred embodiment of the present invention, the transmission includes a multistep transmission provided with a shift step for road travel and a shift step for work, and in a case where the multistep transmission is in the shift step for road travel, an increase in engine revolutions resulting from the engine revolution increase instruction is prohibited.

BRIEF DESCRIPTION OF THE DRAWINGS

FIG. 34 is a functional block diagram of an energy saving shift module.

DESCRIPTION OF EMBODIMENTS

First Embodiment

Figure 1:
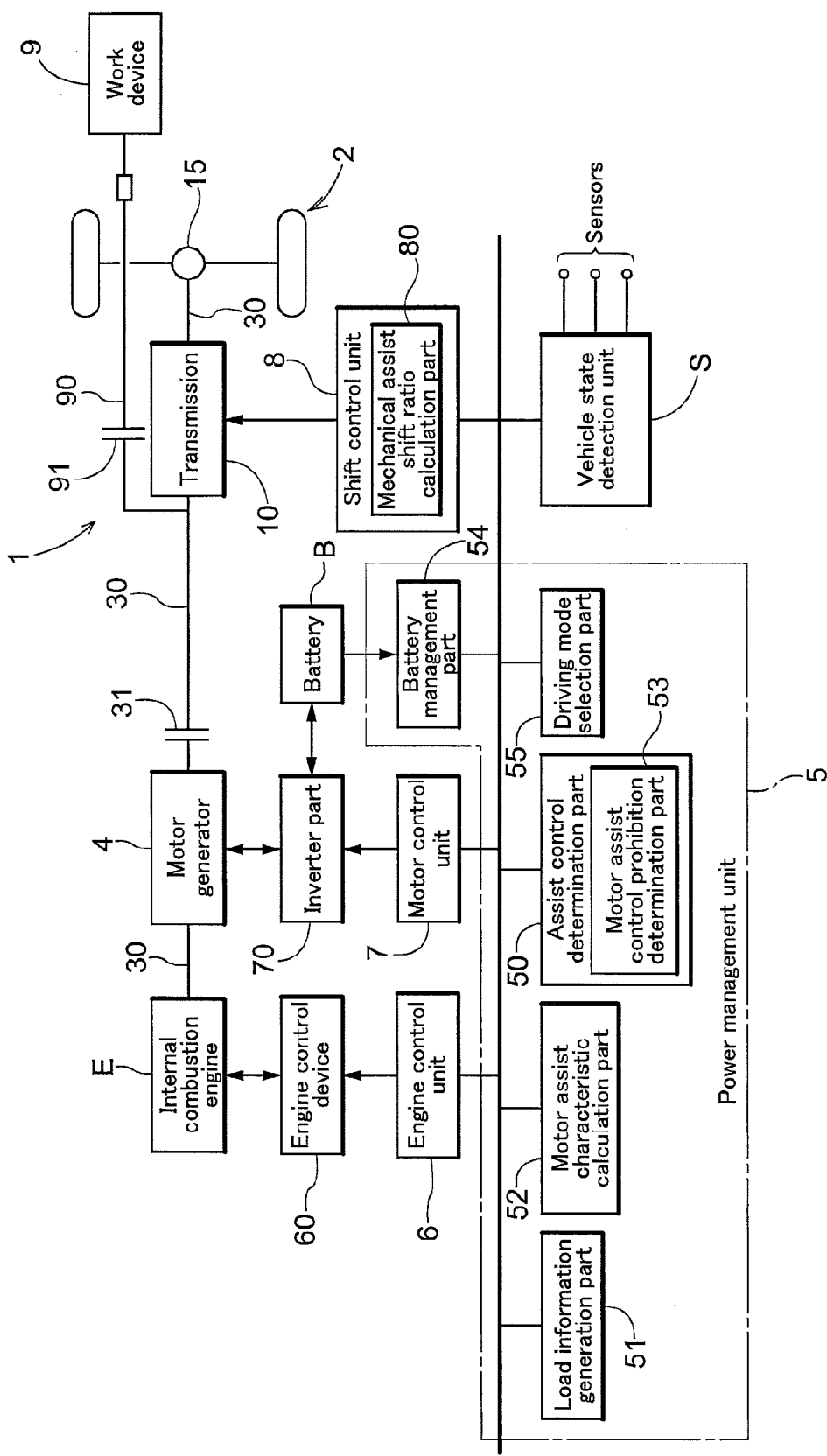
FIG. 1 is a diagram showing the basic configuration of a power system in a hybrid work vehicle according to a first embodiment of the present invention.

Hereinafter, prior to describing specific embodiments of a hybrid work vehicle according to a first embodiment of the present invention, the basic configuration of a power system that is employed in the present invention will be described using FIG. 1.

This hybrid work vehicle is provided with an internal combustion engine E and a motor generator 4 as drive sources, and performs running work using a work device 9 that is mounted to the vehicle body, while travelling using a travel device 2 constituted by wheels or crawlers. Power transmission means 1 serving as a power train for transmitting power from the drive sources includes a main clutch 31 that turns transmission of power from the drive sources on and off, a PTO shaft 90 that transmits power to the work device 9, a power transmission shaft 30 that transmits power to the travel device 2, and a transmission 10. The transmission 10 is preferably constituted as a continuously variable transmission, and the shift ratio thereof is adjusted by a shift control unit 8. Moreover, a PTO clutch 91 that turns power transmission on and off is disposed on the PTO shaft 90.

The motor generator 4 produces rotational power with a battery B as the power supply source, and cooperates with the internal combustion engine E to cause the hybrid work vehicle to travel, although in situations such as where the hybrid work vehicle is driven by the internal combustion engine E, is decelerating, or is coasting downhill, this motor generator 4 is able to function as a power generator for supplying electric power to the battery B.

Revolution control of the internal combustion engine E is performed by an engine control unit 6 via an engine control device 60 such as an electronic governor mechanism or a common rail mechanism. Drive control of the motor generator 4 is performed by a motor control unit 7 via an inverter part 70. The engine control unit 6 is a computer unit for controlling the amount of fuel injection of the internal combustion engine E and the like, and has a constant speed control function of controlling the engine control device 60 so as to maintain the internal combustion engine E at a constant number of revolutions. The motor control unit 7 is similarly a computer unit, and provides a control signal to the inverter part 70 in order to control the number of revolutions or torque of the motor generator 4. Also, the motor control unit 7 is provided with an assist drive mode in which power is output to the power transmission shaft 30 and a charge drive mode in which charging power is output to the battery B as drive modes for the motor generator 4. Furthermore, it is advantageous if there is also a zero torque drive mode that does not affect the power transmission shaft 30.

The inverter part 70, as is well known, converts direct current (DC) voltage from the battery B into alternating current (AC) voltage and supplies the AC voltage to the motor generator 4, and also function as a voltage adjustment device and a rectifier for supplying DC voltage to the battery B when the motor generator 4 operates as a power generator. In other words, the battery B operates in a discharging process of supplying electric power to the motor generator 4 via the inverter part 70, as well as operating in a charging process of being charged by electric power that is generated by the motor generator 4 when the motor generator 4 operates as a power generator.

A power management unit 5 manages motor assist control in which the motor generator 4 assists the internal combustion engine E, by giving control instructions to the engine control unit 6 and the motor control unit 7. Furthermore, the power management unit 5 requests the shift control unit 8 to perform mechanical assist control for reducing the rotational load placed on the internal combustion engine E by adjusting the shift ratio of the transmission 10 in place of assist control by the motor generator 4. The power management unit 5 includes an assist control determination part 50, a load information generation part 51, a motor assist characteristic calculation part 52, a battery management part 54, and a driving mode selection part 55.

The operation of the internal combustion engine E in a constant speed control mode is itself well known. At this time, depending on the work conditions of the work device 9 and the conditions of the ground surface that the travel device 2 comes in contact with, situations arise where an abrupt load is placed on the power transmission shaft 30, and consequently the number of revolutions of the internal combustion engine E drops, causing various problems. For example, factors such as delayed constant speed control by the engine control device 60 and insufficient output by the internal combustion engine E itself causes the number of revolutions of the internal combustion engine E to drop (drop in speed), and, in extreme cases, cause the internal combustion engine E to stop (engine stall). In order to avoid this, the load placed on the power transmission shaft 30 and the rotational load consequently placed on the internal combustion engine E are detected, and motor assist control or mechanical assist control is executed to at least partially offset these loads.

The load information generation part 51 has a function of generating load information indicating the rotational load that is received by the internal combustion engine E or the power transmission shaft 30, based on input parameters that are taken from engine control information provided by the engine control unit 6 or from detection information output by various sensors. Exemplary input parameters that are used by the load information generation part 51 include the number of revolutions (revolution speed) of the internal combustion engine E, the number of rotations (rotation speed) of the power transmission shaft 30, engine torque calculated by the engine control unit 6, the torque of the power transmission shaft 30, vehicle speed, and the work state of the work device 9 (tilling depth, traction, force acting on the loader, etc.), although the input parameters that are actually used depend on the sensors provided in the work vehicle. Because a vehicle speed sensor and a rotation detection sensor of the power transmission shaft 30 are highly likely to be provided as standard, it is advantageous to use a vehicle speed variation value and a rotation speed variation value of the power transmission shaft 30 as input parameters. These input parameters are sent through a vehicle state detection unit S that processes signals from various sensors. The load information generation part 51, in order to detect a sudden increase in rotational load, may also generate load information indicating the sudden increase in rotational load based on the differential value or difference value of temporal rotational loads, but may also generate load information indicating an increase in rotational load that triggers assist control simply by threshold decision.

The assist control determination part 50 determines to assist the internal combustion engine E by motor assist control or mechanical assist control when it is determined that an increase in rotational load that cannot be disregarded is occurring on the internal combustion engine E based on the load information generated by the load information generation part 51. At this time, highly responsive motor assist control is executed in priority to mechanical assist control. In order to reduce consumption of the battery B as much as possible, however, the motor assist control is limited to a short execution time. Furthermore, in order to avoid a dead battery, a motor assist control prohibition determination part 53 that terminates motor assist control forcibly if the charge amount of the battery B falls below a prescribed value is included in the assist control determination part 50. Also, this motor assist control prohibition determination part 53 prohibits the motor assist control from being executed again for a prescribed period, in order to avoid motor assist control being repeatedly executed in a short period of time.

The motor generator 4 is only driven for a short time in motor assist control so as to enable the internal combustion engine E to cope with sudden load increases, with the motor assist characteristic calculation part 52 functioning in order to appropriately execute this motor assist control. The motor assist characteristic calculation part 52 determines the motor assist characteristics defining the assist amount and assist time period of assist control, based on the load information generated by the load information generation part 51, in order to execute assist control of the internal combustion engine E using the motor generator 4. The motor control unit 7 controls the motor generator 4 via the inverter part 70 based on the motor assist characteristics determined by the motor assist characteristic calculation part 52.

The battery management part 54 calculates the charge amount of the battery B. At this time, if the battery B is constituted as an intelligent battery unit provided with a computer, the charge amount of the battery is calculated based on battery information from the battery B, and if this is not the case, the charge amount of the battery B is calculated based on battery information output from the vehicle state detection unit S after having received a signal from a battery state detection sensor.

Mechanical assist control is control for suppressing excess rotational load on the internal combustion engine E by the shift control unit 8 adjusting the shift ratio of the transmission 10 according to a request from the assist control determination part 50. Accordingly, a shift ratio to be targeted in the mechanical assist control is calculated using the current shift ratio and the rotational load placed on the internal combustion engine E. The shift control unit 8 is provided with a mechanical assist shift ratio calculation part 80 for this purpose.

Moreover, the driving mode selection part 55 sets the constant speed control mode that maintains a constant number of revolutions, and is used when running the work vehicle at a prescribed speed (cruising) and when performing work with the work device 9 which is utilized to perform work by taking the rotational power of a constant number of revolutions off the PTO shaft 90. When this constant speed control mode has been set, the engine control unit 6 controls the engine control device 60 so as to maintain the internal combustion engine E at a set prescribed number of revolutions.

Figure 2:
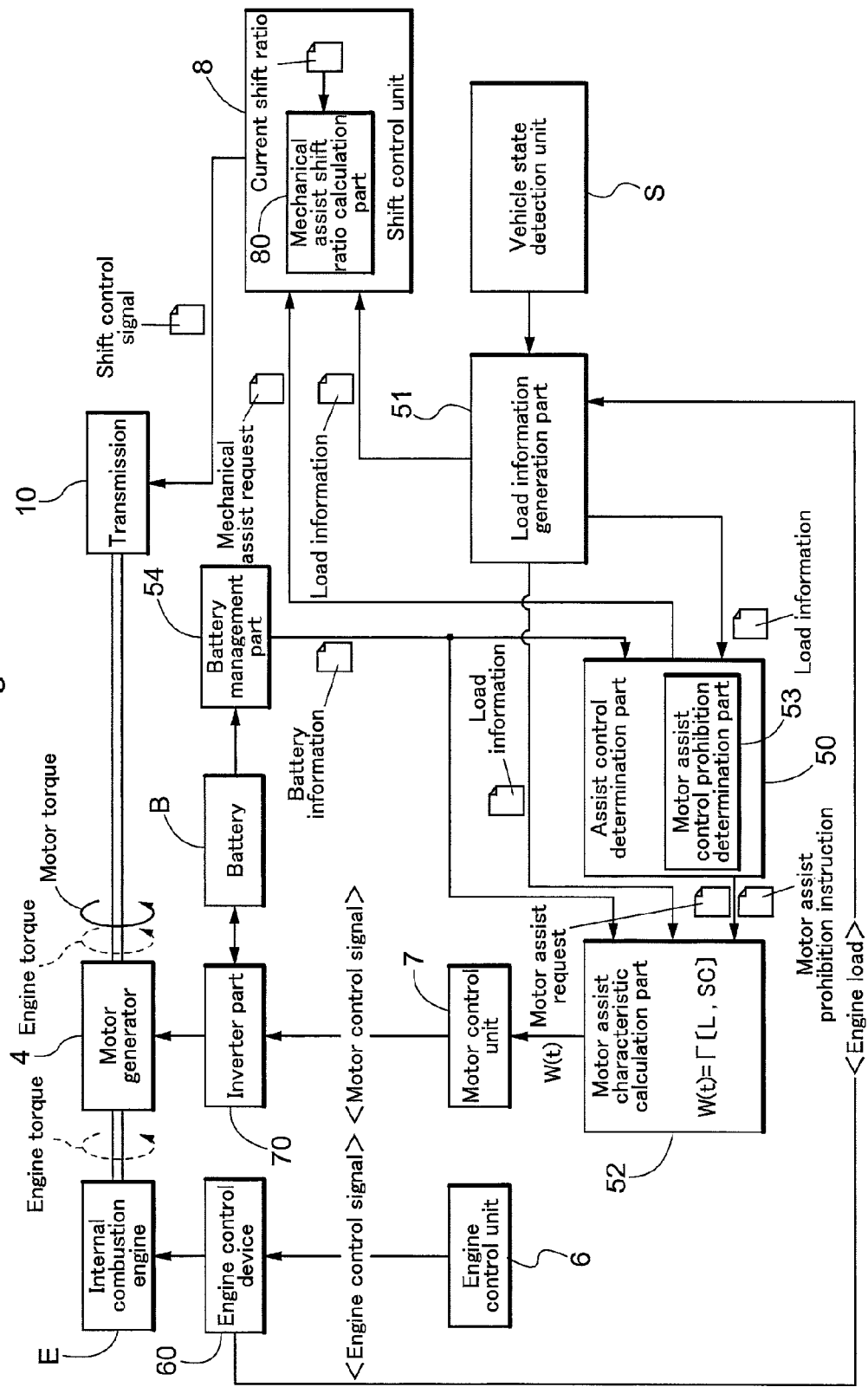
FIG. 2 is a schematic diagram showing the flow of data in a torque assist process.

The basic flow of information in motor assist control and mechanical assist control is shown in FIG. 2. First, the engine control unit 6 sends an engine control signal that is based on a setting value set by an accelerator setting device to the engine control device 60. The amount of fuel injection and the like are adjusted based on this engine control signal, and the internal combustion engine E is driven. Because variation in the number of revolutions of the internal combustion engine E occurs due to variation in external factors, or in other words, variation in travel load, workload and the like, torque is increased by adjusting the amount of fuel injection and the like, so that an unexpected drop in the number of revolutions or engine stall due to the amount of load variation does not occur. However, because the rated output of the internal combustion engine E is keyed to the maximum torque normally required to perform work, the occurrence of an unexpected sudden load increase will culminate in a drop in revolutions or, in a worst case scenario, engine stall. In order to avoid this, the assist control determination part 50 first executes motor assist control, and the motor control unit 7 sends an assist signal to the inverter part 70 and drives the motor generator 4 to assist the internal combustion engine E. Thereafter, in the case where the excess load is sustained, the internal combustion engine E is assisted by executing mechanical assist control instead of motor assist control, and adjusting the transmission 10 to the shift ratio set by the mechanical assist shift ratio calculation part 80.

The load information generation part 51 generates load information that includes a load amount based on vehicle state information sent from the vehicle state detection unit S or engine state information sent from the engine control device 60, and sends the generated load information to the assist control determination part 50, the motor assist characteristic calculation part 52, and also the mechanical assist shift ratio calculation part 80. The battery management part 54 calculates the amount of charge (generally referred to as SOC) based on charge information from the battery B, and sends battery information including this charge amount to the assist control determination part 50 and the motor assist characteristic calculation part 52.

The motor assist characteristic calculation part 52 determines an appropriate motor assist characteristic W(t), based on a load amount L read out from the load information and a charge amount SC read out from the battery information. This motor assist characteristic is derived from the general equation W(t)=Γ[L, SC]. In other words, the motor assist characteristic can be represented with a graph for determining the temporal assist amount. In practice, a configuration in which a plurality of motor assist characteristics are mapped and stored and an optimal motor assist characteristic is selected based on the load amount L and the charge amount SC is preferred.

When the motor assist characteristic has been determined, the motor control unit 7 generates an assist control signal based on this motor assist characteristic, performs drive control of the motor generator 4 through the inverter part 70, and compensates for the increase in load occurring on the power transmission shaft 30. Because the electric motor has high torque responsiveness, a drop in revolutions is thereby avoided, even when a sudden increase in travel load or workload occurs.

Note that, apart from assist control, the motor control unit 7 is able to control the motor generator 4 to function as a generator and charge the battery B, by sending a power generation instruction to the inverter part 70. Also, the motor generator 4 performs zero torque drive as a result of the motor control unit 7 sending a zero torque control signal to the inverter part 70.

When the shift control unit 8 has received a mechanical assist request from the assist control determination part 50, the mechanical assist shift ratio calculation part 80 calculates a shift ratio (mechanical assist shift ratio) to be targeted in the mechanical assist control, based on the load information from the load information generation part 51 and the current shift ratio managed by the shift control unit 8. When the mechanical assist shift ratio has been calculated, a shift control signal is output to the transmission 10 such that the calculated shift ratio is realized. This mechanical assist control is executed after a short period of assist control has ended based on the motor assist characteristics, in order to handle an increase in load occurring on the internal combustion engine E. In other words, unless assist control is prohibited by the motor assist control prohibition determination part 53, motor assist control is executed prior to this mechanical assist control. The hunting phenomenon that arises in response to sudden load increases that occur frequently is thereby suppressed by mechanical assist control which has slow responsiveness compared with assist control. In order, however, to avoid repetition of motor assist control in a short period of time, subsequent motor assist control is prohibited by the motor assist control prohibition determination part 53 for a prescribed time period after the end of motor assist control.

Figure 3:
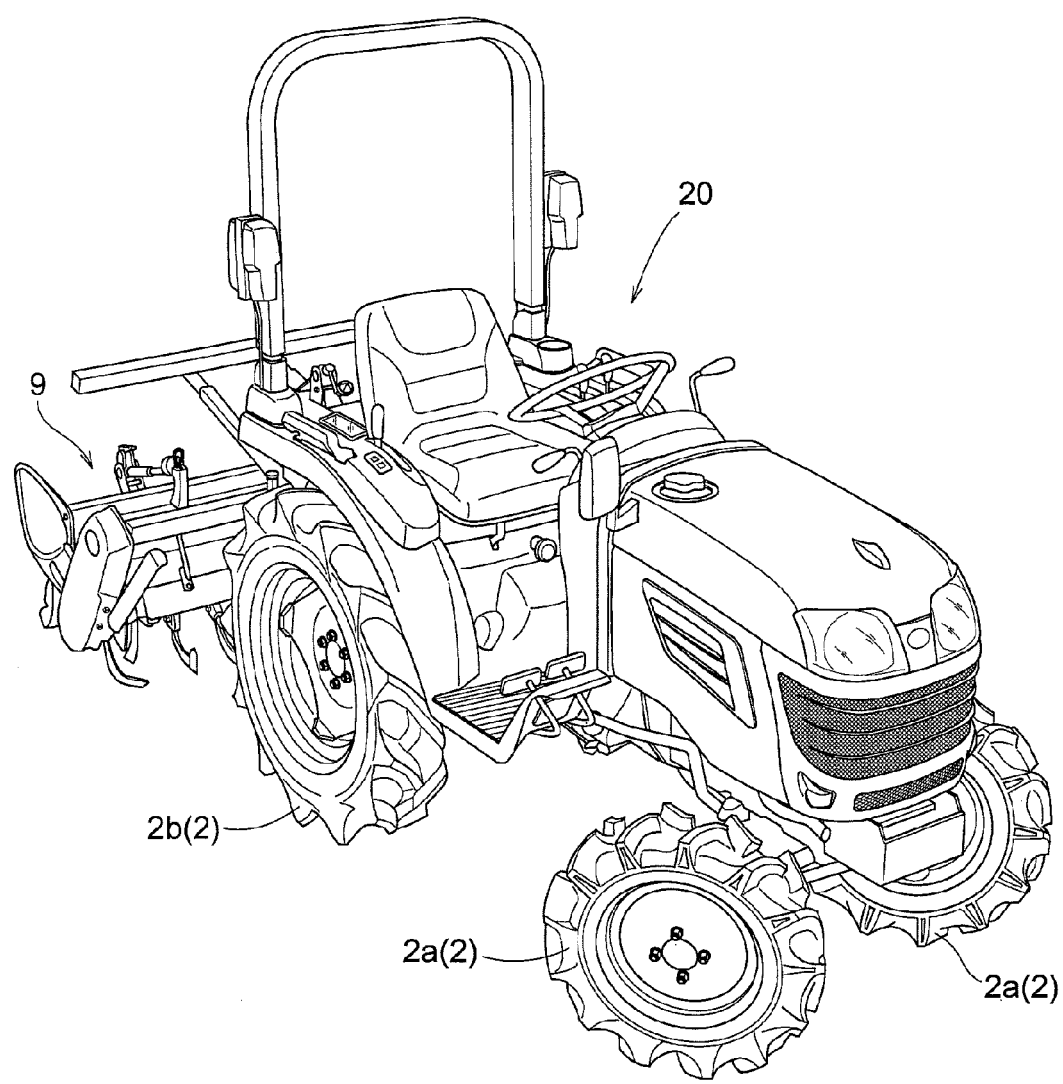
FIG. 3 is a perspective diagram of a general-purpose tractor serving as one embodiment of the hybrid work vehicle according to the first embodiment of the present invention.
Figure 4:
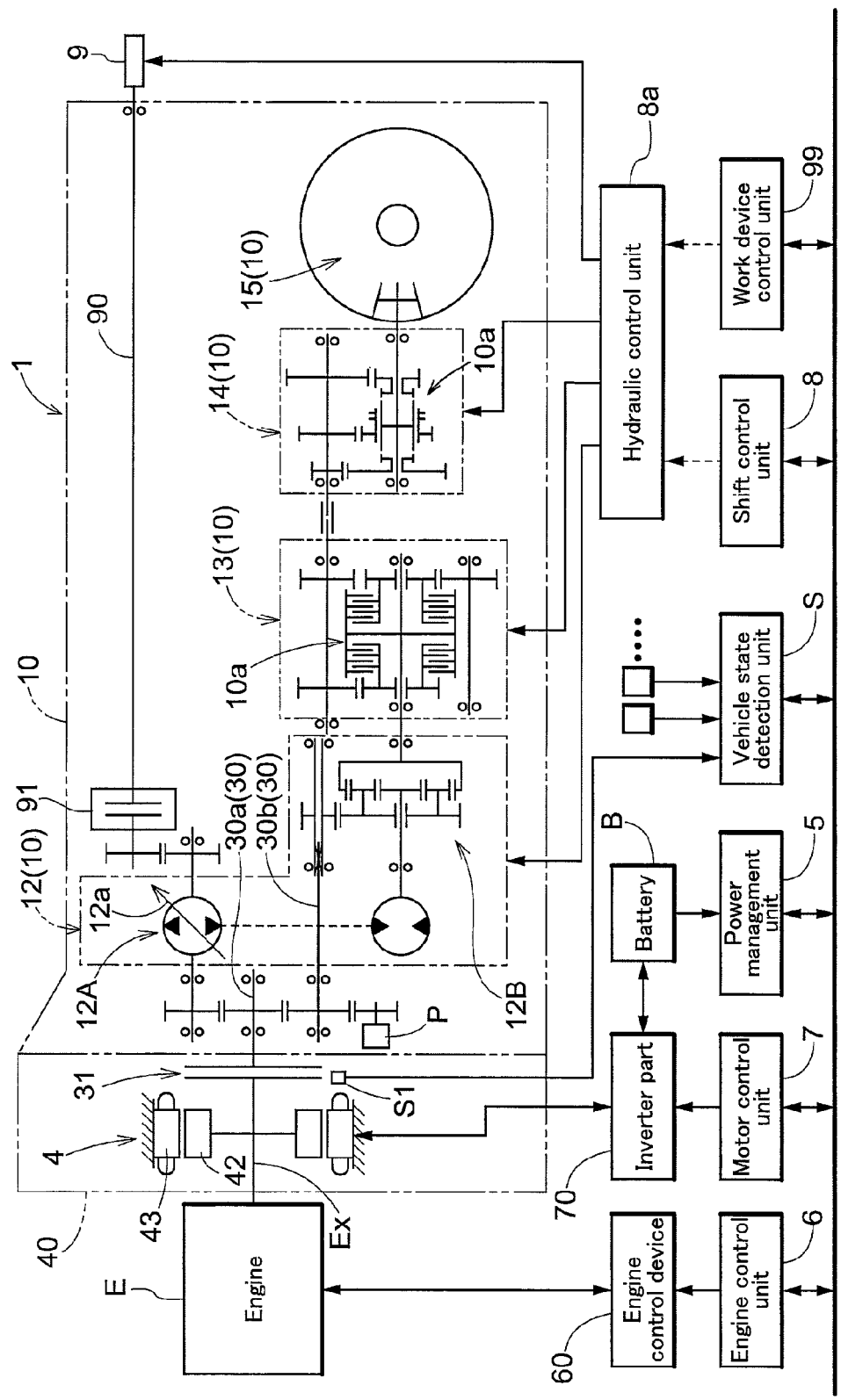
FIG. 4 is a functional block diagram schematically showing the power system of a tractor.

Next, a specific embodiment of the first embodiment of the present invention will be described. In this embodiment, the hybrid work vehicle is a general-purpose tractor having a well known form, such as shown in FIG. 3. The power system of this tractor is schematically shown in FIG. 4. The tractor body is provided with the internal combustion engine E, the motor generator 4, the hydraulically-actuated main clutch 31, the transmission 10, a driving part 20, a left and right pair of front wheels 2a and rear wheels 2b serving as the travel device 2, and the like. Furthermore, a tilling device is mounted as the work device 9 to a rear portion of the vehicle body by a lift mechanism. The lift mechanism operates using a hydraulic cylinder.

Figure 5:
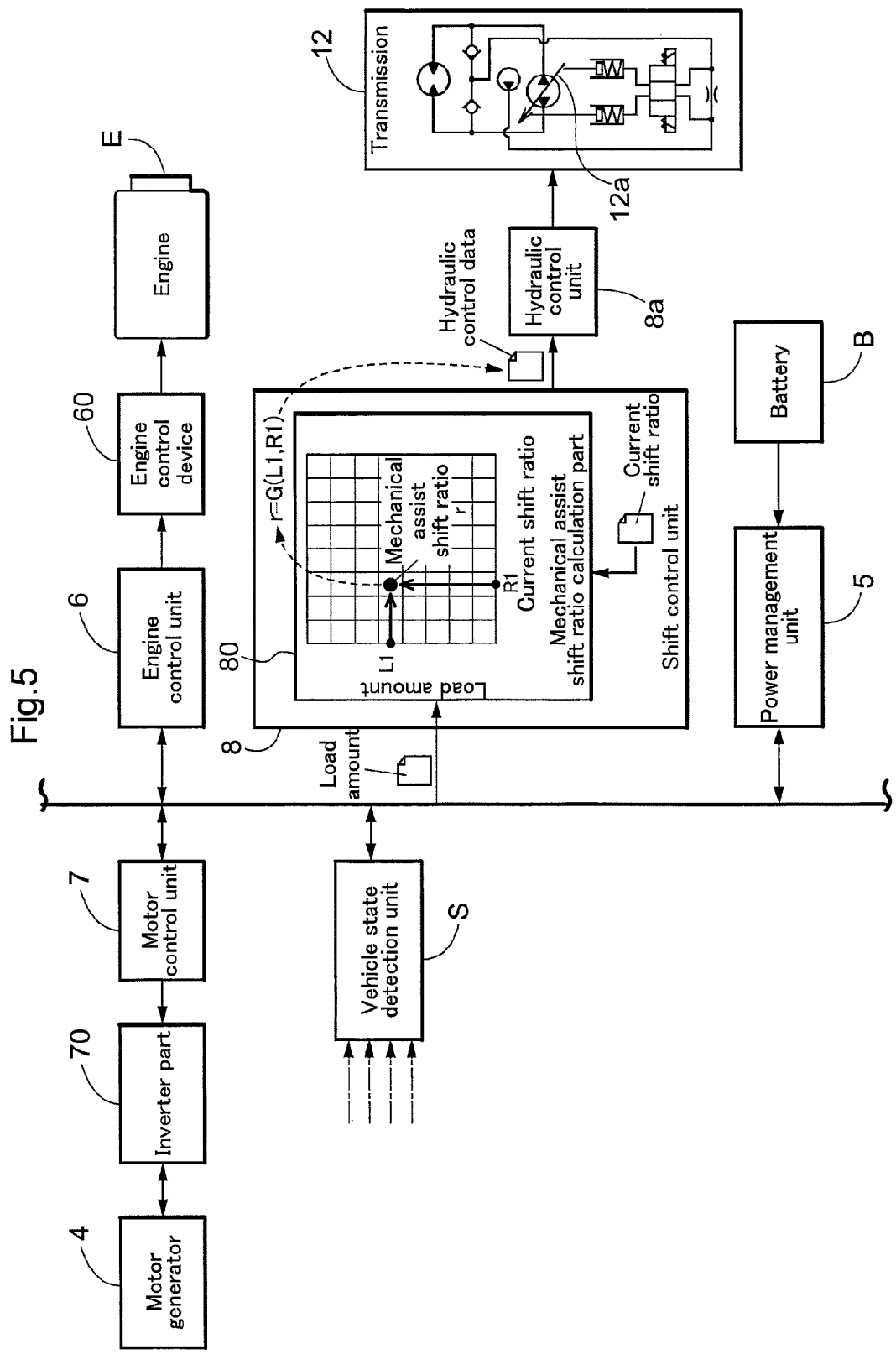
FIG. 5 is a functional block diagram of a power control system.

As schematically shown in FIGS. 4 and 5, the internal combustion engine E of this tractor is a diesel engine (hereinafter, engine E) whose revolutions are controlled with a common rail method, and is provided with a common rail control device as the engine control device 60. The transmission 10 includes a hydro-mechanical continuously variable transmission (hereinafter, HMT) 12, a forward-reverse switching device 13, a gear transmission 14 that performs multistep shifting, and a differential mechanism 15, and power therefrom is transmitted through the power transmission shaft 30 and ultimately rotates the drive wheels (front wheels 2a or rear wheels 2b, or both pairs of wheels) 2. The forward-reverse switching device 13 and the gear transmission 14 are each provided with a hydraulically-actuated shift clutch 10a. Furthermore, a tilling device 9 mounted to the tractor is able to receive rotational power through the PTO shaft 90 constituting a portion of the power transmission shaft 30 that transmits the rotational power of the engine E and the motor generator 4, and a tilling rotor is thereby rotationally driven at a prescribed tilling depth.

The HMT 12 is constituted by a hydrostatic shift mechanism 12A consisting of a swash plate 12a type variable discharge hydraulic pump that receives power from the engine E and the motor generator 4 and a hydraulic motor that is rotated by hydraulic power from the hydraulic pump and outputs power, and a planetary gear mechanism 12B.

The planetary gear mechanism 12B is constituted so as to supply shift output thereof to the downstream power transmission shaft 30, with power from the engine E and the motor generator 4 and power from the hydraulic motor as inputs.

With this hydrostatic transmission mechanism 12A, as a result of power from the engine E and the motor generator 4 being input to a pump shaft, pressurized oil is supplied from the hydraulic pump to the hydraulic motor and the hydraulic motor is rotationally driven by hydraulic power from the hydraulic pump to rotate a motor shaft. The rotation of the hydraulic motor is transmitted to the planetary gear mechanism 12B through the motor shaft. With the hydrostatic shift mechanism 12A, the angle of the swash plate 12a of the hydraulic pump is changed by displacing a cylinder that is interlocked with the swash plate 12a, resulting in shifting to a forward rotation state, a reverse rotation state and a neutral state located between the forward rotation state and the reverse rotation state, and even in the case where there has been a shift to the forward rotation state or a shift to the reverse rotation state, the rotation speed of the hydraulic pump and the revolution speed (revolutions per unit time) of the hydraulic motor are steplessly changed. As a result, the rotation speed of power that is output from the hydraulic motor to the planetary gear mechanism 12B is changed steplessly. The hydrostatic shift mechanism 12A stops rotation of the hydraulic motor caused by the hydraulic pump, as a result of the swash plate 12a being positioned in the neutral state, and consequently stops output from the hydraulic motor to the planetary gear mechanism 12B.

The planetary gear mechanism 12B is provided with a sun gear, three planetary gears arranged so as to be distributed at equal intervals around the sun gear, a carrier that rotatably supports each planetary gear, a ring gear that engages with the three planet gears, and an output shaft (one power transmission shaft 30) joined to the forward-reverse switching device 13. Note that, in this embodiment, the carrier forms a gear portion that engages, on an outer periphery thereof, with an output gear attached to the power transmission shaft 30 on the engine E side, and is relatively rotatably supported by a boss portion of the sun gear.

As a result of the abovementioned configuration, the HMT 12 is able to steplessly shift transmission of power to the drive wheels, namely, the front wheels 2a or the rear wheels 2b or both pairs of wheels, by changing the angle of the swash plate 12a of the hydrostatic shift mechanism 12A. Control of the swash plate 12a is realized by hydraulic control of a hydraulic control unit 8a that operates based on control instructions from the shift control unit 8. Also, a hydraulic pump P serving as a hydraulic power source of hydraulic actuators such as the hydraulically-actuated cylinder, the main clutch 31 and the shift clutch 10a described above. This hydraulic pump P may employ a mechanical pump that receives rotational power from the power transmission shaft 30 or an electric pump that receives rotational power from an electric motor. In the case of the electric pump, the electric motor is controlled by the hydraulic control unit 8a.

While various control functions for performing a shift operation on (adjusting the shift ratio of) the transmission 10 are built into the shift control unit 8, a function that is particularly related to the present invention is the function of executing mechanical assist control for changing the shift ratio so as to reduce an increased load on the internal combustion engine E. Here, the mechanical assist shift ratio calculation part 80 that calculates the mechanical assist shift ratio for mechanical assist is built in order to realize this function. An example of a simple method of building the mechanical assist shift ratio calculation part 80 is schematically shown by FIG. 5, with the method involving creating a map for deriving the target shift ratio (mechanical assist shift ratio) of mechanical assist, with the load amount and current shift ratio as inputs. In other words, a function $r=G(L1, R1)$ for deriving a mechanical assist shift ratio r with a load amount L1 that is included in the load information generated by the load information generation part 51 and a current shift ratio R1 that is held by the shift control unit 8 as variables is mapped.

The shift control unit 8 provides a shift control signal for changing the shift ratio of the transmission 10 to the mechanical assist shift ratio calculated by the mechanical assist shift ratio calculation part 80 to the hydraulic control unit 8a. Specifically, as shown in FIG. 5, the shift control unit 8 sends a hydraulic control signal for changing the angle of the swash plate 12a of the HMT 12 to the hydraulic control unit 8a, in order to realize the shift ratio calculated by the mechanical assist shift ratio calculation part 80.

Control of the motor generator 4 in this power system, or in other words, torque assist provided to the engine E, is performed by the power management unit 5, although, here, the power management unit 5 appropriates the configuration described using FIGS. 1 and 2. The power management unit 5, the engine control unit 6 and the vehicle state detection unit S are also respectively connected by in-vehicle LAN so as to enable data communication.

The vehicle state detection unit S inputs signals from various sensors disposed on the tractor and operation input signals indicating the state of operation devices (clutch pedal, brake pedal) that are operated by the driver, performs signal conversion or evaluation calculation when needed, and sends out the obtained signal or data to the in-vehicle LAN.

A work device control unit 99 for operating the tilling device 9 is also connected to the hydraulic control unit 8a, as a higher-level electronic device for giving control instructions to the hydraulic control unit 8a.

Figure 6:
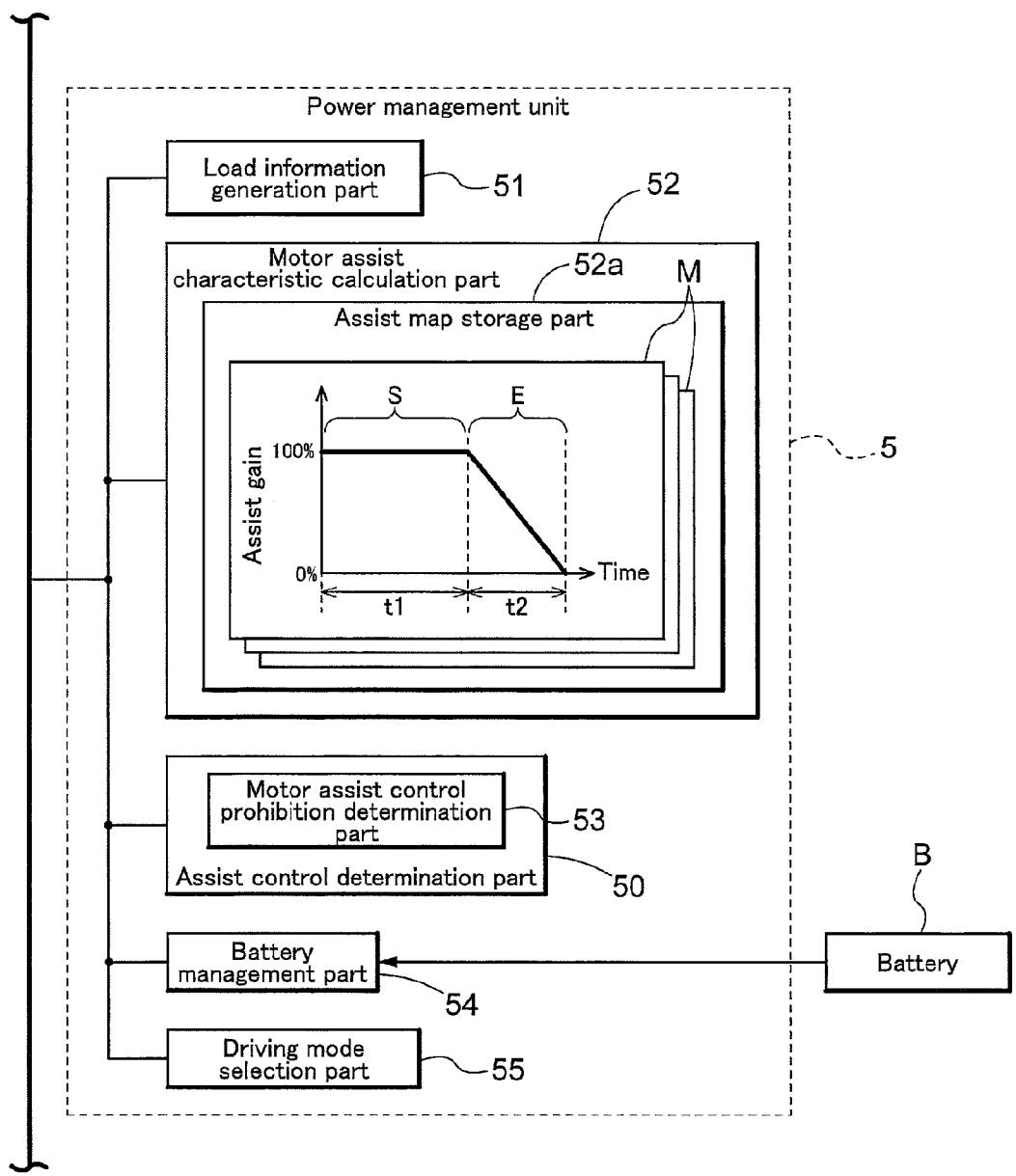
FIG. 6 is a functional block diagram of a power management unit.

As shown in FIG. 6, the motor assist characteristic calculation part 52 is provided with an assist map storage part 52a. This assist map storage part 52a has a function of creating and storing in advance a plurality of motor assist characteristic maps M obtained by mapping motor assist characteristics, or creating and setting an appropriate motor assist characteristic map M when needed. As schematically illustrated, these motor assist characteristics can be represented with a graph for determining the temporal assist amount. In the example in FIG. 6, the horizontal axis is time and the vertical axis is assist gain. The assist gain is a percentage of the maximum assist amount (motor torque) that is calculated according to the load amount read out from the load information, and takes a value between 0% and 100%. In other words, the amount of assist by the motor generator 4 is, in practice, derived by multiplying the maximum assist amount by the assist gain obtained from the motor assist characteristic map M. The motor assist characteristics in this embodiment consist of a start motor assist characteristic area S in which a constant assist amount is maintained for a prescribed time period and an end motor assist characteristic area E in which the assist amount is reduced to zero over time. A time period t1 of the start motor assist characteristic area S is from 1.5 to 2.5 seconds, and preferably 2 seconds, and a time period t2 of the end motor assist characteristic area E is from 1.5 to 2.5 seconds, and preferably 2 seconds. In the illustrated motor assist characteristic map M, the assist gain in the start motor assist characteristic area S is constant at 100%, and in the end motor assist characteristic area E is linear. It should be obvious that any given shape can be employed for the decreasing trend thereof. It is also possible to employ a nonlinear graph in both the start motor assist characteristic area S and the end motor assist characteristic area E.

The motor assist characteristic calculation part 52 determines the optimal motor assist characteristic map M from the load amount read out from the load information and the charge amount read out from the battery information. In the other motor assist characteristic maps M, the assist gain in the start motor assist characteristic area S takes a value in a range of about 10% to less than 100%, and in the end motor assist characteristic area E various motor assist characteristics that serve as decreasing functions are shown. In other words, the assist amount that is actually produced by the motor generator 4 varies each time depending on either the load amount or the charge amount or both of these amounts.

Note that repetition of motor assist control that is based on these assist characteristics in a short period of time is prohibited by the motor assist control prohibition determination part 53. The time period for which repetition of this motor assist control is prohibited may be changed depending on the charge amount of the battery B or may be determined in advance depending on the capacity of the battery B. This prohibition period may also be varied depending on the type of work. In either case, the time period is set so as to not bring about an abrupt drop in the battery charge amount.

Figure 7:
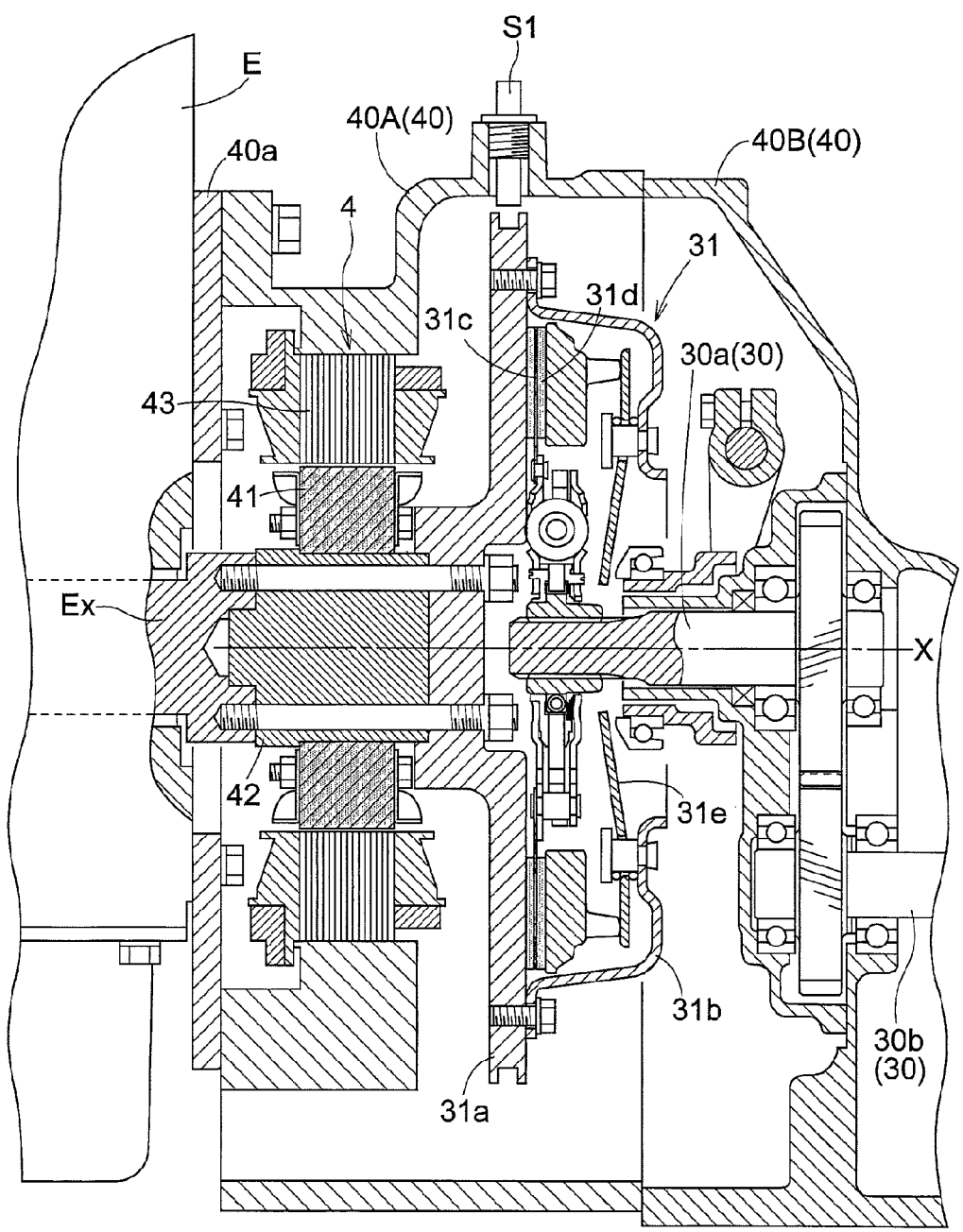
FIG. 7 is a cross-sectional view of a motor generator provided in the tractor.

As shown in FIG. 7, a motor housing 40 that houses the motor generator 4 and the main clutch 31 is provided on a rear surface side of the engine E. The motor generator 4 has both a function of a three-phase AC power generator that generates electric power using the drive power of the engine E, and a function of a three-phase AC motor that rotates using electric power supplied from outside. Accordingly, the inverter part 70 converts DC power from the battery B into three-phase AC power, and supplies the AC power to the motor generator 4. Also, the inverter part 70 converts three-phase alternating current generated by the motor generator 4 into direct current, boosts the DC voltage, and supplies the boosted DC voltage to the battery B.

As is clear from FIG. 7, the engine E, the motor generator 4 and the main clutch 31 are provided in this order, and the motor housing 40 is joined to a rear end plate 40*a* joined to a rear portion of the engine E, thereby housing the motor generator 4 and the main clutch 31 in the motor housing 40.

The motor generator 4 is constituted by a rotor 42 on an outer periphery of which is provided a permanent magnet 41, and a stator 43 arranged in a position surrounding the rotor 42, and the stator 43 has a structure in which a coil is wound around a plurality of teeth portions (not shown) of a stator core. The rotor 42 of the motor generator 4 is arranged facing a shaft end of an output shaft Ex (crankshaft) of the engine E, coaxially with a rotary shaft core X of this output shaft Ex, a base plate 31*a* of the main clutch 31 is arranged on the opposite surface of the rotor 42 to the output shaft Ex, and the output shaft Ex, the rotor 42 and the base plate 31*a* of the main clutch 31 are joined by being screwed together. This base plate 31*a* also function as a flywheel, although, as described above, the motor generator 4 partially executes the function of producing inertia force performed by a flywheel, allowing weight saving to be realized over the conventional art.

The motor housing 40 has a structure in which a front portion housing 40A and a rear portion housing 40B are separably joined, and when assembling the motor generator 4, this front portion housing 40A is joined to the rear end plate 40*a* in a state where the stator 43 is provided on an inner surface of the front portion housing 40A, and the rotor 42 is then joined to a rear end of the output shaft Ex.

The main clutch 31 is provided with a clutch disc 31*c*, a pressure plate 31*d* and a diaphragm spring 31*e* inside a clutch cover 31*b* that is joined to a rear surface of the base plate 31*a*, and a clutch shaft 30*a* that is one component of the power transmission shaft 30 and to which drive power from the clutch disc 31*c* is conveyed, and is operated by a clutch pedal that is not illustrated.

The clutch shaft 30*a* is rotatably supported about the rotary shaft core X relative to the rear portion housing 40B, the clutch disc 31*c* is supported in a manner that enables transmission of torque to the clutch shaft 30*a* using a spline structure and displacement along the rotary shaft core X, and the diaphragm spring 31*e* has a configuration in which a biasing force in a clutch-on direction acts on the clutch disc 31*c* via the pressure plate 31*d*. Also, power from the clutch shaft 30*a* is conveyed to an intermediate transmission shaft 30*b* that is one component of the power transmission shaft 30 and serves as an input shaft of the transmission 10 via a gear transmission mechanism.

Given that the battery B installed in the tractor has limited capacity, and that torque assist during work travel demands considerable power consumption, the charge amount of the battery B soon runs out when assist control is repeatedly executed when performing work. In order to avoid this, assist by the motor generator 4 is executed for only a short time while taking into account the charge amount of the battery B, and motor assist control needs to be terminated if the charge amount of the battery B falls below a prescribed value.

Figure 8:
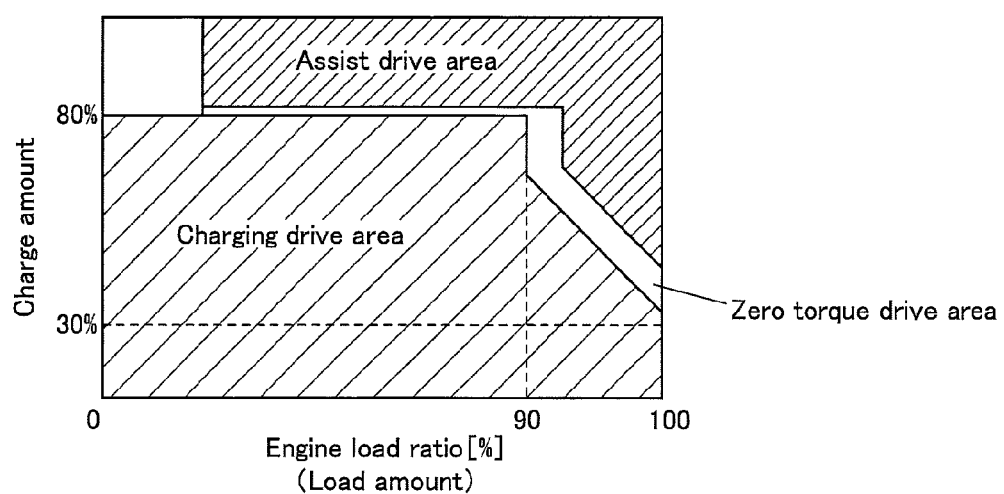
FIG. 8 is a schematic diagram showing selection in a drive mode based on a charge amount and an engine load factor (load amount).

For this reason, in this embodiment, the motor assist control prohibition determination part 53 determines whether to permit or prohibit assist control, based on the load amount (engine load factor, amount of reduction in revolutions) included in the load information generated by the load information generation part 51 and the charge amount included in the battery information sent from the battery management part 54. An example of a determination map that is used at this time is shown in FIG. 8. What can be understood from this determination map is that essentially assist control will not be performed unless there is sufficient charge. For example, assuming that the assist determination line is a charge amount of about 80%, torque assist is not executed when the charge amount is at or below this line so as to avoid exhausting the battery B. However, because the possibility of engine stall arises if the engine load factor approaches 100%, assist control is permitted even at charge amounts of 80% or less. At this time, the assist determination line slopes from an engine load factor of 90% to 100%, that is, assist control is permitted the higher the engine load factor after a prescribed engine load factor (here, not less than approx. 90%) even in a state where the charge amount is low. At an engine load factor of 100%, assist control is permitted even if the charge amount is about 30%. In this determination map, the assist determination line is band-like in shape, and the area above the upper boundary line of the assist determination line is an assist drive area where assist control is permitted. The area below the lower boundary line of the assist determination line is a charge drive area. Furthermore, the assist determination band bounded by the upper boundary line and the lower boundary line of the assist determination line is a buffer area in which neither assist control nor charging is performed, and in this embodiment this buffer area is used as a zero torque drive area in which zero torque drive control is performed. Assistant control is prohibited in the charge drive area and the zero torque drive area.

Other Embodiments of the First Embodiment (1) In the abovementioned embodiment, the number of engine revolutions or the number of transmission shaft rotations was utilized in order to detect the load acting on the engine E. However, a load detection sensor may be provided directly to the work device 9, and whether to permit or prohibit assist control may be determined using the load detection signal from this sensor.

(2) In the above embodiment, the engine E and the motor generator 4 are directly joined, the main clutch 31 is mounted to the rear thereof, and power is transmitted to the power transmission shaft 30. However, the main clutch 31 may alternatively be mounted between the engine E and the motor generator 4.

(3) In the above embodiment, stepless shifting using the HMT 12 for the transmission 10 was employed, but multistep shifting using a multistep gear transmission may be employed.

(4) A configuration may be adopted in which individual motor assist characteristics respectively optimized for the type of work device 9 and the type of usage thereof may be created in advance as motor assist characteristics, and appropriately selected. For example, a work device type detection part for detecting the type of work device 9 that is mounted to the work vehicle or a manual work device type setting part is provided, and the type of work device 9 that is actually mounted for use is provided to the motor assist characteristic calculation part 52 as an auxiliary parameter. The motor assist characteristic calculation part 52 can thereby determine appropriate motor assist characteristics depending on the type of work device used.

(5) In the abovementioned embodiment, mechanical assist control is started after motor assist control has ended. However, motor assist control and mechanical assist control may be executed simultaneously at a prescribed assist ratio partway through the motor assist control. In particular, when transitioning from motor assist control to the mechanical assist control, mixed control for decreasing the assist ratio of motor assist control and increasing the assist ratio of mechanical assist control is also favorable. Also, a control method that involves supplementing assist provided by motor assist control with assist provided by mechanical assist control in the case where the battery charge amount is low is also included in the present invention. In other words, the prioritization of motor assist control over mechanical assist control also applies to mixed assist control in which motor assist control is the primary assist control and mechanical assist control is the secondary assist control.

Second Embodiment

Hereinafter, prior to describing specific embodiments of a hybrid work vehicle according to a second embodiment of the present invention, the basic configuration of a power system that is employed in the present invention will be described using FIG. 9.

This hybrid work vehicle is provided with an internal combustion engine E and a motor generator 204 as drive sources, and performs running work using a work device 209 that is mounted to the vehicle body, while travelling using a travel device 202 constituted by wheels or crawlers. Power transmission means 101 serving as a power train for transmitting power from the drive sources includes a main clutch 231 that turns transmission of power from the drive sources on and off, a PTO shaft 290 that transmits power to the work device 209, a power transmission shaft 230 that transmits power to the travel device 202, and a transmission 210. Moreover, a PTO clutch 291 that turns power transmission on and off is disposed on the PTO shaft 290.

The motor generator 204 produces rotational power with a battery B as the power supply source, and cooperates with the internal combustion engine E to cause the hybrid work vehicle to travel, although in situations where the hybrid work vehicle is driven by the internal combustion engine E, is decelerating, or is coasting downhill, this motor generator 204 is able to function as a power generator for supplying electric power to the battery B.

Revolution control of the internal combustion engine E is performed by an engine control unit 206 via an engine control device 260 such as an electronic governor mechanism or a common rail mechanism. Drive control of the motor generator 204 is performed by a motor control unit 207 via an inverter part 270. The engine control unit 206 is a computer unit for controlling the amount of fuel injection of the internal combustion engine E and the like, and has a constant speed control function of controlling the engine control device 260 so as to maintain the internal combustion engine E at a constant number of revolutions. The motor control unit 207 is similarly a computer unit, and provides a control signal to the inverter part 270 in order to control the number of revolutions or torque of the motor generator 204. Also, the motor control unit 207 is provided with an assist drive mode in which power is output to the power transmission shaft 230 and a charge drive mode in which charging power is output to the battery B as drive modes for the motor generator 204. Furthermore, it is advantageous if there is also a zero torque drive mode that does not affect the power transmission shaft 230.

The inverter part 270, as is well known, converts DC voltage from the battery B into AC voltage and supplies the AC voltage to the motor generator 204, and also function as a voltage adjustment device and a rectifier for supplying DC voltage to the battery B when the motor generator 204 operates as a power generator. In other words, the battery B operates in a discharging process of supplying electric power to the motor generator 204 via the inverter part 270, as well as operating in a charging process of being charged by electric power that is generated by the motor generator 204 when the motor generator 204 operates as a power generator.

A power management unit 205 manages assist control in which the motor generator 204 assists the internal combustion engine E, by giving control instructions to the engine control unit 206 and the motor control unit 207. The power management unit 205 includes a load information generation part 251, an assist characteristic determination part 252, an assist control prohibition determination part 253, a battery management part 254, and a driving mode selection part 255.

The operation of the internal combustion engine E in a constant speed control mode is itself well known, although depending on the work conditions of the work device 209 and conditions of the ground surface that the travel device 202 comes in contact with, situations arise where an abrupt load is placed on the power transmission shaft 230, and consequently the number of revolutions of the internal combustion engine E drops. At this time, factors such as delayed constant speed control by the engine control device 260 and insufficient output by the internal combustion engine E itself causes the number of revolutions of the internal combustion engine E to drop (drop in speed), and, in extreme cases, cause the internal combustion engine E to stop (engine stall). In order to avoid this, the load placed on the power transmission shaft 230 and the rotational load consequently placed on the internal combustion engine E are detected, the motor generator 204 is driven for a short period to at least partially offset these loads, and assist control for assisting the internal combustion engine E is executed so as to enable the internal combustion engine E to handle the sudden load increase. The load information generation part 251 and the assist characteristic determination part 252 function in order to execute this assist control.

The load information generation part 251 has a function of generating load information indicating the rotational load that is received by the internal combustion engine E or the power transmission shaft 230, based on input parameters that are taken from engine control information provided by the engine control unit 206 or from detection information output by various sensors. Exemplary input parameters used by the load information generation part 251 include the number of revolutions (revolution speed) of the internal combustion engine E, the number of rotations (rotation speed) of the power transmission shaft 230, engine torque calculated by the engine control unit 206, the torque of the power transmission shaft 230, vehicle speed, and the work state of the work device 209 (tilling depth, traction, force acting on the loader, etc.), although the input parameters that are actually used depend on the sensors provided in the work vehicle. Because a vehicle speed sensor and a rotation detection sensor of the power transmission shaft 230 are highly likely to be provided as standard, it is advantageous to use a vehicle speed variation value and a rotation speed variation value of the power transmission shaft 230 as input parameters. These input parameters are sent through a vehicle state detection unit S that processes signals from various sensors. The load information generation part 251, in order to detect a sudden increase in rotational load, may also generate load information indicating the sudden increase in rotational load based on the differential value or difference value of temporal rotational loads, but may also generate load information indicating an increase in rotational load that triggers assist control simply by threshold decision.

The assist characteristic determination part 252 determines the assist characteristics defining the assist amount and assist time period of assist control, based on the load information generated by the load information generation part 251, in order to execute assist control of the internal combustion engine E using the motor generator 204. The motor control unit 207 controls the motor generator 204 via the inverter part 270 based on the assist characteristics determined by the assist characteristic determination part 252. In order to prevent assist control from being executing continuously, the assist control prohibition determination part 253 prohibits execution of subsequent assist control for a prescribed time period after assist control has been executed, based on assist control information from the assist characteristic determination part 252.

The battery management part 254 calculates the charge amount of the battery B. At this time, if the battery B is constituted as an intelligent battery unit provided with a computer, the charge amount of the battery is calculated based on battery information from the battery B, and if this is not the case, the charge amount of the battery B is calculated based on battery information output from the vehicle state detection unit S after having received a signal from a battery state detection sensor. The assist control prohibition determination part 253 also has a function of prohibiting assist of the internal combustion engine E by the motor generator 204 in order to prevent a dead battery, if the charge amount of the battery B falls to less than a prescribed value, based on battery information.

The driving mode selection part 255 sets the constant speed control mode that maintains a constant number of revolutions and is used when running the work vehicle at a prescribed speed (cruising) and when performing work with the work device 209 which is utilized to perform work by taking rotational power of a constant number of revolutions off the PTO shaft 290. When this constant speed control mode has been set, the engine control unit 206 controls the engine control device 260 so as to maintain the internal combustion engine E at a set prescribed number of revolutions.

Figure 10:
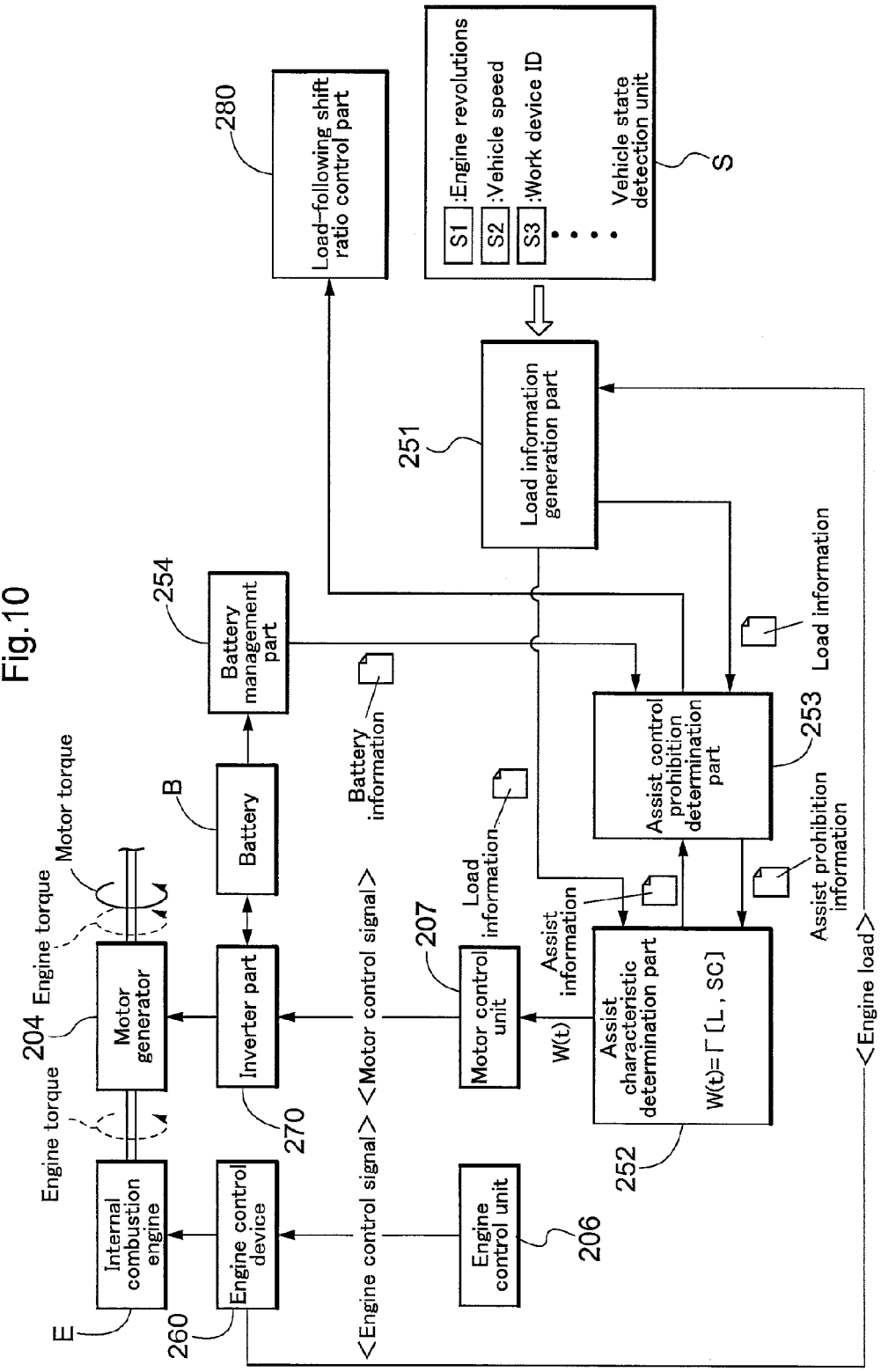
FIG. 10 is a schematic diagram showing the flow of data in a torque assist process.

The basic flow of information in assist control by the motor generator 204 is shown in FIG. 10. First, the engine control unit 206 sends an engine control signal that is based on a setting value set by an accelerator setting device to the engine control device 260. The amount of fuel injection and the like are adjusted based on this engine control signal, and the internal combustion engine E is driven. Because variation in number of the revolutions of the internal combustion engine E occurs due to variation in external factors, or in other words, variation in travel load, workload and the like, torque is increased by adjusting the amount of fuel injection and the like, so that an unexpected drop in the number of revolutions or engine stall due to the amount of load variation does not occur. However, because the rated output of the internal combustion engine E is keyed to the maximum torque normally required to perform work, the occurrence of an unexpected sudden load increase will culminate in a drop in revolutions or, in a worst case scenario, engine stall. In order to avoid this, the motor control unit 207 sends an assist signal to the inverter part 270 and assists the internal combustion engine E when there is a load increase, using the motor generator 204.

The load information generation part 251 generates load information that includes a load amount based on vehicle state information sent from the vehicle state detection unit S or engine state information sent from the engine control device 260, and sends the generated load information to the assist characteristic determination part 252. The battery management part 254 calculates the amount of charge (generally referred to as SOC) based on charge information from the battery B, and sends battery information including this charge amount to the assist characteristic determination part 252 and the assist control prohibition determination part 253.

The assist characteristic determination part 252 determines an appropriate assist characteristic W(t), based on a load amount L read out from the load information and a charge amount SC read out from the battery information. This assist characteristic is derived from the general equation W(t)=Γ[L, SC]. In other words, the assist characteristic can be represented with a graph for determining the temporal assist amount. In practice, a configuration in which a plurality of assist characteristics are mapped and stored and an optimal assist characteristic is selected based on the load amount L and charge amount SC is preferred.

When the assist characteristic has been determined, the motor control unit 207 generates an assist control signal based on this assist characteristic, performs drive control of the motor generator 204 through the inverter part 270, and compensates for the increase in load occurring on the power transmission shaft 230. Because the electric motor has high torque responsiveness, a drop in revolutions is thereby avoided, even when a sudden increase in travel load or workload occurs. The case where the load increase is sustained or where the charge amount of the battery B is low will be handled by adjusting the shift ratio of the transmission 210 as discussed later.

Note that, apart from assist control, the motor control unit 207 is able to control the motor generator 204 to function as a generator and charge the battery B, by sending a power generation instruction to the inverter part 270. Also, the motor generator 204 performs zero torque drive as a result of the motor control unit 207 sending a zero torque control signal to the inverter part 270.

A shift control unit 208 includes a load-following shift ratio control part 280 that executes load-following shift ratio control for changing the shift ratio so as to reduce an increased load on the internal combustion engine E. This load-following shift ratio control is executed after a short period of assist control has ended based on the assist characteristics, in order to handle an increase in load occurring on the internal combustion engine E. In other words, unless assist control is prohibited by the assist control prohibition determination part 253, assist control is executed prior to this load-following shift ratio control. The hunting phenomenon that arises in response to sudden load increases that occur frequently can thereby be avoided by load-following shift ratio control which has slow responsiveness compared with assist control. In order, however, to avoid continuous assist control, subsequent assist control is prohibited by the assist control prohibition determination part 253 for a prescribed time period after the end of assist control, in the case where the load increase is sustained.

Figure 11:
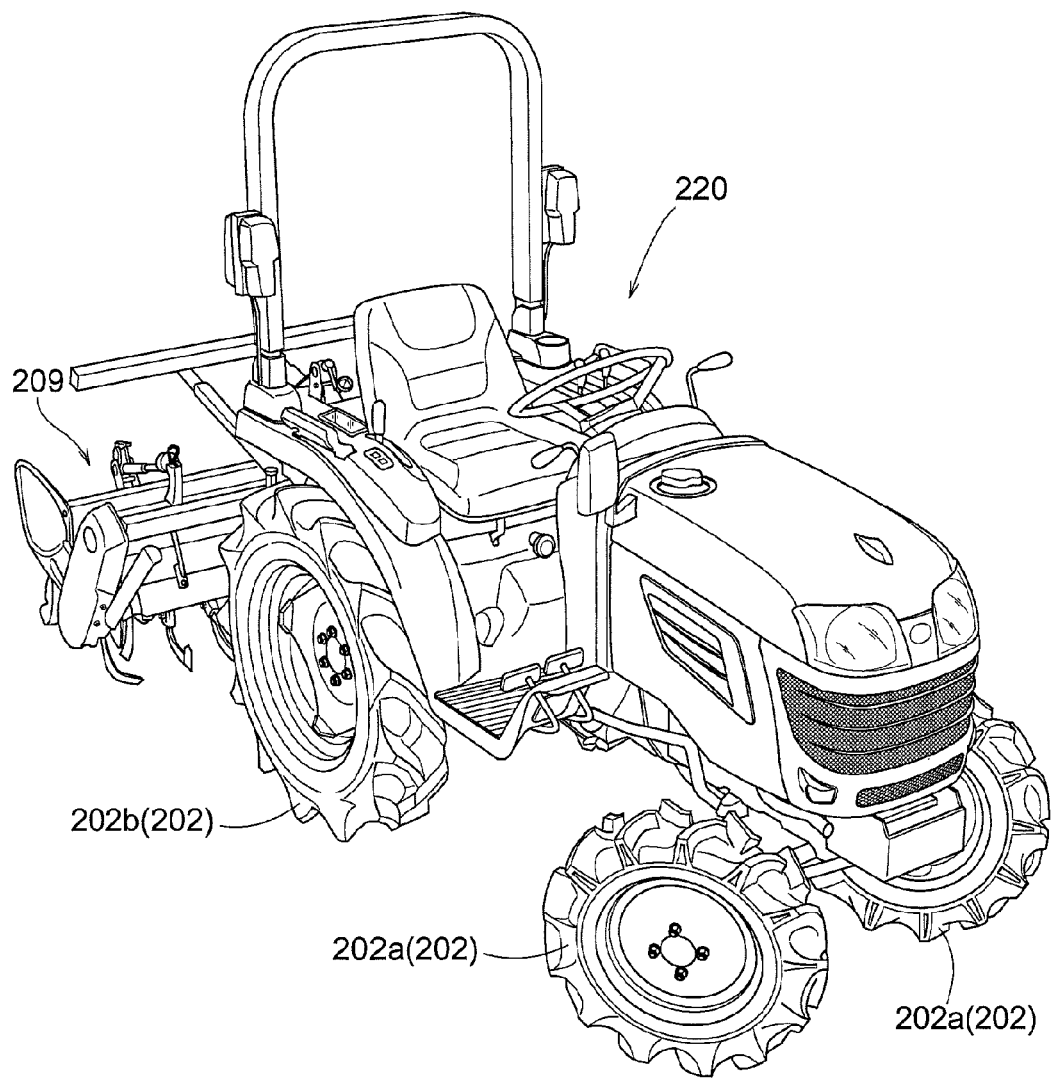
FIG. 11 is a perspective diagram of a general-purpose tractor serving as one embodiment of the hybrid work vehicle according to the present invention.
Figure 12:
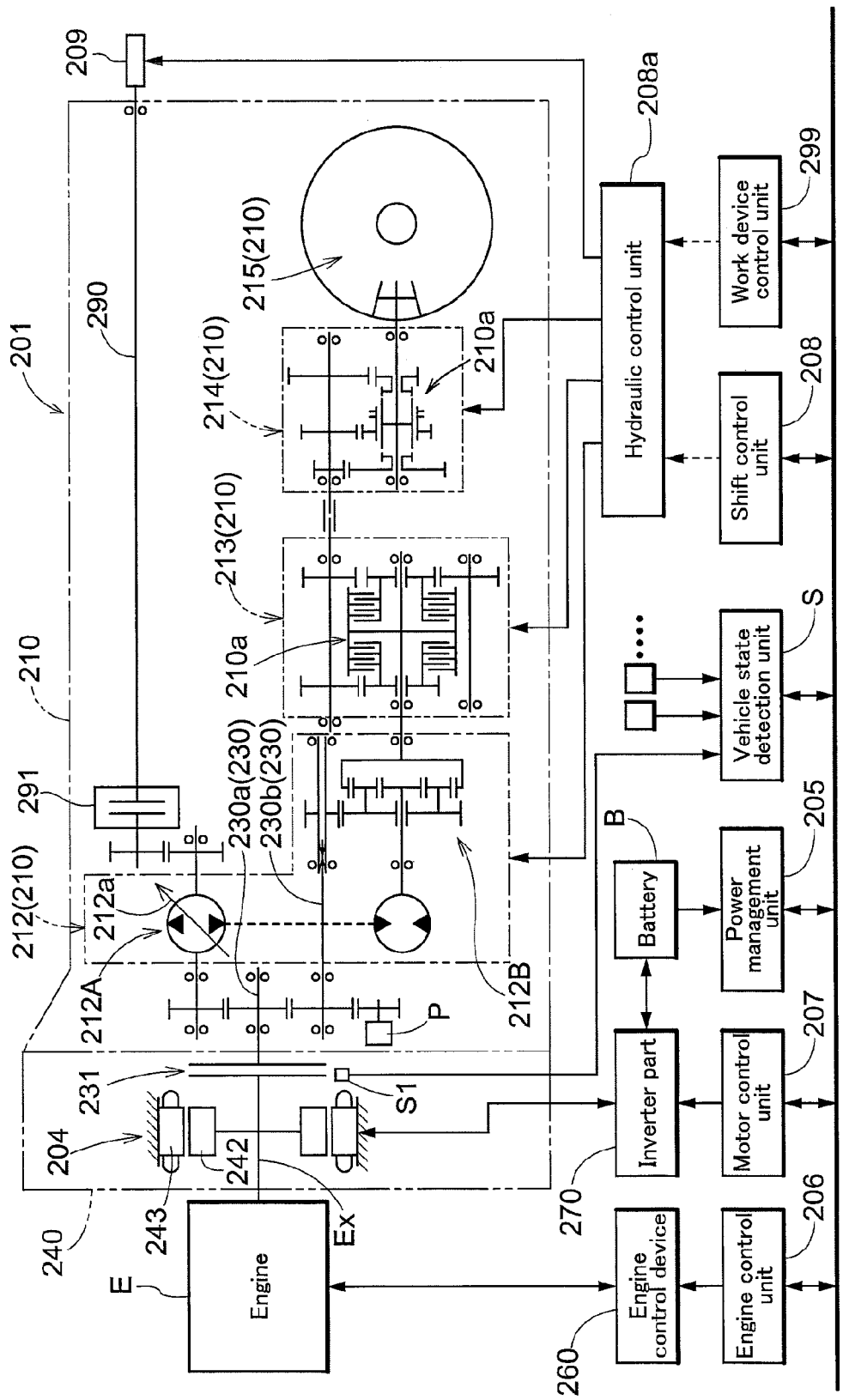
FIG. 12 is a functional block diagram schematically showing the power system of a tractor.

Next, a specific embodiment of the second embodiment of the present invention will be described. In this embodiment, the hybrid work vehicle is a general-purpose tractor having a well known form, such as shown in FIG. 11. The power system of this tractor is schematically shown in FIG. 12. The tractor body is provided with the internal combustion engine E, the motor generator 204, the hydraulically-actuated main clutch 231, the transmission 210, a driving part 220, a left and right pair of front wheels 202a and rear wheels 202b serving as the travel device 202, and the like. Furthermore, a tilling device is mounted as the work device 209 to a rear portion of the vehicle body by a lift mechanism. The lift mechanism operates using a hydraulic cylinder.

Figure 13:
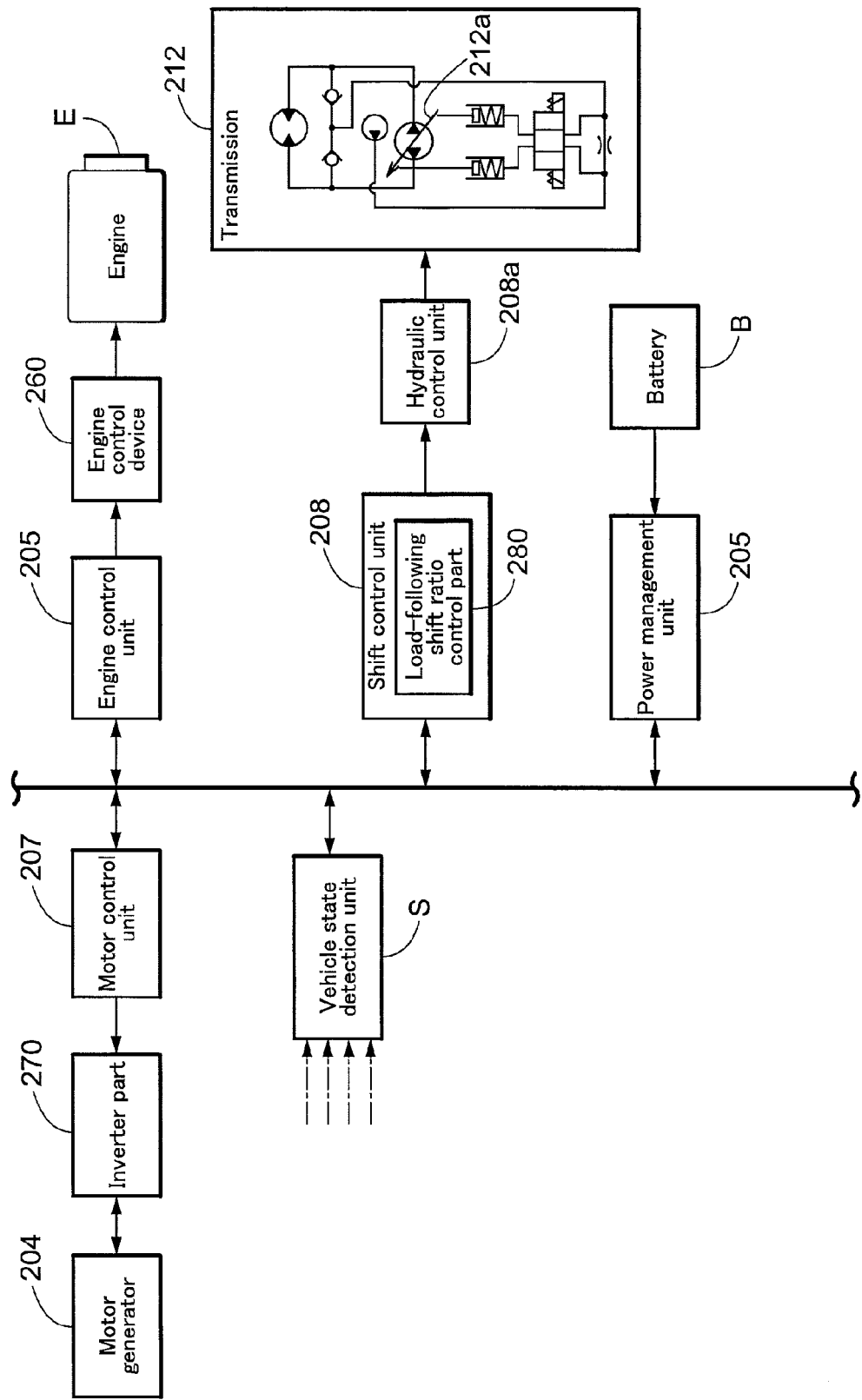
FIG. 13 is a functional block diagram of a power control system.

As schematically shown in FIGS. 12 and 13, the internal combustion engine E of this tractor is a diesel engine (hereinafter, engine E) whose revolutions are controlled with a common rail method, and is provided with a common rail control device as the engine control device 260. The transmission 210 includes a hydro-mechanical continuously variable transmission (hereinafter, HMT) 212, a forward-reverse switching device 213, a gear transmission 214 that performs multistep shifting, and a differential mechanism 215, and power therefrom is transmitted through the power transmission shaft 230 and ultimately rotates the drive wheels (either front wheels 202a or rear wheels 202b or both pairs of wheels) 202. The forward-reverse switching device 213 and the gear transmission 214 are each provided with a hydraulically-actuated shift clutch 210a. Furthermore, a tilling device 209 mounted to the tractor is able to receive rotational power through the PTO shaft 290 constituting a portion of the power transmission shaft 230 that transmits the rotational power of the engine E and the motor generator 204, and a tilling rotor is thereby rotationally driven at a prescribed tilling depth.

The HMT 212 is constituted by a hydrostatic shift mechanism 212A consisting of a swash plate 212a type variable discharge hydraulic pump that receives power from the engine E and the motor generator 204 and a hydraulic motor that is rotated by hydraulic power from the hydraulic pump and outputs power, and a planetary gear mechanism 212B. The planetary gear mechanism 212B is constituted so as to supply shift output thereof to the downstream power transmission shaft 230, with power from the engine E and the motor generator 204 and power from the hydraulic motor as inputs.

With this hydrostatic transmission mechanism 212A, as a result of power from the engine E and the motor generator 204 being input to a pump shaft, pressurized oil is supplied from the hydraulic pump to the hydraulic motor and the hydraulic motor is rotationally driven by hydraulic power from the hydraulic pump to rotate a motor shaft. The rotation of the hydraulic motor is transmitted to the planetary gear mechanism 212B through the motor shaft. With the hydrostatic shift mechanism 212A, the angle of the swash plate 212a of the hydraulic pump is changed by displacing a cylinder that is interlocked with the swash plate 212a, resulting in shifting to a forward rotation state, a reverse rotation state and a neutral state located between the forward rotation state and the reverse rotation state, and even in the case where there has been a shift to the forward rotation state or a shift to the reverse rotation state, the rotation speed of the hydraulic pump and the revolution speed (revolutions per unit time) of the hydraulic motor are steplessly changed. As a result, the rotation speed of power that is output from the hydraulic motor to the planetary gear mechanism 212B is changed steplessly. The hydrostatic shift mechanism 212A stops rotation of the hydraulic motor caused by the hydraulic pump, as a result of the swash plate 212a being positioned in the neutral state, and consequently stops output from the hydraulic motor to the planetary gear mechanism 212B.

The planetary gear mechanism 212B is provided with a sun gear, three planetary gears arranged so as to be distributed at equal intervals around the sun gear, a carrier that rotatably supports each planetary gear, a ring gear that engages with the three planet gears, and an output shaft (one power transmission shaft 230) joined to the forward-reverse switching device 213. Note that, in this embodiment, the carrier forms a gear portion that engages, on an outer periphery thereof, with an output gear attached to the power transmission shaft 230 on the engine E side, and is relatively rotatably supported by a boss portion of the sun gear.

As a result of the abovementioned configuration, the HMT 212 is able to steplessly shift transmission of power to the drive wheels, namely, the front wheels 202a or the rear wheels 202b or both pairs of wheels, by changing the angle of the swash plate 212a of the hydrostatic shift mechanism 212A. Control of the swash plate 212a is realized by hydraulic control of a hydraulic control unit 208a that operates based on control instructions from the shift control unit 208. Also, a hydraulic pump P serving as a hydraulic power source of hydraulic actuators such as the hydraulically-actuated cylinder, the main clutch 231 and the shift clutch 210a described above. This hydraulic pump P may employ a mechanical pump that receives rotational power from the power transmission shaft 230 or an electric pump that receives rotational power from an electric motor. In the case of the electric pump, the electric motor is controlled by the hydraulic control unit 208a.

While various control functions for performing a shift operation on the transmission 210 are built into the shift control unit 208, a function that is particularly related to the present invention is the function of executing load-following shift ratio control for changing the shift ratio so as to reduce an increased load on the internal combustion engine E. This function is built by the load-following shift ratio control part 280. Here, as shown in FIG. 13, the load-following shift ratio control part 280 changes the shift ratio by changing the angle of the swash plate 212a of the HMT 212.

Figure 9:
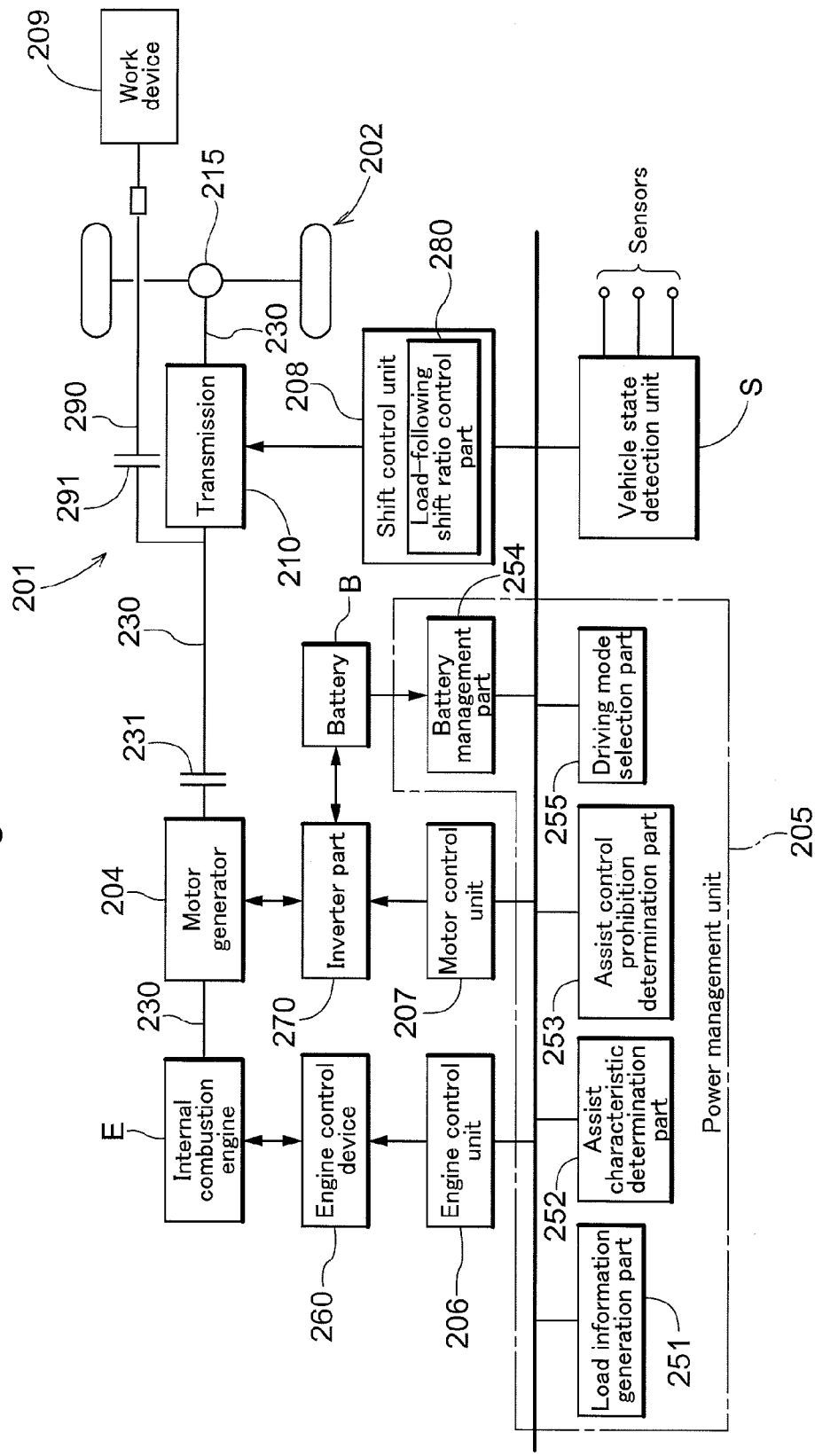
FIG. 9 is a diagram showing the basic configuration of a power system in a hybrid work vehicle according to a second embodiment of the present invention.

Control of the motor generator 204 in this power system, or in other words, torque assist provided to the engine E, is performed by the power management unit 205, although, here, the power management unit 205 appropriates the configuration described using FIGS. 9 and 10. The power management unit 205, the engine control unit 206 and the vehicle state detection unit S are also respectively connected by an in-vehicle LAN so as to enable data communication.

The vehicle state detection unit S inputs signals from various sensors disposed on the tractor and operation input signals indicating the state of operation devices (clutch pedal, brake pedal) that are operated by the driver, performs signal conversion or evaluation calculation when needed, and sends out the obtained signal or data to the in-vehicle LAN.

The shift control unit 208 for shifting the transmission 210 and the work device control unit 299 for operating the tilling device 209 are connected to the hydraulic control unit 208a as higher-level electronic devices for giving control instructions to the hydraulic control unit 208a. The shift control unit 208 and the work device control unit 299 are also connected to the in-vehicle LAN, and data exchange with other units is possible.

Figure 14:
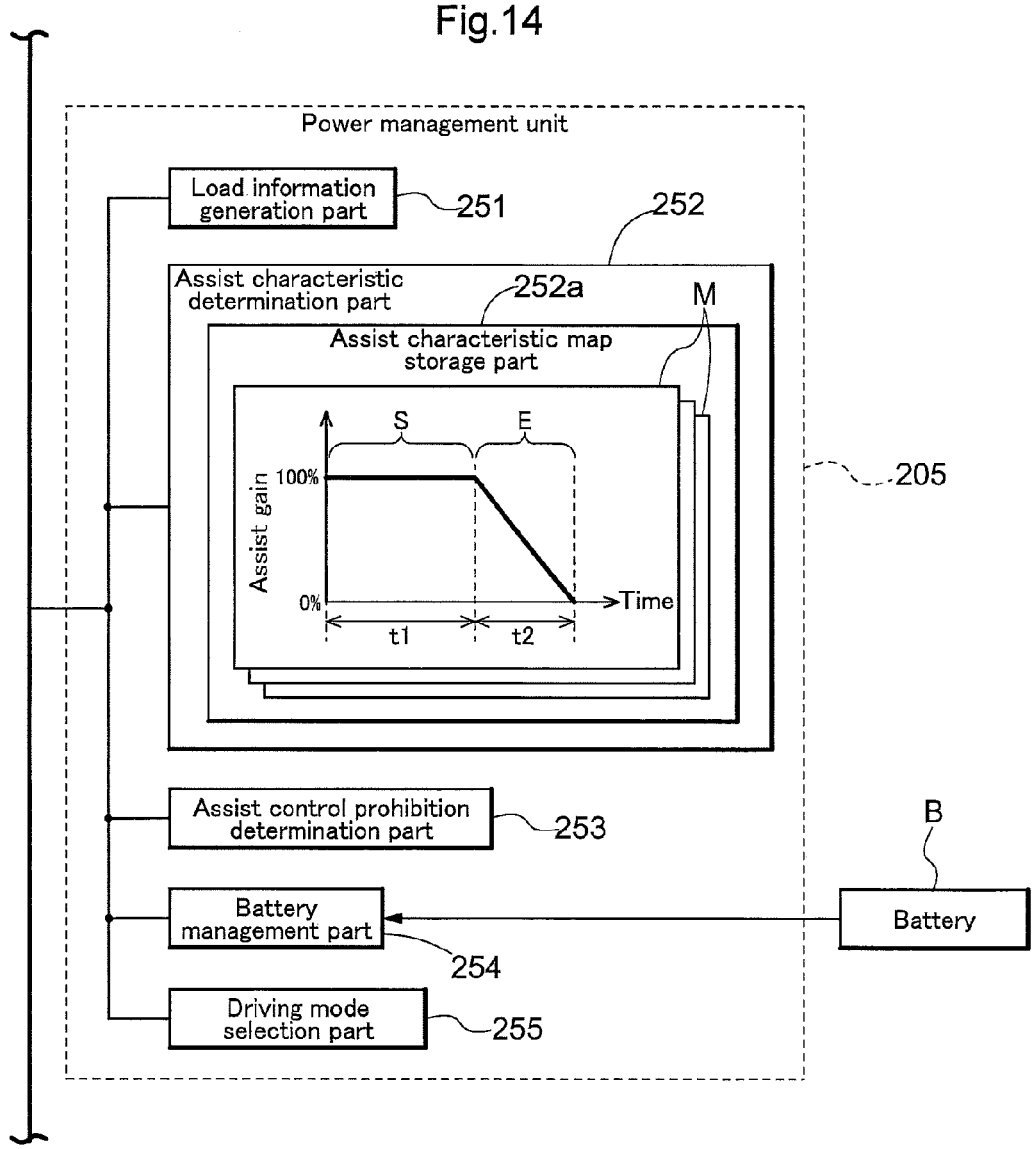
FIG. 14 is a functional block diagram of a power management unit.

As shown in FIG. 14, an assist characteristic determination part 252 is provided with an assist characteristic map storage part 252a. This assist characteristic map storage part 252a has a function of creating and storing in advance a plurality of assist characteristic maps M obtained by mapping assist characteristics, or creating and setting an appropriate assist characteristic map M when needed. As schematically illustrated, these assist characteristics can be represented with a graph for determining the temporal assist amount. In the example in FIG. 14, the horizontal axis is time and the vertical axis is assist gain. The assist gain is a percentage of the maximum assist amount (motor torque) that is calculated according to the load amount read out from the load information, and takes a value between 0% and 100%. In other words, the amount of assist by the motor generator 204 is, in practice, derived by multiplying the maximum assist amount by the assist gain obtained from the assist characteristic map M. The assist characteristics in this embodiment consist of assist characteristic area S in which a constant assist amount is maintained for a prescribed time period and an end assist characteristic area E in which the assist amount is reduced to zero over time. A time period t1 of the start assist characteristic area S is from 1.5 to 2.5 seconds, and preferably 2 seconds, and a time period t2 of the end assist characteristic area E is from 1.5 to 2.5 seconds, and preferably 2 seconds. In the illustrated assist characteristic map M, the assist gain in the start assist characteristic area S is constant at 100%, and in the end assist characteristic area E is linear. It should be obvious that any given shape can be employed for the decreasing trend thereof. It is also possible to employ a nonlinear graph in both the start assist characteristic area S and the end assist characteristic area E. The assist characteristic determination part 252 determines the optimal assist characteristic map M from the load amount read out from the load information and the charge amount read out from the battery information. In the other assist characteristic maps M, the assist gain in the start assist characteristic area S takes a value in a range of about 10% to less than 100%, and in the end assist characteristic area E various assist characteristics that serve as decreasing functions are shown. In other words, the assist amount that is actually produced by the motor generator 204 varies each time depending on either the load amount or the charge amount or both of these amounts. Note that continuous execution of assist control that is based on these assist characteristics is prohibited by the assist control prohibition determination part 253. The execution interval of assist control, or in other words, the prohibition period, may be changed depending on the charge amount of the battery B or may be determined in advance depending on the capacity of the battery B. This prohibition period may also be varied depending on the type of work. In either case, the prohibition period is set so as to not bring about an abrupt drop in the battery charge amount.

Figure 15:
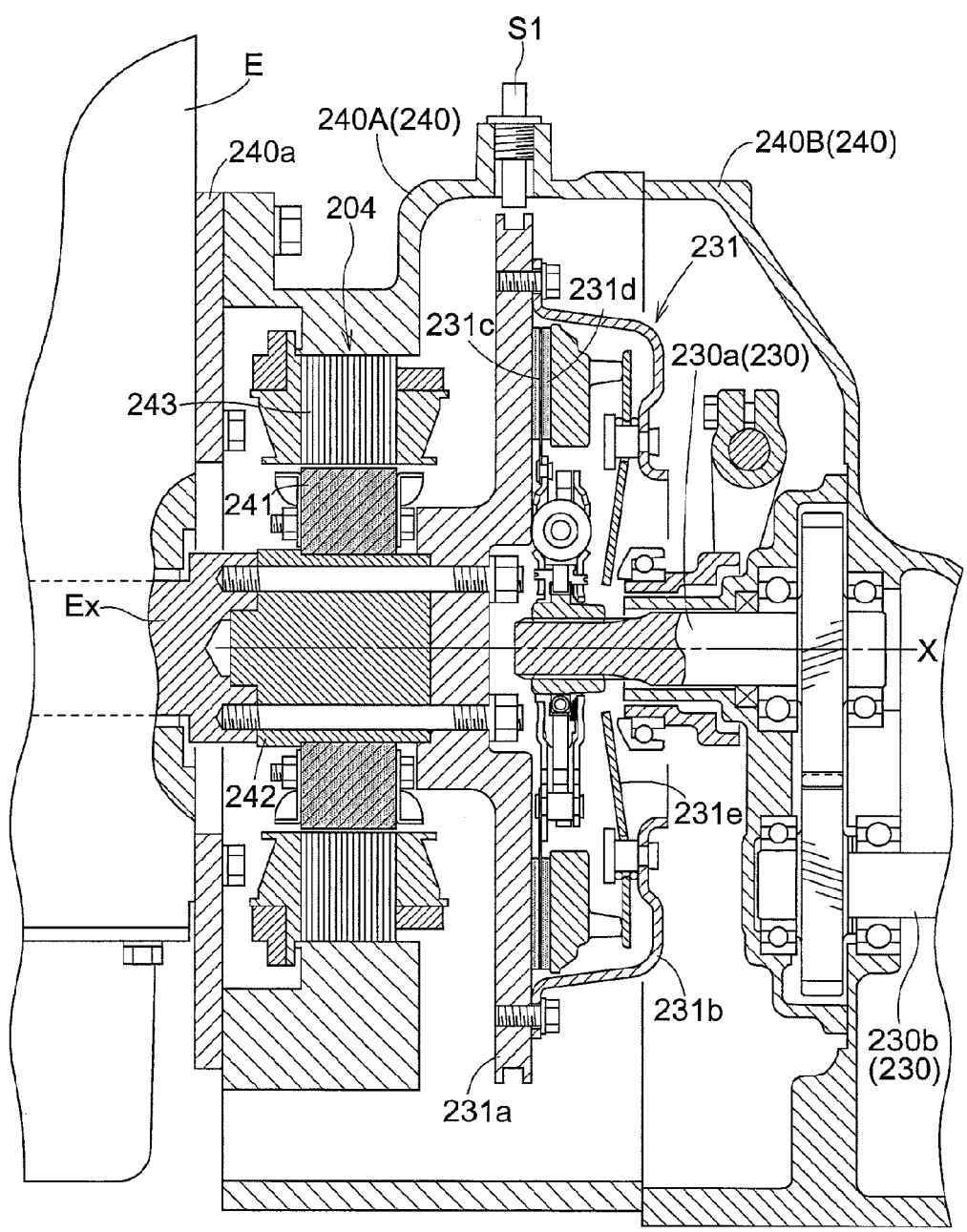
FIG. 15 is a cross-sectional view of a motor generator provided in the tractor.

As shown in FIG. 15, a motor housing 240 that houses the motor generator 204 and the main clutch 231 is provided on a rear surface side of the engine E. The motor generator 204 has both a function of a three-phase AC power generator that generates electric power using the drive power of the engine E, and a function of a three-phase AC motor that rotates using electric power supplied from outside. Accordingly, the inverter part 270 converts DC power from the battery B into three-phase AC power, and supplies the AC power to the motor generator 204. Also, the inverter part 270 converts three-phase alternating current generated by the motor generator 204 into direct current, boosts the DC voltage, and supplies the boosted DC voltage to the battery B.

As is clear from FIG. 15, the engine E, the motor generator 204 and the main clutch 231 are provided in this order, and the motor housing 240 is joined to a rear end plate 240a joined to a rear portion of the engine E, thereby housing the motor generator 204 and the main clutch 231 in the motor housing 240.

The motor generator 204 is constituted by a rotor 242 on an outer periphery of which is provided a permanent magnet 241, and a stator 243 arranged in a position surrounding the rotor 242, and the stator 243 has a structure in which a coil is wound around a plurality of teeth portions (not shown) of a stator core. The rotor 242 of the motor generator 204 is arranged facing a shaft end of an output shaft Ex (crankshaft) of the engine E, coaxially with a rotary shaft core X of this output shaft Ex, a base plate 231a of the main clutch 231 is arranged on the opposite surface of the rotor 242 to the output shaft Ex, and the output shaft Ex, the rotor 242 and the base plate 231a of the main clutch 231 are joined by being screwed together. This base plate 231a also function as a flywheel, although, as described above, the motor generator 204 partially executes the function of producing inertia force performed by a flywheel, allowing weight saving to be realized over the conventional art.

The motor housing 240 has a structure in which a front portion housing 240A and a rear portion housing 240B are separably joined, and when assembling the motor generator 204, this front portion housing 240A is joined to the rear end plate 240a in a state where the stator 243 is provided on an inner surface of the front portion housing 240A, and the rotor 242 is then joined to a rear end of the output shaft Ex.

The main clutch 231 is provided with a clutch disc 231c, a pressure plate 231d and a diaphragm spring 231e inside a clutch cover 231b that is joined to a rear surface of the base plate 231a, and a clutch shaft 230a that is one component of the power transmission shaft 230 and to which drive power from the clutch disc 231c is conveyed, and is operated by a clutch pedal that is not illustrated.

The clutch shaft 230a is rotatably supported about the rotary shaft core X relative to the rear portion housing 240B, the clutch disc 231c is supported in a manner that enables transmission of torque to the clutch shaft 230a using a spline structure and displacement along the rotary shaft core X, and the diaphragm spring 231e has a configuration in which a biasing force in a clutch-on direction acts on the clutch disc 231c via the pressure plate 231d. Also, power from the clutch shaft 230a is conveyed to an intermediate transmission shaft 230b constituting one component of the power transmission shaft 230 and serving as an input shaft of the transmission 210 via a gear transmission mechanism.

Drive control of the engine E and the motor generator 204 is performed by the power management unit 205, as described using FIG. 9. In order to control fuel injection by a common rail fuel injection device serving as the engine control device 260, the engine control unit 206 acquires the signal from an accelerator sensor, an engine revolution signal, a common rail fuel pressure signal, an intake pressure signal of an intake site and the like, and performs control for determining the operation timing of an injector. Such a configuration also enables the engine control unit 206 to calculate the load factor (engine load factor) of the engine E. The load information generation part 251 is also able to use this engine load factor for performing assist control.

The load information generation part 251 is also able to utilize the variation in the number of revolutions (revolution speed) of the power transmission shaft 230, in order to detect an increase in rotational load received by the engine. In such cases, a rotation speed sensor S1 that detects the number of rotations of the number of rotations of the power transmission shaft 230 is, in this embodiment, inserted into a hole passing through the wall surface of the motor housing 240, with a sensing portion at the lower end positioned near the outer periphery of the base plate 231a of the main clutch 231. In other words, the rotation speed sensor S1 is constituted as pickup sensor that counts the rotations of the base plate 231a based on the change in magnetic flux density. It should be obvious that an optical sensor may be employed as the rotation speed sensor S1, or that a configuration that detects the number of rotations of the power transmission shaft 230 may be employed.

Given that the battery B installed in the tractor has limited capacity, and that torque assist during work travel demands considerable power consumption, the charge amount of the battery B soon runs out when assist control is repeatedly executed when performing work. In order to avoid this, assist by the motor generator 204 is executed while taking into account the charge amount of the battery B.

For this reason, in this embodiment, the assist control prohibition determination part 253 determines whether to permit or prohibit assist control, based on the load amount (engine load factor, amount of reduction in revolutions) included in the load information generated by the load information generation part 251 and the charge amount included in the battery information sent from the battery management part 254. An example of a determination map that is used at this time is shown in FIG. 8. What can be understood from this determination map is that essentially assist control will not be performed unless there is sufficient charge. For example, assuming that the assist determination line is a charge amount of about 80%, torque assist is not executed when the charge amount is at or below this line so as to avoid exhausting the battery B. However, because the possibility of engine stall arises if the engine load factor approaches 100%, assist control is permitted even at charge amounts of 80% or less. At this time, the assist determination line slopes from an engine load factor of 90% to 100%, that is, assist control is permitted the higher the engine load factor after a prescribed engine load factor (here, not less than approx. 90%) even in a state where the charge amount is low. At an engine load factor of 100%, assist control is permitted even if the charge amount is about 30%. In this determination map, the assist determination line is band-like in shape, and the area above the upper boundary line of the assist determination line is an assist drive area where assist control is permitted. The area below the lower boundary line of the assist determination line is a charge drive area. Furthermore, the assist determination band bounded by the upper boundary line and the lower boundary line of the assist determination line is a buffer area in which neither assist control nor charging is performed, and in this embodiment this buffer area is used as a zero torque drive area in which zero torque drive control is performed. Assistant control is prohibited in the charge drive area and the zero torque drive area.

Other Embodiments of the Second Embodiment (1) In the abovementioned embodiment, the number of engine revolutions or the number of transmission shaft rotations was utilized in order to detect the load acting on the engine E. However, a load detection sensor may be provided directly to the work device 209, and whether to permit or prohibit assist control may be determined using the load detection signal from this sensor.

(2) In the above embodiment, the engine E and the motor generator 204 are directly joined, the main clutch 231 is mounted to the rear thereof, and power is transmitted to the power transmission shaft 230. However, the main clutch 231 may alternatively be mounted between the engine E and the motor generator 204.

(3) In the above embodiment, stepless shifting using the HMT 212 for the transmission 210 was employed, but multistep shifting using a multistep gear transmission may be employed.

(4) A configuration may be employed in which individual assist characteristics respectively optimized for the type of work device 209 and the type of usage thereof may be created in advance as assist characteristics, and appropriately selected. For example, a work device type detection part for detecting the type of work device 209 that is mounted to the work vehicle or a manual work device type setting part is provided, and the type of work device 209 that is actually mounted for use is provided to the assist characteristic determination part 252 as an auxiliary parameter. The assist characteristic determination part 252 can thereby determine appropriate assist characteristics depending on the type of work device used.

(5) In the abovementioned embodiment, electrical assist by motor assist control and mechanical assist by load-following shift ratio control are selectively executed, but electrical assist by motor assist control and mechanical assist by load-following shift ratio control may be executed simultaneously at a prescribed assist ratio. Furthermore, in the case of performing assist control so as to transition from motor assist control to load-following shift ratio control, mixed control for decreasing the assist ratio of motor assist control and increasing the assist ratio of load-following shift ratio control is favorable.

Third Embodiment

Prior to specifically describing a third embodiment of the present invention, the basic flow of the basic flow of engine revolution reduction processing and motor assist processing at the time of energy saving driving according to the present invention will be described using the schematic diagram of FIG. 16.

Figure 16:
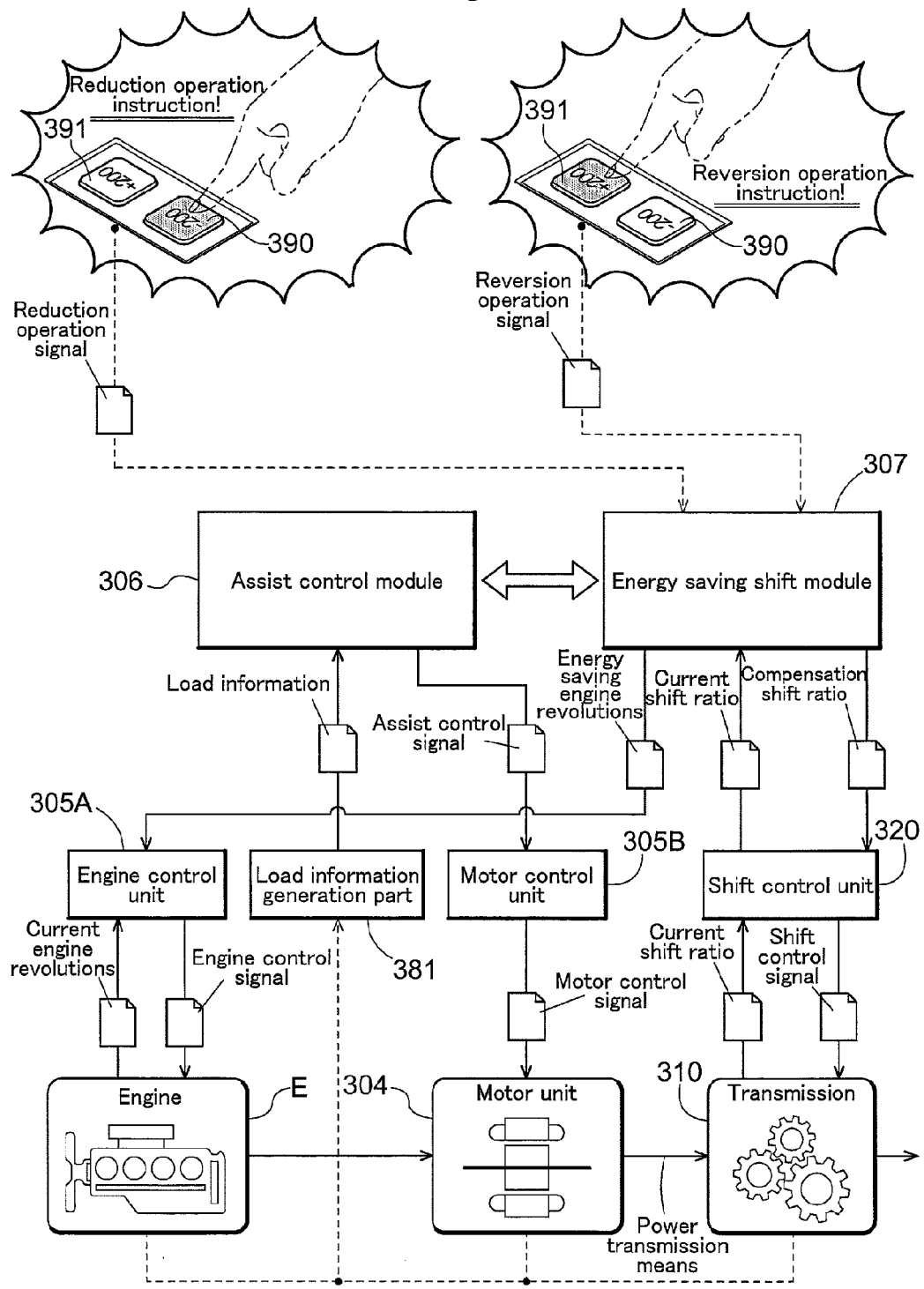
FIG. 16 is a schematic diagram showing the basic flow of power control at the time of energy saving driving of a hybrid vehicle according to a third embodiment of the present invention.

FIG. 16 illustrates the flow of control for reducing engine revolutions and changing the shift ratio to maintain the speed of the vehicle (hereinafter, simply "vehicle speed"), triggered by a spontaneous operation input by the driver (here, operation of an engine revolution reduction button 390 serving as an energy saving button). When the driver wants to reduce engine revolutions in order to implement energy saving driving, for example, at the time of operating the work vehicle and carrying out tilling work at a constant speed, he or she presses the engine revolution reduction button 390 (hereinafter, simply "reduction button"). Note that although "−200" indicating a 200 rpm reduction in revolutions is depicted on the operation surface of the button in the diagram, this value is merely an example. A reduction operation signal serving as a reduction operation instruction is output to an energy saving shift module 307, as a result of the reduction button 390 being operated. This energy saving shift module 307 generates a revolution reduction instruction and a shift ratio change instruction, triggered by the reduction operation instruction. The revolution reduction instruction is an instruction for requesting an engine control unit 305A to perform control so as to achieve an energy saving number of engine revolutions obtained by reducing the current number of engine revolutions by a prescribed number of engine revolutions set in advance based on the current number of engine revolutions. The shift ratio change instruction is an instruction for requesting a shift control unit 320 to perform control such that a transmission 310 creates a shift ratio, that is, a compensation shift ratio, for maintaining the current vehicle speed by compensating for the reduction in vehicle speed brought about by the reduction in engine revolutions performed in order to implement energy saving driving, based on the current shift ratio of the transmission 310.

Energy-saving processing for outputting the revolution reduction instruction and the shift ratio change instruction can be executed a plurality of times. In other words, the revolution reduction instruction and the shift ratio change instruction are output whenever the driver presses the engine revolution reduction button 390, resulting in engine revolutions that decrease in a stepwise manner being created, and vehicle speed being kept substantively unchanged by changing the shift ratio of the transmission 310 each time.

FIG. 16 also shows the flow of assist control of the engine E by a motor unit 304 in order to handle sudden increases in engine load (rotational load) that occur during energy saving driving in which the number of engine revolutions is reduced to the maximum extent possible. Note that, in the following description, the motor unit 304 is constituted as a motor generator that also functions also as a generator for charging the battery, and will thus be referred to below as the motor generator 304. A sudden increase in rotational load that occurs during energy saving driving leads to a reduction in the revolutions of the engine E, or in other words, a drop in vehicle speed, and further leads to engine stall. Particularly in the case of a work vehicle that work travels at a constant vehicle speed, the engine E is frequently operated in the constant speed control mode, at which time situations arise where an abrupt load is placed on the power transmission means depending on work conditions and ground surface conditions, resulting in the revolutions of the engine E being reduced. A reduction in engine revolutions leads to a drop in vehicle speed and a shortage of drive power for the work device. In order to avoid this, the rotational load placed on the engine E and the power transmission means for transmitting engine power is detected, and the engine E is assisted by driving the motor generator 304 for a short time to at least partially compensate for the load. This is assist control of the engine E by the motor generator 304.

A load information generation part 381 and an assist control module 306 function in order to perform this assist control. The load information generation part 381 has a function of generating load information indicating the rotational load that is received by the engine E or the power transmission means which is constituted by a power transmission shaft and the transmission 310, based on input parameters that are taken from engine control information provided by the engine control unit 305A or from detection information output by various sensors. Exemplary input parameters that are used by the load information generation part 381 include the number of revolutions (revolution speed) of the engine E, the number of rotations (rotation speed) of the power transmission means, engine torque calculated by the engine control unit 305A, the torque of the power transmission means, vehicle speed, and the work state of a work device W (tilling depth, traction, force acting on the loader, etc.), although the input parameters that are actually used depend on the sensors provided in the work vehicle. Because a vehicle speed sensor and a rotation detection sensor of the power transmission shaft are highly likely to be provided as standard, it is advantageous to use a vehicle speed variation value and a rotation speed variation value of the power transmission means as input parameters. These input parameters are sent through a vehicle state detection unit that processes signals from various sensors. The load information generation part 381, in order to detect a sudden increase in rotational load, may also generate load information indicating the sudden increase in rotational load based on the differential value or difference value of temporal rotational loads, but may also generate load information indicating an increase in rotational load that triggers assist control simply by threshold decision.

The assist control module 306 determines whether to execute assist control of the engine E using the motor generator 304, based on the load information generated by the load information generation part 381. For example, in the case where the battery charge amount is a prescribed value or less, assist control is terminated or partially executed. Furthermore, execution of subsequent assist control is prohibited for a prescribed time period after assist control has been executed. Furthermore, the assist control module 306 determines the assist characteristics defining the assist amount and assist time period of assist control, based on the load information generated by the load information generation part 381. Furthermore, the assist control module 306 outputs an assist control signal to a motor control unit 305B based on the determined assist characteristics. The motor control unit 305B outputs a motor control signal based on the assist control signal and controls the motor generator 304.

If the driver feels that a vehicle is travelling unstably in the case where assist control by the motor generator 304 is prohibited or can only be partially executed, the energy saving processing that was being performed in a stepwise manner need to be undone step-by-step. The control flow of reversion processing that is performed for this purpose is also shown in FIG. 16. Here, the number of engine revolutions reduced in order to implement energy saving driving is reverted to the original number of engine revolutions in a stepwise manner, and the speed of the vehicle (hereinafter, simply "vehicle speed") is maintained by changing the shift ratio, triggered by a spontaneous operation input by the driver (here, operation of an engine revolution reduction reversion button 391 serving as an energy saving button). In the case where engine reduction processing for energy saving driving is implemented over a number of steps, first, the engine revolution reduction reversion button (hereinafter, simply "reversion button") 391 is pressed. Note that although "−200" indicating a 200 rpm reduction in revolutions is depicted on the operation surface of the button in the diagram, this value is merely an example. A reversion operation signal serving as a reversion operation instruction is output to the energy saving shift module 307 as a result of the reversion button 391 having been operated. The energy saving shift module 307 generates a new revolution reduction instruction and a new shift ratio change instruction, triggered by the reversion operation instruction. The revolution reduction instruction as referred to here is an instruction indicating a reduction from the number of engine revolutions serving as a standard number of engine revolutions in initial energy saving processing, and is, substantively, for increasing the current number of engine revolutions. As a result of this revolution reduction instruction being given to the engine control unit 305A, the amount by which the number of engine revolutions was reduced in the corresponding iteration of the energy saving processing is cancelled, and the number of engine revolutions substantively increases. At the same time, a shift ratio, that is, a compensation shift ratio, for maintaining vehicle speed by compensating for the change in engine revolutions arising from cancellation of the reduction in engine revolutions and, consequently, the increase in vehicle speed brought about by the increased number of engine revolutions needs to be created. The shift ratio change instruction is an instruction for requesting the shift control unit 320 to perform control such that the compensation shift ratio is created by the transmission 310 for this purpose. This reversion processing is executable for however many iterations of the energy saving processing were performed based on the reference number of engine revolutions.

The abovementioned basic flow of information in assist control by the motor generator 304 will be described in more detail using FIG. 17. First, the engine control unit 305A sends an engine control signal that is based on a setting value set by an accelerator setting device to an engine control device 350. The amount of fuel injection and the like are adjusted based on this engine control signal, and the engine E is driven. Because variation in the number of revolutions of the engine E occurs due to variation in external factors, or in other words, variation in travel load, workload and the like, torque is increased by adjusting the amount of fuel injection and the like, so that an unexpected drop in the number of revolutions or engine stall due to the amount of load variation does not occur. However, because the rated output of the engine E is keyed to the maximum torque normally required to perform work, the occurrence of an unexpected sudden load increase will culminate in a drop in revolutions or, in a worst case scenario, engine stall. In order to avoid this, the motor control unit 305B sends an assist signal to the inverter part 351 and assists the engine E at the time of a load increase, using the motor generator 304.

The load information generation part 381 generates load information that includes a load amount based on vehicle state information sent from a vehicle state detection unit 309 or engine state information sent from the engine control device 350, and sends the generated load information to the assist characteristic determination part 361. The battery management part 354 calculates the amount of charge (generally referred to as SOC) based on charge information from the battery B, and sends battery information including this charge amount to the assist control module 306. Here, the assist control module 306 is provided with the assist characteristic determination part 361 and an assist control determination part 362 as two functional blocks.

The assist characteristic determination part 361 determines an appropriate assist characteristic W(t), based on a load amount L read out from the load information and a charge amount SC read out from the battery information. This assist characteristic is derived from the general equation W(t)=Γ[L, SC]. In other words, the assist characteristic can be represented with a graph for determining the temporal assist amount. In practice, a configuration in which a plurality of assist characteristics are mapped and stored and an optimal assist characteristic is selected based on the load amount L and the charge amount SC is preferred.

When the assist characteristic has been determined, the motor control unit 305B generates an assist control signal based on this assist characteristic, performs drive control of the motor generator 304 through the inverter part 351, and compensates for the increase in load occurring on the engine E or the power transmission means. Because the electric motor has high torque responsiveness, a drop in revolutions is thereby avoided, even when a sudden increase in travel load or workload occurs. The case where the load increase is sustained or where the charge amount of the battery B is low will be handled by adjusting the shift ratio of the energy saving shift module 307 as discussed later.

Note that, apart from assist control, the motor control unit 305B is able to control the motor generator 304 to function as a generator and charge the battery B, by sending a power generation instruction to the inverter part 351. Also, the motor generator 304 performs zero torque drive as a result of the motor control unit 305B sending a zero torque control signal to the inverter part 351.

Figure 18:
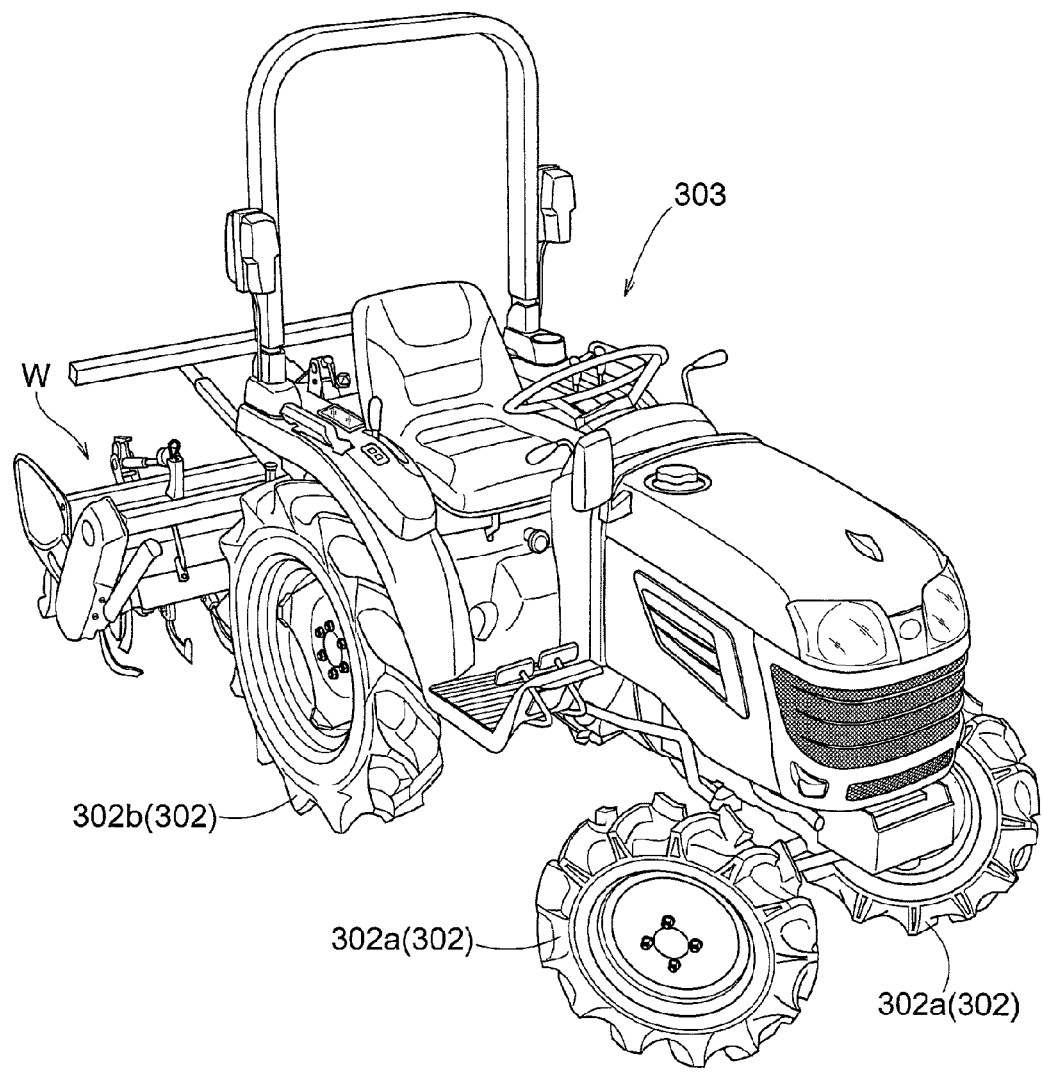
FIG. 18 is a perspective diagram of a tractor equipped with a shift control system according to the third embodiment of the present invention.
Figure 20:
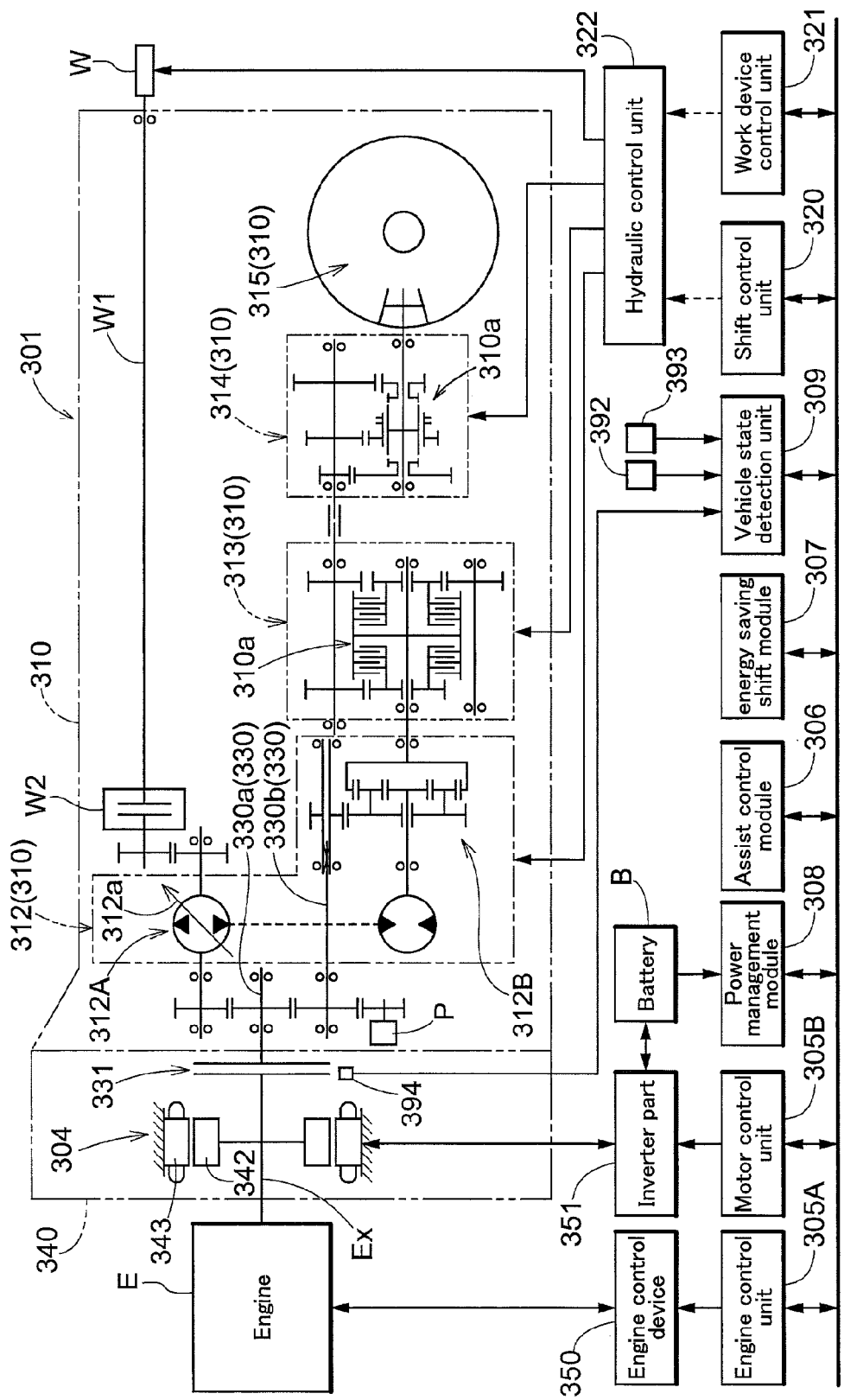
FIG. 20 is a functional block diagram schematically showing the power system of the tractor.

Next, a specific embodiment of the third embodiment of the present invention will be described. In this embodiment, the hybrid vehicle is a general-purpose tractor having a well known form, such as shown in FIG. 18. The power system of this tractor is schematically shown in FIG. 20. The tractor body is provided with the engine E, the motor generator 304, an hydraulically-actuated main clutch 331, the transmission 310, a driving part 303, a left and right pair of front wheels 302a and rear wheels 302b serving as a travel device 302, and the like. Furthermore, a tilling device is mounted as the work device W to a rear portion of the vehicle body by a lift mechanism. The lift mechanism operates using a hydraulic cylinder.

As schematically shown in FIG. 20, the engine E of this tractor is a diesel engine whose revolutions are controlled with a common rail method, and is provided with a common rail control device as the engine control device 350. The transmission 310 includes a hydro-mechanical continuously variable transmission (hereinafter, HMT) 312, a forward-reverse switching device 313, a gear transmission 314 that performs multistep shifting, and a differential mechanism 315, and power therefrom is transmitted through a power transmission shaft 330 and ultimately rotates the drive wheels (front wheels 302a or rear wheels 302b, or both pairs of wheels) 2. The forward-reverse switching device 313 and the gear transmission 314 are each provided with a hydraulically-actuated shift clutch 310a. Furthermore, a tilling device W mounted to the tractor is able to receive rotational power through a PTO shaft W1 constituting a portion of the power transmission shaft 330 that transmits the rotational power of the engine E and the motor generator 304, and a tilling rotor is thereby rotationally driven at a prescribed tilling depth.

The HMT 12 is constituted by a hydrostatic shift mechanism 312A consisting of a swash plate type variable discharge hydraulic pump that receives power from the engine E and the motor generator 304 and a hydraulic motor that is rotated by hydraulic power from the hydraulic pump and outputs power, and a planetary gear mechanism 312B. The planetary gear mechanism 312B is constituted so as to supply shift output thereof to the downstream power transmission shaft 330, with power from the engine E and the motor generator 304 and power from the hydraulic motor as inputs.

With this hydrostatic transmission mechanism 312A, as a result of power from the engine E and the motor generator 304 being input to a pump shaft, pressurized oil is supplied from the hydraulic pump to the hydraulic motor, and the hydraulic motor is rotationally driven by hydraulic power from the hydraulic pump to rotate a motor shaft. The rotation of the hydraulic motor is transmitted to the planetary gear mechanism 312B through the motor shaft. With the hydrostatic shift mechanism 312A, the angle of a swash plate 312A of the hydraulic pump is changed by displacing a cylinder that is interlocked with the swash plate 312a, resulting in shifting to a forward rotation state, a reverse rotation state and a neutral state located between the forward rotation state and the reverse rotation state, and even in the case where there has been a shift to the forward rotation state or a shift to the reverse rotation state, the rotation speed of the hydraulic pump and the revolution speed (revolutions per unit time) of the hydraulic motor are steplessly changed. As a result, the rotation speed of power that is output from the hydraulic motor to the planetary gear mechanism 312B is changed steplessly. The hydrostatic shift mechanism 312A stops rotation of the hydraulic motor caused by the hydraulic pump, as a result of the swash plate 312a being positioned in the neutral state, and consequently stops output from the hydraulic motor to the planetary gear mechanism 312B.

The planetary gear mechanism 312B is provided with a sun gear, three planetary gears arranged so as to be distributed at equal intervals around the sun gear, a carrier that rotatably supports each planetary gear, a ring gear that engages with the three planet gears, and an output shaft (one power transmission shaft 330) joined to the forward-reverse switching device 313. Note that, in this embodiment, the carrier forms a gear portion that engages, on an outer periphery thereof, with an output gear attached to the power transmission shaft 330 on the engine E side, and is relatively rotatably supported by a boss portion of the sun gear.

As a result of the abovementioned configuration, the HMT 12 is able to steplessly shift transmission of power to the drive wheels, namely, the front wheels 302a or the rear wheels 302b or both pairs of wheels, by changing the angle of the swash plate 312a of the hydrostatic shift mechanism 312A. Control of the swash plate 312a is realized by hydraulic control of a hydraulic control unit 322 that operates based on control instructions from the shift control unit 320. Also, a hydraulic pump P serving as a hydraulic power source of hydraulic actuators such as the hydraulically-actuated cylinder, the main clutch 331 and the shift clutch 310a described above. This hydraulic pump P may employ a mechanical pump that receives rotational power from the power transmission shaft 330 or an electric pump that receives rotational power from an electric motor. In the case of the electric pump, the electric motor is controlled by the hydraulic control unit 322.

Various control functions for performing a shift operation on the transmission 310 based on a shift operation instruction given by a shift operation implement and a shift ratio adjustment instruction from the energy saving shift module 307 are built into the shift control unit 320. A function particularly related to the present invention adjusts the shift ratio by changing the angle of the swash plate 312a of the HMT 312, based on instructions from the energy saving shift module 307.

Figure 19:
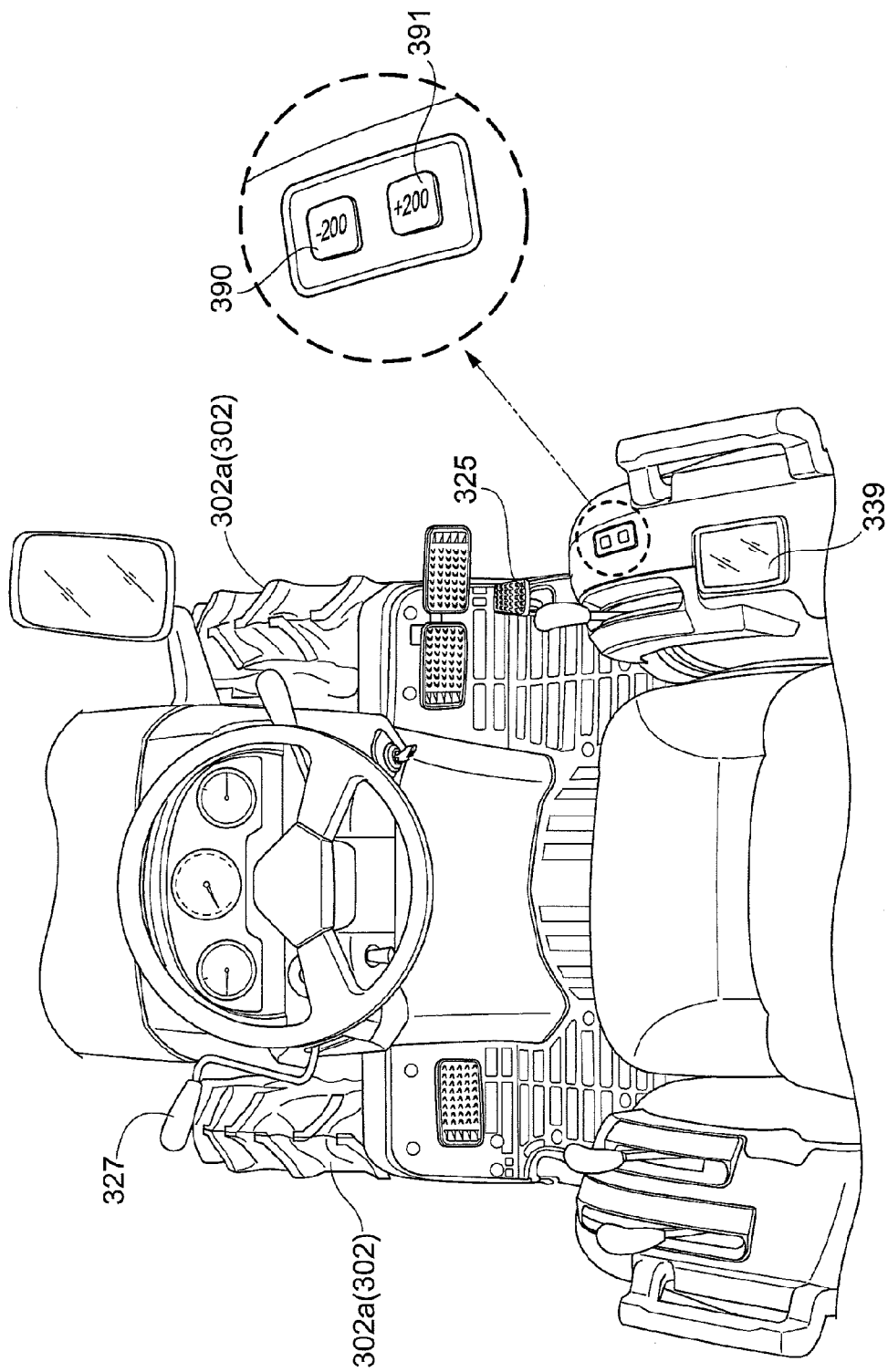
FIG. 19 is an overhead view of a driver's seat including various operation devices provided in a driving part of the tractor.

Shift control is possible with both an operation signal input by an intentional operation and an operation signal input generated mechanically, with a change pedal 325 that functions as a shift operation implement for intentional input being disposed on the floor on the right side of a driving operation area. This change pedal 325 can be held at any given position for travelling at constant vehicle speed. Also, the driving operation area, as previously described, is provided with the engine revolution reduction button 390, the engine revolution reversion button 391 and a shift lever 327 serving as operation devices that send out operation instructions as a result of operations by the driver in order to adjust the number of engine revolutions. The engine revolution reduction button 390 and the engine revolution reversion button 391 are, in this embodiment as shown in FIG. 19, provided together with a display 339 on a side panel covering an upper portion of a rear wheel fender, but may be provided on a left side panel, the steering wheel, a front panel forward of the steering wheel, or the like.

Figure 17:
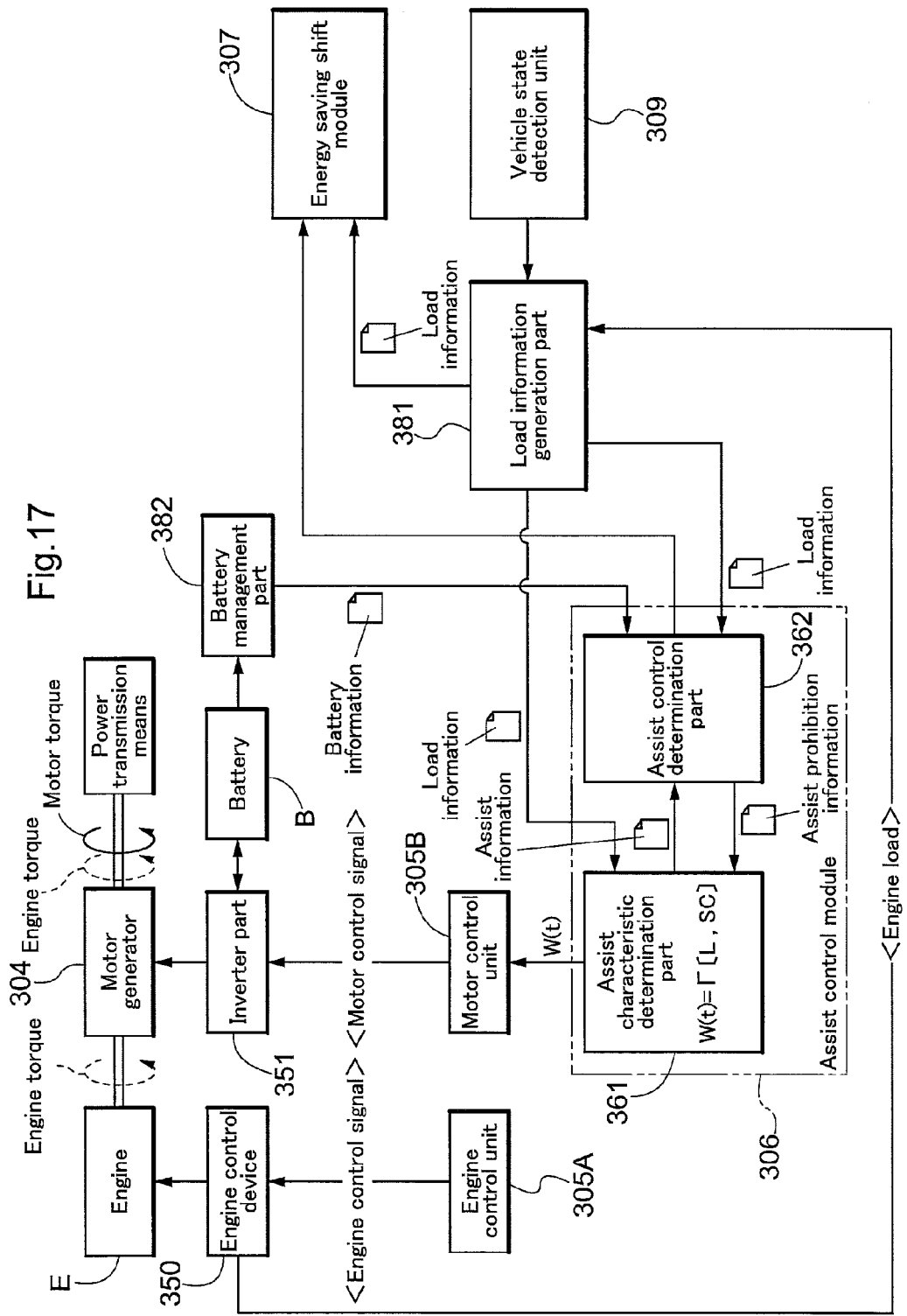
FIG. 17 is a schematic diagram showing the basic flow of assist control.

Control of the motor generator 304 in this power system, or in other words, assist control to the engine E, is performed by the assist control module 306, with this assist control module 306, here, appropriating the configuration described using FIG. 17. The aforementioned load information generation part 381 and a battery management part 382 are built into a power management module 308. In this embodiment, various control units, called ECUs, such as the engine control unit 305A, the motor control unit 305B, the assist control module 306, the energy saving shift module 307, the power management module 308, the vehicle state detection unit 309, the shift control unit 320, and the work device control unit 321 for operating the work device W, are respectively connected by in-vehicle LAN so as to enable data communication. It should be obvious that although it is possible to freely integrate or further partition the various control units that are here formed in a partitioned configuration, the configuration in this embodiment gives priority to ease of understanding of the description given in the present invention, and this is not intended to limit the invention.

The vehicle state detection unit 309 inputs signals from various sensors disposed on the tractor and operation input signals indicating the state of operation devices that are operated by the driver, performs signal conversion or evaluation calculation when needed, and sends out the obtained signal or data to the in-vehicle LAN. Sensors particularly related to the present invention include the engine revolution reduction button 390 and the engine revolution reversion button 391 that were described earlier, a pedal sensor 392 that generates the amount of shift operation (here, swing angle) that occurs as a result of the change pedal 325 being pressed down as a detection signal, a lever sensor 393 that detects the operation position of the shift lever 327 and generates an operation signal, and a rotation sensor 394 that detects the number of rotations of the engine power shaft Ex. It should be obvious a configuration may be adopted in which the various sensors and buttons are directly connected to the control units rather than via the vehicle state detection unit 9.

Figure 21:
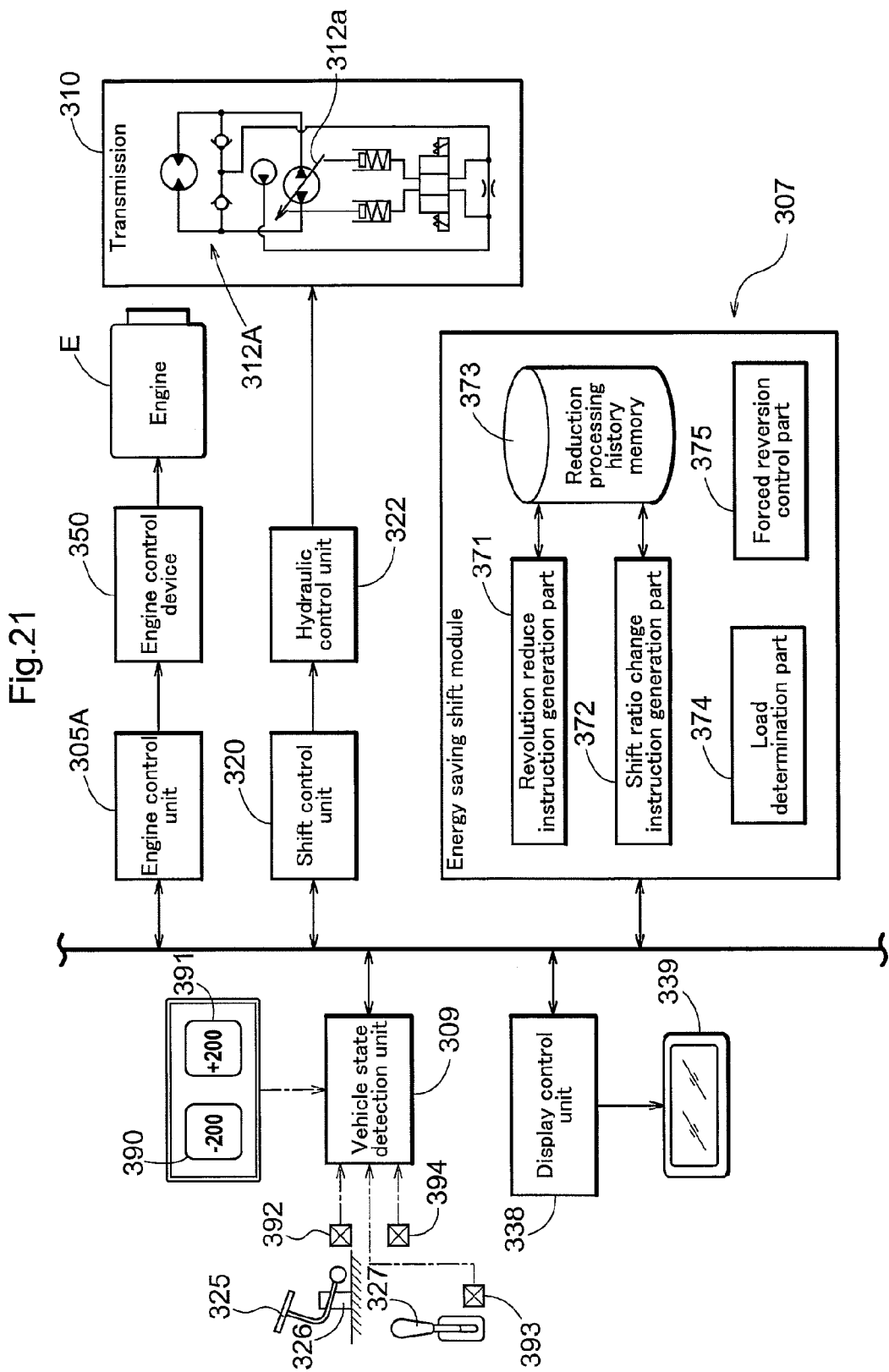
FIG. 21 is a functional block diagram of an energy saving shift module.

Hereafter, power control relating to the present invention will be described in more detail using FIGS. 20, 21 and 22.

The engine control unit 305A is a core functional part for performing electronic control of the engine E as is known well, and performs control that is based on a program set in advance and various types of engine control, such as constant revolution control and constant torque control, for example, according to the operational state of the engine E that is estimated using an external operation input signal, an internal sensor signal or the like.

The shift control unit 320 controls a hydraulic control element of the aforementioned transmission 310 based on an external operation input signal, an internal sensor signal or the like via the hydraulic control unit 322, sets the shift ratio of the transmission 310, and causes the tractor to travel at a desired speed. A display control unit 338 generates a control signal for displaying various types of notification information on the display 339 which consists of liquid crystal or the like and is provided in the driving operation area. In this embodiment, the display 339, as shown in FIG. 19, is arranged on the side panel in an area (on the right side) within reach of the driver's seat, adjacent to a switch panel consisting of the engine revolution reduction button 390 and the engine revolution reversion button 391, but can alternatively or additionally be incorporated into the front panel on which are arranged a speedometer, a tachometer and the like. In either case, various types of information on vehicle operations and the like are displayed on this display 339, with the following display events given as being related to the present invention.

(1) Display of the amount of engine revolution reduction is performed during execution of engine revolution reduction processing or engine revolution reduction processing described using FIG. 16.

(2) Illuminated display indicating performance of engine revolution reduction processing or engine revolution reduction processing is performed.

(3) Execution of assist control by the motor generator 304 is shown.

(4) The charge amount of the battery B is shown.

The energy saving shift module 307 is a control module that realizes temporary engine revolution reduction processing. The energy saving shift module 307 has the following two important functions.

(1) In this embodiment, a revolution reduction instruction for reducing engine revolutions by a prescribed amount for constant revolution control that is set in the engine control unit 305A is given to the engine control unit 305A, based on operation instructions sent out from operation devices that are operated by the driver, constituted as the engine revolution reduction button (hereinafter, reduction button) 390 and the engine revolution reversion button (hereinafter, reversion button) 391.

(2) An operation device that gives a shift ratio change instruction for requesting the shift control unit 320 to change the shift ratio so as to compensate for the reduction in engine revolutions resulting from the revolution reduction instruction that is based on operation of the reduction button 390 in order to maintain the speed of the vehicle during constant speed travel control is provided. In this embodiment, the reversion operation instruction is sent by operating the reversion button 391.

Note that, in a specific example of this embodiment, every time the reduction button 390 is operated, the number of engine revolutions drops by 200 rpm from a set number of revolutions NO that is set in order to implement constant speed travel control, and every time the reversion button 391 is operated, the reduction in engine revolutions and the change in the compensation shift ratio resulting from the previous reduction button operation are canceled so as to revert to the state before the previous reduction button operation.

Also, the number of times that the number of engine revolutions can be reduced by the reduction button 390 is preferably restricted to a prescribed number of times. For example, in this embodiment, assuming that the number of reductions is restricted to 4 times, the reduction in engine revolutions can thereby be restricted to 800 rpm. It should be obvious that preferably this restricted number of reductions can be set arbitrarily.

The energy saving shift module 307 is built by a computer that is capable of data exchange between the assist control module 306, the power management module 308 and the like, and the functions thereof are mainly created by a computer program. As shown in FIG. 21, the energy saving shift module 307, in order to realize these functions, includes a revolution reduction instruction generation part 371, a shift ratio change instruction generation part 372, a reduction processing history memory 373, a load determination part 374, and a forced reversion control part 375.

The revolution reduction instruction generation part 371 generates a revolution reduction instruction for reducing the current number of engine revolutions by 200 rpm based on an operation instruction resulting from the driver pressing the reduction button 390, and sends the revolution reduction instruction to the engine control unit 305A. At this time, the shift ratio change instruction generation part 372 derives a change value of the shift ratio for compensating for the reduction in engine revolutions, generates a shift ratio change instruction based on the derived change value, and sends this shift ratio change instruction to the shift control unit 320, such that the reduction in engine revolutions resulting from the revolution reduction instruction is not accompanied by a drop in vehicle speed. Although the engine control unit 308 controls the number of revolutions of the engine E using a basic number of engine revolutions set by the operation position of the accelerator lever 332 as a control target, this revolution reduction instruction is for reducing the basic number of engine revolutions, and, in this embodiment, is able to instruct a plurality of reductions in the number of revolutions, such as four reductions, for example. In other words, a reduction of 200 rpm from the basic number of engine revolutions is instructed with the first revolution reduction instruction, and a further reduction of 200 rpm, or in other words, a reduction of 400 rpm from the basic number of engine revolutions, is instructed with the second revolution reduction instruction. It should be obvious that a reduction in vehicle speed following the reduction in engine revolutions is compensated for each time by a shift ratio change instruction from the shift ratio change instruction generation part 372.

Furthermore, in the case where the driver presses the reversion button 391, a reversion operation instruction is given to the energy saving shift module 307, and the revolution reduction instruction generation part 371 sends a reversion instruction for cancelling one of the accumulated number of revolution reduction instructions set at that point in time to the engine control unit 308. Thus, in a state where the revolution reduction instruction has only been set once, the engine revolution reduction for that one time is canceled, and the target number of revolutions of the engine E in the engine control unit 308 will be the original basic number of engine revolutions. In the state where the revolution reduction instruction has been set twice, one engine revolution reduction is canceled, and the target number of revolutions of the engine E in the engine control unit 308 will be a number of revolutions that is 200 rpm less than the basic number of engine revolutions. If the reversion button 391 is pressed in a state where a reduction in engine revolutions resulting from a revolution reduction instruction has not been set, a revolution reduction instruction is not generated. The reversion button 391 only performs processing for cancelling a revolution reduction instruction. Naturally, in the case where the engine revolution reduction is corrected by a reversion operation instruction resulting from operation of the reversion button 391, an increase in vehicle speed following the correction is compensated for by a shift ratio change instruction from the shift ratio change instruction generation part 372, and a constant vehicle speed is maintained at the same time.

The number of times that the revolution reduction instruction has been set in the engine control unit 305A by the revolution reduction instruction generation part 371 thus needs to be recorded, with the reduction processing history memory 373 being provided for this reason. A memory structure such as a stack memory is suitable for the reduction processing history memory 373, and when the revolution reduction instruction has been generated, information relating to the reduction in revolutions is written (pushed) to the reduction processing history memory 373, and when the reversion instruction has been generated, information relating to the reduction in revolutions written most recently is read and deleted (popped). It should be obvious that a memory structure such as a history memory that records revolution reduction instructions and reversion operation instructions in time-series may also be employed. In either case, when the revolution reduction instruction has been sent to the engine control unit 305A by the revolution reduction instruction generation part 371, information on the 200-rpm engine revolution reduction resulting from one operation of the reduction button 90 is written to the reduction processing history memory 373 together with information on the shift ratio change when needed. The current operation history of the reduction button 390 and the amount of reduction in the number of engine revolutions currently instructed to the engine control unit 305A and the current shift ratio can then be known by accessing the reduction processing history memory 373.

The load determination part 374 has a function of determining whether engine load exceeds a prescribed level, and in the case where it is determined that engine load exceeds the prescribed level, a reversion instruction for cancelling the reduction in the target number of engine revolutions and the change in the compensation shift ratio that were set by the revolution reduction instruction is generated. For example, the load determination part 374 outputs a reversion operation instruction for canceling the reduction in engine revolutions and the change in compensation shift ratio performed earlier, in the case where it is determined that the engine load exceeds a prescribed level in the prohibition period in which the assist control by the assist control module 306 is prohibited.

Apart from engine load, the forced reversion control part 375 forcibly outputs a reversion operation instruction in the case where a prescribed cancellation condition set in advance is satisfied, and cancels reduction in the number of engine revolutions set in the engine control unit 305A and the change in the compensation shift ratio performed by the shift control unit 320. As for this cancellation condition, a typical condition is detection of a situation that does not require constant speed travel, such as the case where there is a switch from a work-travel mode in which constant speed travel is required to a open road travel mode in which it is necessary to travel while adjusting vehicle speed arbitrarily. Also, in the case where the ignition key is turned off and vehicle operation is ended, it is preferable to forcibly cancel any reduction in engine revolutions.

Note that when the basic number of engine revolutions is adjusted by operating an accelerator operation device, the number of engine revolutions is changed intentionally, but even at this time, a revolution reduction instruction is carried through. Energy saving driving can thereby be maintained, even when the accelerator operation device is operated frequently. Similarly, the shift ratio of the transmission 310 is also intentionally changed by the shift pedal 325 serving as a shift operation device, but even at this time the change in the number of engine revolutions following the change in the shift ratio and the subsequent reduction in the number of revolutions and setting of the compensation shift ratio following the reduction in the number of revolutions are carried out.

Figure 22:
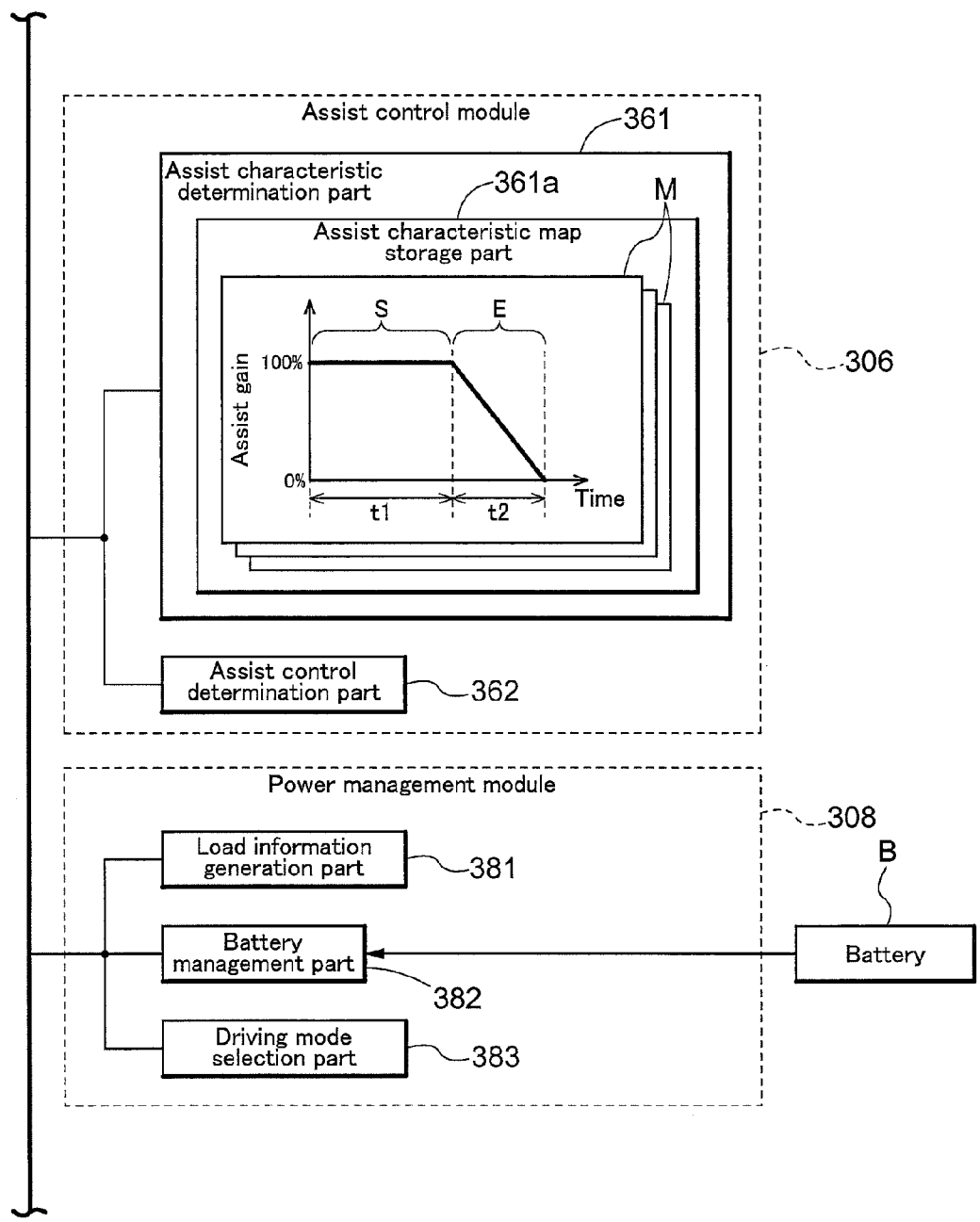
FIG. 22 is a functional block diagram of an assist control module.

As shown in FIG. 22, the assist characteristic determination part 361 and the assist control determination part 362 are provided in the assist control module 306 which provides assist by appropriately driving the motor generator 304 when the rotational load received by the engine E suddenly increases, in the case where engine revolutions are reduced in order to perform energy saving driving. This assist characteristic determination part 361 is provided with an assist characteristic map storage part 351a. This assist characteristic map storage part 361a has a function of creating and storing in advance a plurality of assist characteristic maps M obtained by mapping assist characteristics, or creating and setting an appropriate assist characteristic map M when needed. As schematically illustrated, these assist characteristics can be represented with a graph for determining the temporal assist amount. In the example in FIG. 22, the horizontal axis is time and the vertical axis is assist gain. The assist gain is a percentage of the maximum assist amount (motor torque) that is calculated according to the load amount read out from the load information, and takes a value between 0% and 100%. In other words, the amount of assist by the motor generator 304 is, in practice, derived by multiplying the maximum assist amount by the assist gain obtained from the assist characteristic map M. The assist characteristics in this embodiment consist of assist characteristic area S in which a constant assist amount is maintained for a prescribed time period and an end assist characteristic area E in which the assist amount is reduced to zero over time. A time period t1 of the start assist characteristic area S is from 1.5 to 2.5 seconds, and preferably 2 seconds, and a time period t2 of the end assist characteristic area E is from 1.5 to 2.5 seconds, and preferably 2 seconds. In the illustrated assist characteristic map M, the assist gain in the start assist characteristic area S is constant at 100%, and in the end assist characteristic area E is linear. It should be obvious that any given shape can be employed for the decreasing trend thereof. It is also possible to employ a nonlinear graph in both the start assist characteristic area S and the end assist characteristic area E. The assist characteristic determination part 361 determines the optimal assist characteristic map M from the load amount read out from the load information and the charge amount read out from the battery information. In the other assist characteristic maps M, the assist gain in the start assist characteristic area S takes a value in a range of about 10% to less than 100%, and in the end assist characteristic area E various assist characteristics that serve as decreasing functions are shown. In other words, the assist amount that is actually produced by the motor generator 304 varies each time depending on either the load amount or the charge amount or both of these amounts. Note that continuous execution of assist control that is based on these assist characteristics is prohibited by the assist control prohibition determination part 362. The execution interval of assist control, or in other words, the prohibition period, may be changed depending on the charge amount of the battery B or may be determined in advance depending on the capacity of the battery B. This prohibition period may also be varied depending on the type of work. In either case, the prohibition period is set so as to not bring about an abrupt drop in the battery charge amount.

The power management module 308 is provided with the load information generation part 381, the battery management part 382, and a driving mode selection part 383. The battery management part 382 calculates the charge amount based on charge information from the battery B, and outputs battery information including this charge amount. The driving mode selection part 383 sets a constant speed control mode that maintains a constant number of revolutions and is used when running the work vehicle at a prescribed speed (cruising) and when performing work with the work device W which is utilized to perform work by taking the rotational power of a constant number of revolutions off the PTO shaft W0. When this constant speed control mode has been set, the engine control unit 305A controls the engine control device 350 so as to maintain the engine E at a set prescribed number of revolutions.

Figure 23:
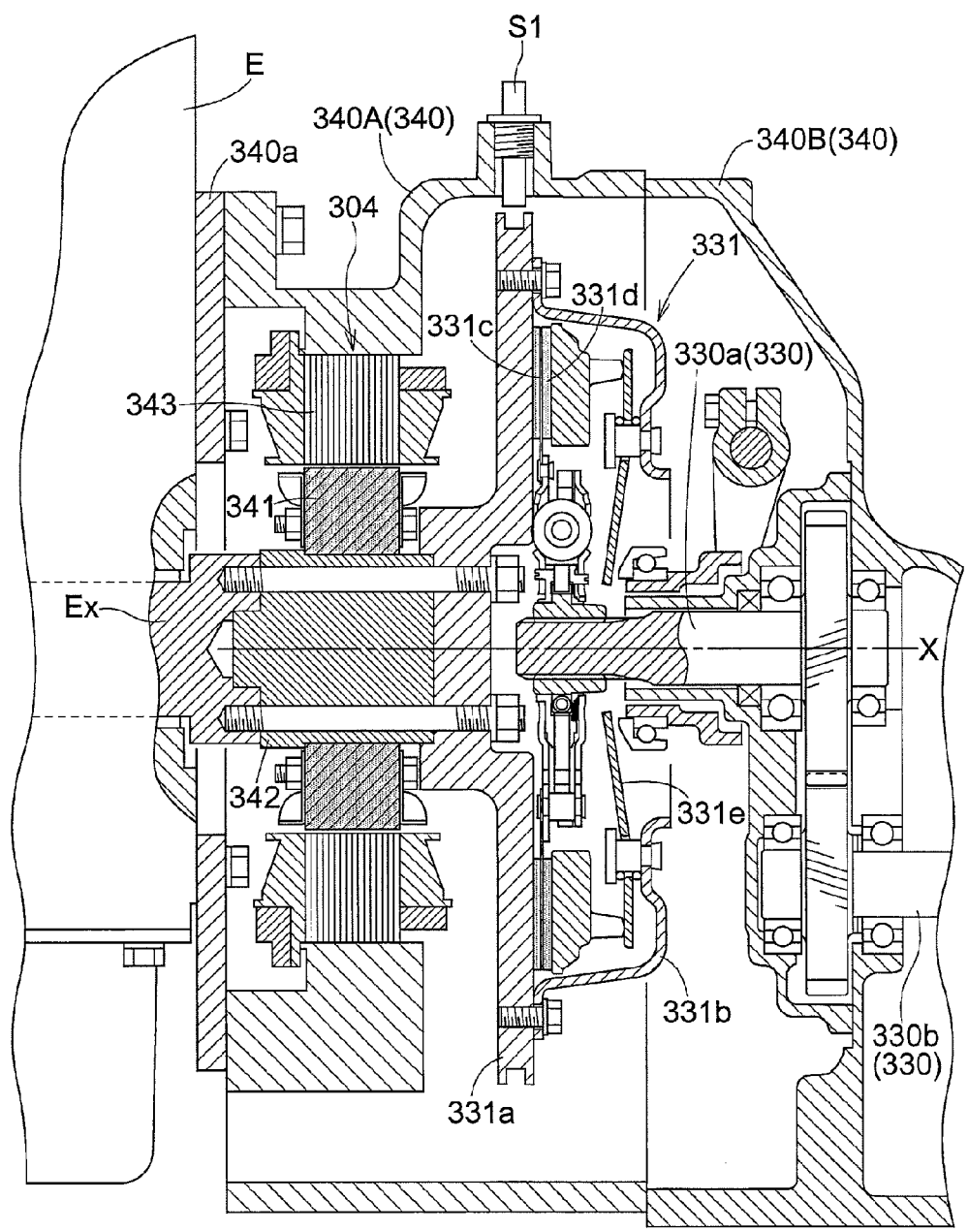
FIG. 23 is a cross-sectional view of a motor generator provided in the tractor.

As shown in FIG. 23, a motor housing 340 that houses the motor generator 304 and the main clutch 331 is provided on a rear surface side of the engine E. The motor generator 304 has both a function of a three-phase AC power generator that generates electric power using the drive power of the engine E, and a function of a three-phase AC motor that rotates using electric power supplied from outside. Accordingly, the inverter part 370 converts DC power from the battery B into three-phase AC power, and supplies the AC power to the motor generator 304. Also, the inverter part 370 converts three-phase alternating current generated by the motor generator 304 into direct current, boosts the DC voltage, and supplies the boosted DC voltage to the battery B.

As is clear from FIG. 23, the engine E, the motor generator 304 and the main clutch 331 are provided in this order, and the motor housing 340 is joined to a rear end plate 340*a* joined to a rear portion of the engine E, thereby housing the motor generator 304 and the main clutch 331 in the motor housing 340.

The motor generator 304 is constituted by a rotor 342 on an outer periphery of which is provided a permanent magnet 341, and a stator 343 arranged in a position surrounding the rotor 342, and the stator 343 has a structure in which a coil is wound around a plurality of teeth portions (not shown) of a stator core. The rotor 342 of the motor generator 304 is arranged facing a shaft end of an output shaft Ex (crankshaft) of the engine E, coaxially with a rotary shaft core X of this output shaft Ex, a base plate 331*a* of the main clutch 331 is arranged on the opposite surface of the rotor 342 to the output shaft Ex, and the output shaft Ex, the rotor 342 and the base plate 331*a* of the main clutch 331 are joined by being screwed together. This base plate 331*a* also functions as a flywheel, although, as described above, the motor generator 304 partially executes the function of producing inertia force performed by a flywheel, allowing weight saving to be realized over the conventional art.

The motor housing 340 has a structure in which a front portion housing 340A and a rear portion housing 340B are separably joined, and when assembling the motor generator 304, this front portion housing 340A is joined to the rear end plate 340*a* in a state where the stator 343 is provided on an inner surface of the front portion housing 340A, and the rotor 342 is then joined to a rear end of the output shaft Ex.

The main clutch 331 is provided with a clutch disc 331*c*, a pressure plate 331*d* and a diaphragm spring 331*e* inside a clutch cover 331*b* that is joined to a rear surface of the base plate 331*a*, and a clutch shaft 330*a* that is one component of the power transmission shaft 330 and to which drive power from the clutch disc 331*c* is conveyed, and is operated by a clutch pedal that is not illustrated.

The clutch shaft 330*a* is rotatably supported about the rotary shaft core X relative to the rear portion housing 340B, the clutch disc 331*c* is supported in a manner that enables transmission of torque to the clutch shaft 330*a* using a spline structure and displacement along the rotary shaft core X, and the diaphragm spring 331*e* has a configuration in which a biasing force in a clutch-on direction acts on the clutch disc 331*c* via the pressure plate 331*d*. Also, power from the clutch shaft 330*a* is conveyed to an intermediate transmission shaft 330*b* that is one component of the power transmission shaft 330 and serves as an input shaft of the transmission 310 via a gear transmission mechanism.

Given that the battery B installed in the tractor has limited capacity, and that torque assist during work travel demands considerable power consumption, the charge amount of the battery B soon runs out when assist control is repeatedly executed when performing work. In order to avoid this, assist by the motor generator 304 is executed while taking into account the charge amount of the battery B.

For this reason, in this embodiment, the assist control determination part 352 determines whether to permit or prohibit assist control, based on the load amount (engine load factor, amount of reduction in revolutions) included in the load information generated by the load information generation part 381 and the charge amount included in the battery information sent from the battery management part 382. An example of a determination map that is used at this time is shown in FIG. 8. What can be understood from this determination map is that essentially assist control will not be performed unless there is sufficient charge. For example, assuming that the assist determination line is a charge amount of about 80%, torque assist is not executed when the charge amount is at or below this line so as to avoid exhausting the battery B. However, because the possibility of engine stall arises if the engine load factor approaches 100%, assist control is permitted even at charge amounts of 80% or less. At this time, the assist determination line slopes from an engine load factor of 90% to 100%, that is, assist control is permitted the higher the engine load factor after a prescribed engine load factor (here, not less than approx. 90%) even in a state where the charge amount is low. At an engine load factor of 100%, assist control is permitted even if the charge amount is about 30%. In this determination map, the assist determination line is band-like in shape, and the area above the upper boundary line of the assist determination line is an assist drive area where assist control is permitted. The area below the lower boundary line of the assist determination line is a charge drive area. Furthermore, the assist determination band bounded by the upper boundary line and the lower boundary line of the assist determination line is a buffer area in which neither assist control nor charging is performed, and in this embodiment this buffer area is used as a zero torque drive area in which zero torque drive control is performed. Assistant control is prohibited in the charge drive area and the zero torque drive area.

Figure 24:
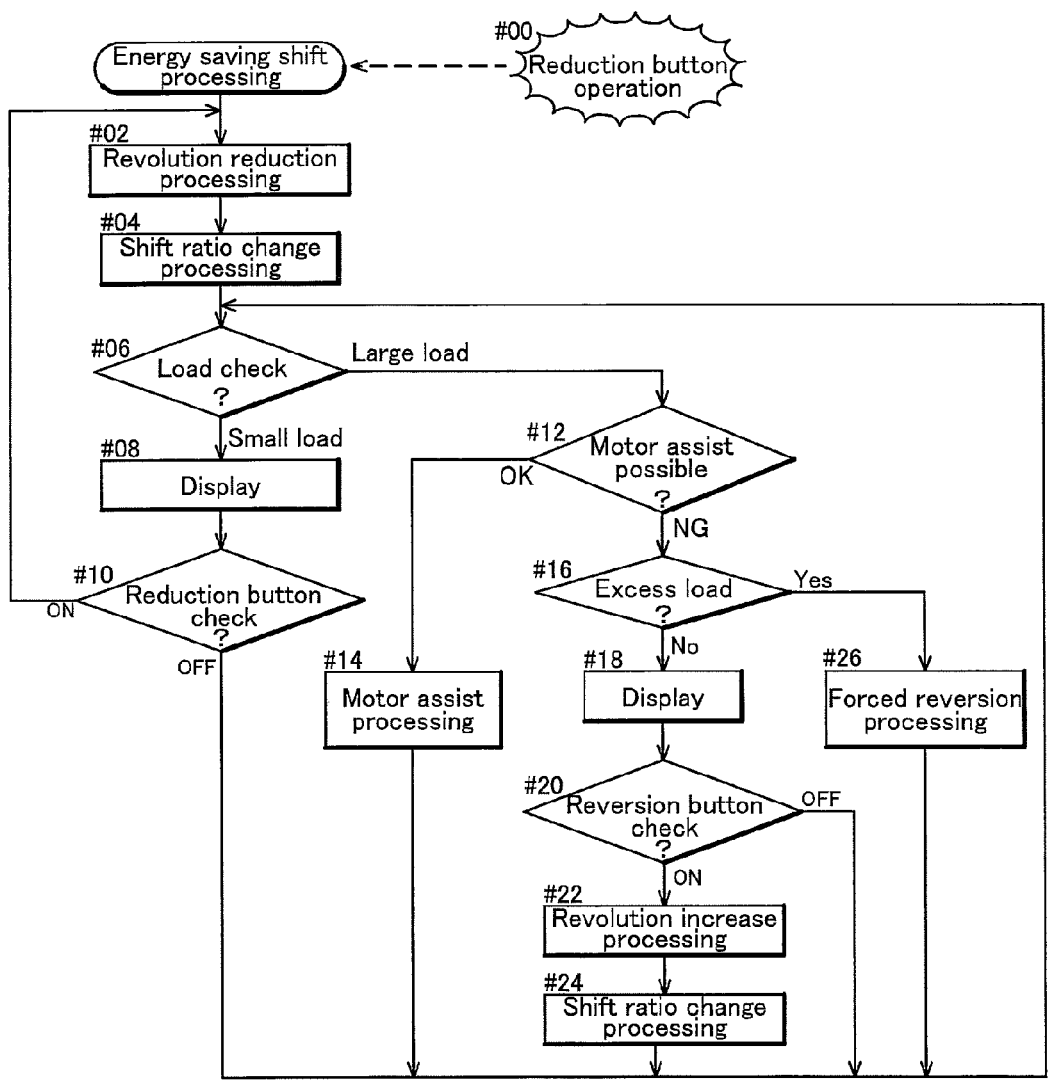
FIG. 24 is a flowchart showing an example of the basic flow of engine revolution reduction processing and motor assist processing at the time of energy saving driving.

The basic flow of energy saving shift processing, executed by abovementioned hybrid tractor, for bringing about energy saving driving will be described using the flowchart of FIG. 24. Energy saving shift processing includes both engine revolution reduction processing which is accompanied by shift ratio adjustment and motor assist processing.

If the driver feels that the engine E is not stressed when travelling at a constant vehicle speed while performing work, energy saving shift processing is started by operating the reduction button 390 in order to perform energy saving driving that reduces engine revolutions (#00). First, as described above, revolution reduction processing (#02) for reducing engine revolutions by a prescribed value, such as 200 rpm, for example, and shift ratio change processing (#04) for performing shift ratio adjustment to offset this reduction in revolutions are executed. Next, it is checked whether rotational load greater than or equal to a prescribed value is placed on the engine E following the reduction in revolutions (#06). When it is determined in this load check that the current rotational load is still acceptable ("small load" branch #06), this fact and the fact that engine revolution reduction for energy saving driving is being performed, such as the number of operations of the reduction button 390 and the subsequent reduced amount of revolutions, for example, are displayed on the display 339 (#08).

The driver is able to further operate the reduction button 390 if he or she feels that the engine E still not stressed, and is able to continue in this state if he or she feels that is appropriate. Accordingly, in this routine, it is checked whether the reduction button 390 has been operated (#10), and if operated ("ON" branch of #10), the processing returns to step #02 and revolution reduction processing and shift ratio change processing are executed again. If the reduction button 390 has not been operated (OFF branch of #10), the processing returns to step #06 and the rotational load check of the engine E is performed.

When it is determined in the load check of step #06 that a rotational load greater than or equal to the prescribed value is being placed on the engine E ("large load" branch of #06), it is first checked whether motor assist by the motor generator 304 is possible (#12). When motor assist is possible ("OK" branch of #12), motor assist processing such as described above, is executed, and motor assist according to the load amount is executed (#14). The processing then returns to step #06 and the rotational load is checked.

If in a motor assist prohibition time zone due to the interval from the previous motor assist being short, or if motor assist is not possible due to insufficient charge of the battery B ("NG" branch of #12), it is further checked whether the rotational load is high enough to soon cause the engine to stall or the like (#16). If the rotational load is not excessive ("No" branch of #16), the fact that rotational load is building though not critical is displayed on the display 339 (#18), and it is checked whether an operation for undoing the reduction in revolutions in order to eliminate this buildup of rotational load has been performed using the reversion button 391, that is, whether the reversion button 391 has been operated (#20). If the reversion button 391 has not been operated ("OFF" branch of #20), the processing returns to step #06 and the rotational load is checked. If the reversion button 391 has been operated ("ON" branch of #20), revolution increase processing (#22) and shift ratio change processing (#24) are performed in order to cancel the reduction in revolutions resulting from the previous pressing of the reduction button 390, as described above, and the processing returns to step #06.

If it is determined at step #16 that the rotational load is excessive ("Yes" branch of #16), forced reversion processing for forcibly undoing the reduction in revolutions resulting from pressing of the reduction button 390 is executed because of the rotational load being critical (#26). Accordingly, this forced reversion processing includes revolution increase processing and shift ratio change processing.

Note that this energy saving shift processing is intended to facilitate understanding of the description of the present invention, and, in practice, interrupt processing based on various operations arises frequently, meaning that control does not necessarily flow as shown in the flowchart.

Other Embodiments of the Third Embodiment (1) In the abovementioned embodiment, the number of engine revolutions or the number of transmission shaft rotations was utilized in order to detect the load acting on the engine E. However, a load detection sensor may be provided directly to the work device W, and whether to permit or prohibit assist control may be determined using the load detection signal from this sensor.

(2) In the above embodiment, the engine E and the motor generator 304 are directly joined, the main clutch 331 is mounted to the rear thereof, and power is transmitted to the power transmission shaft 330. However, the main clutch 331 may alternatively be mounted between the engine E and the motor generator 304.

(3) In the above embodiment, stepless shifting using the HMT 12 for the transmission 310 was employed, but multistep shifting using a multistep gear transmission may be employed.

(4) A configuration may be adopted in which individual assist characteristics respectively optimized for the type of work device W and the type of usage thereof may be created in advance as assist characteristics, and appropriately selected. For example, a work device type detection part for detecting the type of work device W that is mounted to the work vehicle or a manual work device type setting part is provided, and the type of work device W that is actually mounted for use is provided to the assist characteristic determination part 361 as an auxiliary parameter. The assist characteristic determination part 361 can thereby determine appropriate assist characteristics depending on the type of work device used.

Fourth Embodiment

Prior to specifically describing a fourth embodiment according to the present invention, a basic configuration characterizing the present invention will be described using FIG. 25.

This work vehicle is equipped with a motive power unit 401 that transmits power to wheels 402 serving as a travel device via power transmission means constituted by a transmission shaft, a transmission gear and the like. The motive power unit 401 includes an engine E that is an internal combustion engine. The power transmission means includes a transmission 410 that shifts rotational power output from the motive power unit 401. A hydraulic pump P for changing the supplied amount of operating oil depending on the number of revolutions of power output from the motive power unit. A work device W is mounted to the work vehicle so as to be liftable by a lift cylinder serving as an example of a hydraulically-driven device HD that is driven by operating oil supplied from hydraulic pump P. Power can be supplied to the work device W via a PTO (power take-off) shaft W1 that branches from the output shaft Ex of the motive power unit 401. A hydraulic operation implement T that operates the hydraulically-driven devices HD is also provided.

An engine control unit 405A that controls the engine E with a set number of engine revolutions, a shift control unit 403 that adjusts the shift ratio of the transmission 410, and a hydraulic management unit 405 are provided as a control system. A required operating oil amount calculation function, a revolution increase instruction generation function and a shift ratio change instruction generation function are substantively built into the hydraulic management unit 405 by a computer program. The required operating oil amount calculation function is a function of calculating the required amount of operating oil that the hydraulically-driven devices HD requires based on operation information for the hydraulically-driven devices HD. The revolution increase instruction generation function is a function of generating an engine revolution increase instruction for increasing the number of engine revolutions set by the engine control unit 405A, and giving the generated instruction to the engine control unit 405A, in the case where a shortage of operating oil to the hydraulically-driven devices HD is determined based on the required amount of operating oil that was calculated. The shift ratio change instruction generation function is a function of giving a shift ratio change instruction for changing the shift ratio to the shift control unit so as to offset the increase in engine revolutions resulting from the engine revolution increase instruction, in order to maintain work vehicle speed (hereinafter, travel speed of work vehicle; hereinafter, "vehicle speed").

For example, when operating a work device W such as a front loader device or tilling device and performing work, while running the work vehicle at a constant vehicle speed, the engine E driven at the lowest possible number of engine revolutions, in order to endeavor to implement energy saving driving. In this case, because the number of drive rotations of the hydraulic pump P is dependent on the number of engine revolutions, the drive rotations of the hydraulic pump P decrease when the number of engine revolutions decreases, and consequently the amount of operating oil supplied from the hydraulic pump P decreases. While there is no problem when the hydraulically-driven devices HD are not operating, or when they are operating but without requiring a large amount of operating oil, a shortage of the amount of operating oil occurs when the hydraulically-driven devices HD perform a large operation, possibly giving rise to a delay in the operation of the hydraulically-driven devices HD. For example, the amount of operating oil required by the hydraulically-driven devices HD so as to operate the work device can be estimated based on an operation input of an operation implement T that operates the hydraulically-driven devices HD, which is an example of operation information. In this case, when the operation implement T is operated when travelling while performing work, particularly at the time of energy saving driving, the amount of operating oil required by the hydraulically-driven devices HD that is targeted is calculated from operation information relating to the operation input thereof. Furthermore, in the case where the required amount of operating oil that was calculated cannot be supplied by the hydraulic pump P at the current number of engine revolutions, the number of engine revolutions is increased, enabling the hydraulic pump P to supply the required amount of operating oil. At the same time, the shift ratio is adjusted (usually increased), so as to offset the increase in engine revolutions, to a level that at least enables the acceleration of the work vehicle to be disregarded. Sudden acceleration due to increasing the engine revolutions is thereby suppressed. Also, even in the case of travelling while performing work that requires constant speed travel, constant speed travel is substantively maintained.

Operation information is sequentially checked, and a revolution reversion instruction that cancel the engine revolution increase instruction is given to the engine control unit 405A, in the case where a shortage of operating oil is eliminated even though engine revolutions have been reduced. This revolution reversion instruction may be divided into a plurality of instructions that gradually cancel the preceding increase in engine revolutions. At the same time, a shift ratio change instruction for changing the shift ratio so as to offset the reduction in engine revolutions resulting from the engine revolution reversion instruction in order to maintain work vehicle speed is given to the shift control unit 403. A sudden deceleration due to the number of engine revolutions being reduction is thereby suppressed. Also, even in the case of travelling while performing work that requires constant speed travel, constant speed travel is substantively maintained.

Figure 26:
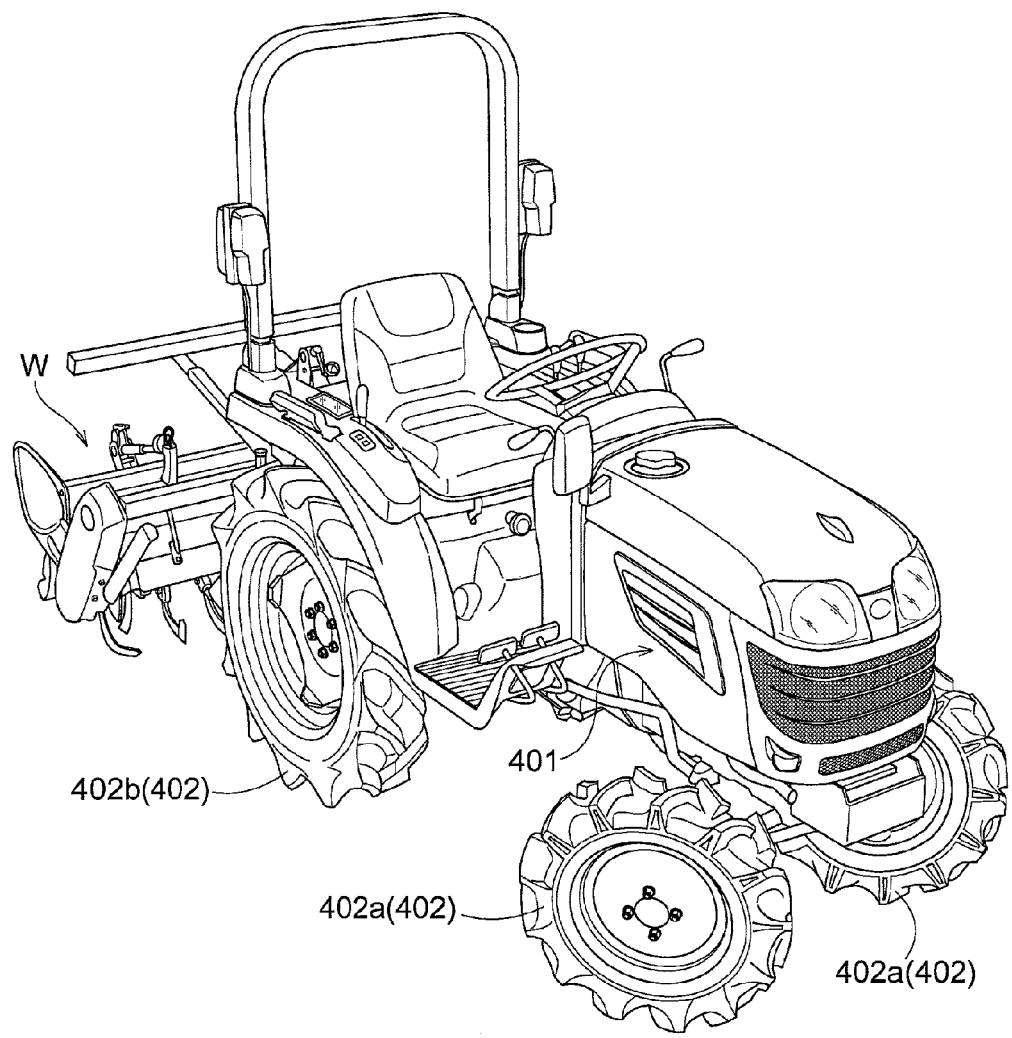
FIG. 26 is a perspective diagram of a tractor serving as one specific embodiment of the work vehicle according to the fourth embodiment of the present invention.
Figure 27:
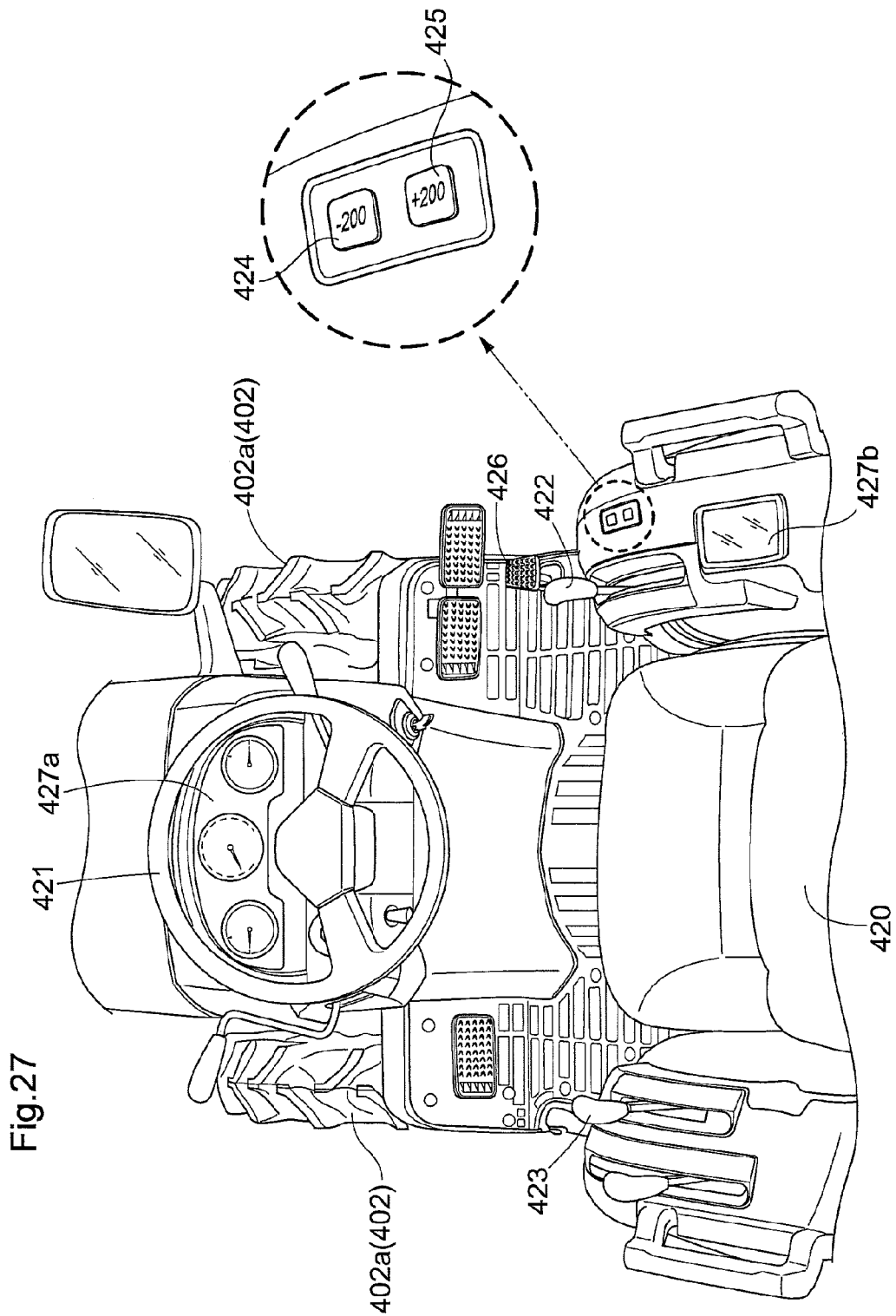
FIG. 27 is a bird's eye view of a steering area of a tractor.

Next, a specific fourth embodiment of the work vehicle according to the present invention will be described using drawings. Here, the work vehicle is a general-purpose tractor of well known form, FIG. 26 being a perspective diagram, and FIG. 27 being a bird's-eye view of a tractor steering area. This tractor is provided with the vehicle body that is supported on the ground by a left and right pair of front wheels 402a and rear wheel 402b, with the motive power unit 401 being arranged in a front portion of the vehicle body, and the steering area being arranged in a central portion thereof. A tilling device is mounted as the work device W in a rear portion of the vehicle body by a lift mechanism. Although only schematically shown by FIG. 28, this lift mechanism is operated by a hydraulic cylinder 101 that is one hydraulically-driven device HD. In the steering area shown in FIG. 27 is arranged a driver's seat 420 and a steering wheel 421 forward of the driver's seat 420. Operation levers and operation buttons that are operated by a driver seated in the driver's seat 420 are disposed around the steering wheel 421 and on both sides of the driver's seat 420. Operation levers and operation buttons particularly related to the present invention include a lift lever 422 serving as a hydraulic operation implement T for inputting an operation to the hydraulic cylinder 101 of the lift mechanism, a shift lever 423 for switching shift steps of a gear transmission 414, a reduction button 424 for reducing engine revolutions in order to implement energy saving driving, a reversion button 425 for undoing a reduction in engine revolutions, and a shift (shift control) pedal 426. An instrument panel 427a and a flat display 427b are also arranged in the steering area.

Figure 28:
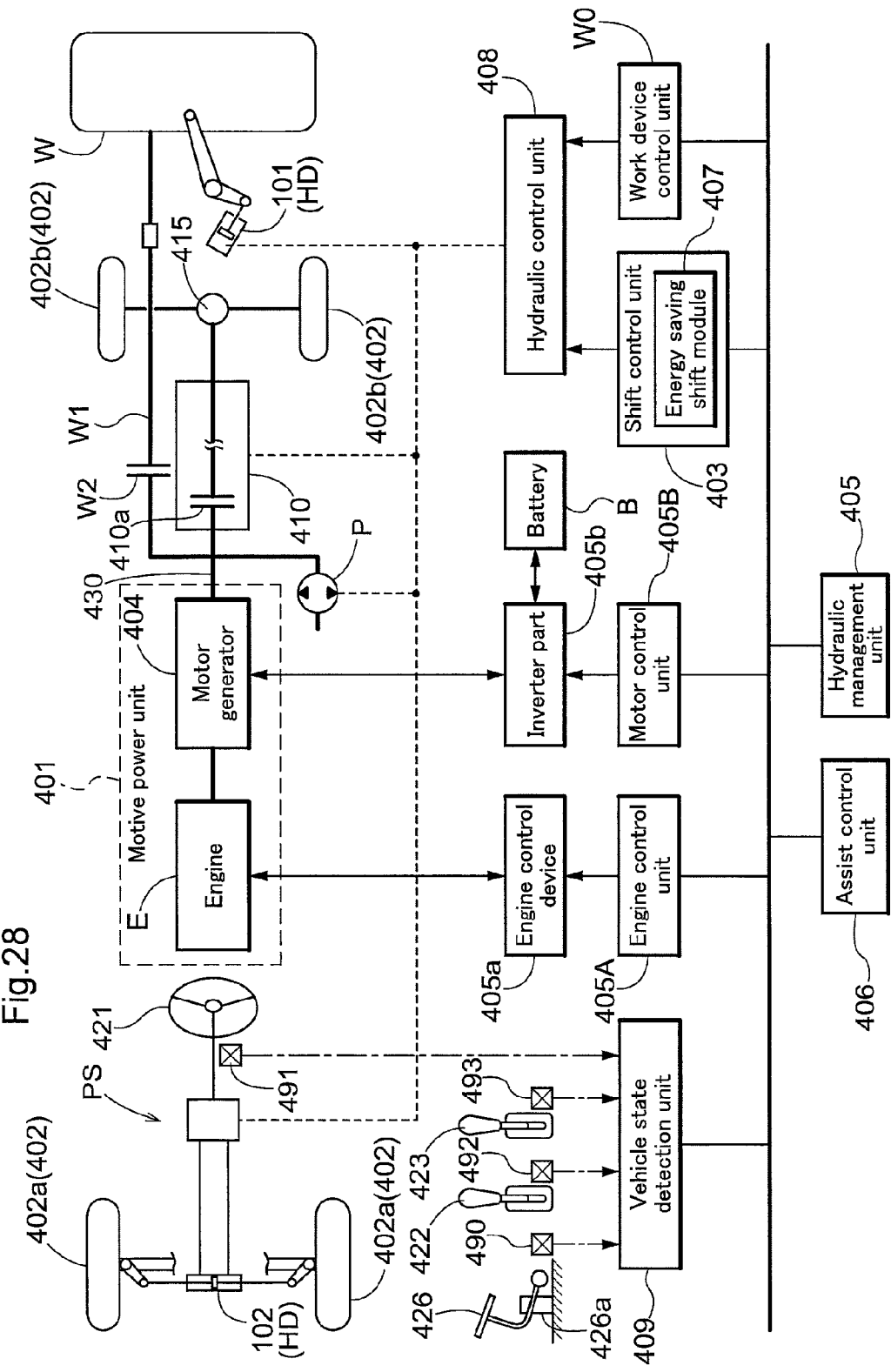
FIG. 28 is a power train diagram including a hydraulic operation system of the tractor.

Although schematically shown by FIG. 28, the front wheels 402a, which are used for steering, are operated by the steering wheel 421 via a hydraulic power steering device PS. This hydraulic power steering device PS performs hydraulic control of a power steering cylinder 102 serving as a hydraulically-driven device HD to steer the front wheels 402a, by adjusting the operating oil supplied from a hydraulic power source according to the amount of steering of the steering wheel 421. Accordingly, the steering wheel 421 functions as a hydraulic operation implement T in the present invention. For example, when the steering wheel 421 is rapidly turned hard, a large amount of operating oil is supplied to the power steering cylinder 102, and fast steering is realized.

Figure 29:
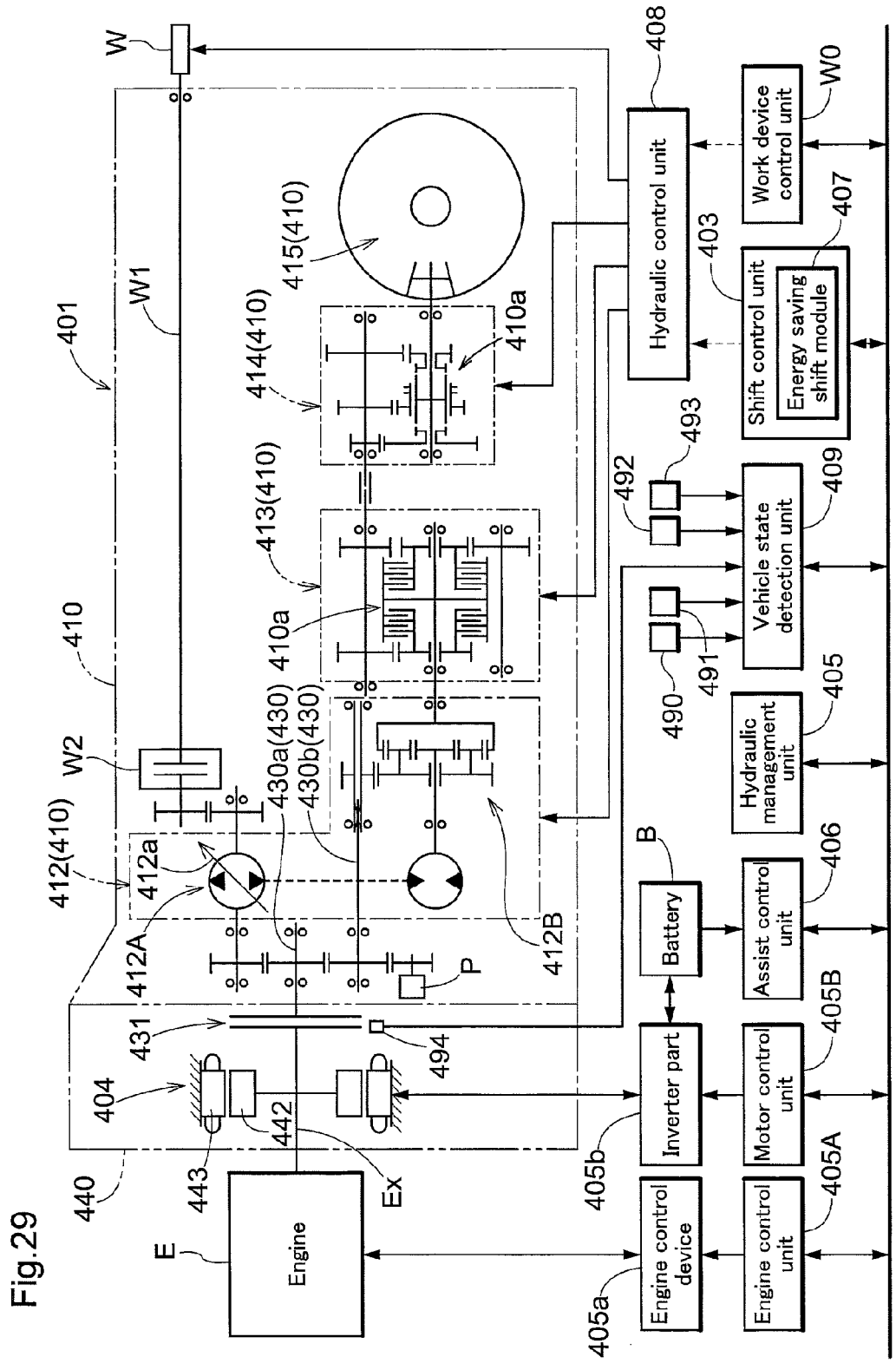
FIG. 29 is a power train diagram schematically showing a power train of the tractor.

This tractor is a hybrid vehicle in which the engine E and the motive power unit 404 are included in the motive power unit 401, as is clear from the power system diagram schematically shown in FIGS. 28 and 29. Note that the engine E here is a diesel engine whose revolutions are controlled with a common rail method, and a common rail control device is provided as the engine control device 405a. Also, the motive power unit 404 here is a motor generator 404 that also functions as a power generator for charging the battery B.

Figure 30:
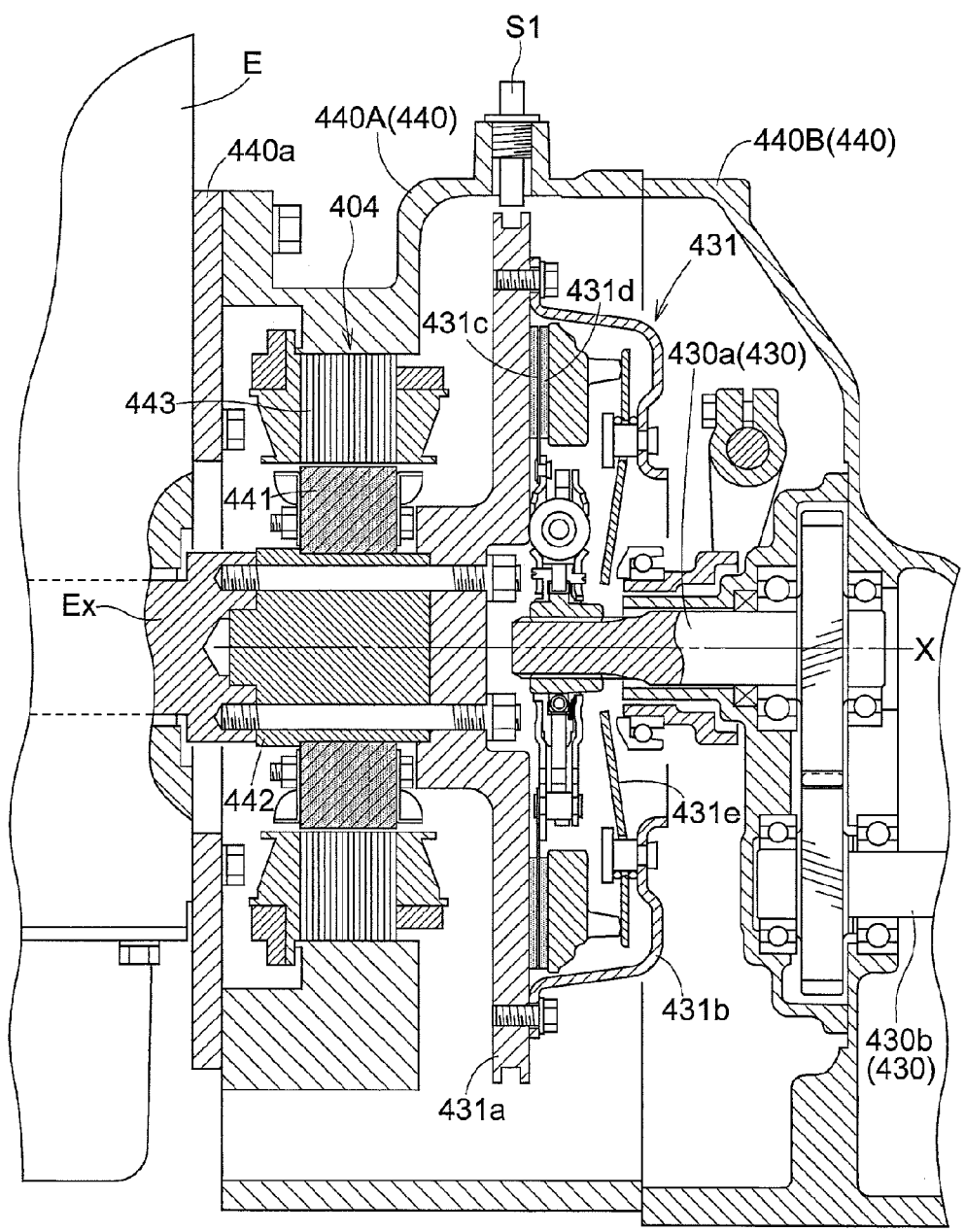
FIG. 30 is a cross-sectional view of a motor generator provided in the tractor.

As shown in FIG. 30, a motor housing 440 that houses the motor generator 404 and a main clutch 431 is provided on a rear surface side of the engine E. The motor generator 404 has both a function of a three-phase AC power generator that generates electric power using the drive power of the engine E, and a function of a three-phase AC motor that rotates using electric power supplied from outside. Accordingly, the inverter part 470 converts DC power from the battery B into three-phase AC power, and supplies the AC power to the motor generator 404. Also, the inverter part 470 converts three-phase alternating current generated by the motor generator 404 into direct current, boosts the DC voltage, and supplies the boosted DC voltage to the battery B.

As is clear from FIG. 30, the engine E, the motor generator 404 and the main clutch 431 are provided in this order, and the motor housing 440 is joined to a rear end plate 440a joined to a rear portion of the engine E, thereby housing the motor generator 404 and the main clutch 431 in the motor housing 440.

The motor generator 404 is constituted by a rotor 442 on an outer periphery of which is provided a permanent magnet 441, and a stator 443 arranged in a position surrounding the rotor 442, and the stator 443 has a structure in which a coil is wound around a plurality of teeth portions (not shown) of a stator core. The rotor 442 of the motor generator 404 is arranged facing a shaft end of an output shaft Ex (crankshaft) of the engine E, coaxially with a rotary shaft core X of this output shaft Ex, a base plate 431a of the main clutch 431 is arranged on the opposite surface of the rotor 442 to the output shaft Ex, and the output shaft Ex, the rotor 442 and the base plate 431a of the main clutch 431 are joined by being screwed together. This base plate 431a also functions as a flywheel, although, as described above, the motor generator 404 partially executes the function of producing inertia force performed by a flywheel, allowing weight saving to be realized over the conventional art.

The motor housing 440 has a structure in which a front portion housing 440A and a rear portion housing 440B are separably joined, and when assembling the motor generator 404, this front portion housing 440A is joined to the rear end plate 440a in a state where the stator 443 is provided on an inner surface of the front portion housing 440A, and the rotor 442 is then joined to a rear end of the output shaft Ex.

The main clutch 431 is provided with a clutch disc 431c, a pressure plate 431d and a diaphragm spring 431e inside a clutch cover 431b that is joined to a rear surface of the base plate 431a, and a clutch shaft 430a that is one component of the power transmission shaft 430 and to which drive power from the clutch disc 431c is conveyed, and is operated by a clutch pedal that is not illustrated.

The clutch shaft 430a is rotatably supported about the rotary shaft core X relative to the rear portion housing 440B, the clutch disc 431c is supported in a manner that enables transmission of torque to the clutch shaft 430a using a spline structure and displacement along the rotary shaft core X, and the diaphragm spring 431e has a configuration in which a biasing force in a clutch-on direction acts on the clutch disc 431c via the pressure plate 431d. Also, power from the clutch shaft 430a is conveyed to an intermediate transmission shaft 430b that is one component of the power transmission shaft 430 and serves as an input shaft of the transmission 410 via a gear transmission mechanism.

As is clear from FIG. 29, the transmission 410 includes a hydro-mechanical continuously variable transmission (hereinafter, HMT) 412, a forward-reverse switching device 413, a gear transmission 414 that performs multistep shifting (here, high speed steps for road travel and low speed steps for work travel), and a differential mechanism 415, and power therefrom is transmitted through the power transmission shaft 430 and ultimately rotates the drive wheels (front wheels 402a or rear wheels 402b, or both pairs of wheels) 402. The forward-reverse switching device 413 and the gear transmission 414 are each provided with a hydraulically-actuated shift clutch 410a. Furthermore, a tilling device W mounted to the tractor is able to receive rotational power through a PTO shaft W1 constituting a portion of the power transmission shaft 430 that transmits the rotational power of the engine E and the motor generator 4, and a tilling rotor is thereby rotationally driven at a prescribed tilling depth.

The HMT 412 is constituted by a hydrostatic shift mechanism 412A consisting of a swash plate type variable discharge hydraulic pump that receives power from the engine E and the motor generator 404 and a hydraulic motor that is rotated by hydraulic power from the hydraulic pump and outputs power, and a planetary gear mechanism 412B. The planetary gear mechanism 412B is constituted so as to supply shift output thereof to the downstream power transmission shaft 430, with power from the engine E and the motor generator 404 and power from the hydraulic motor as inputs.

With this hydrostatic transmission mechanism 412A, as a result of power from the engine E and the motor generator 404 being input to a pump shaft, pressurized oil is supplied from the hydraulic pump to the hydraulic motor and the hydraulic motor is rotationally driven by hydraulic power from the hydraulic pump to rotate a motor shaft. The rotation of the hydraulic motor is transmitted to the planetary gear mechanism 412B through the motor shaft. With the hydrostatic shift mechanism 412A, the angle of the swash plate 412a of the hydraulic pump is changed by displacing a cylinder that is interlocked with the swash plate 412a, resulting in shifting to a forward rotation state, a reverse rotation state and a neutral state located between the forward rotation state and the reverse rotation state, and even in the case where there has been a shift to the forward rotation state or a shift to the reverse rotation state, the rotation speed of the hydraulic pump and the revolution speed (revolutions per unit time) of the hydraulic motor are steplessly changed. As a result, the rotation speed of power that is output from the hydraulic motor to the planetary gear mechanism 412B is changed steplessly. The hydrostatic shift mechanism 412A stops rotation of the hydraulic motor caused by the hydraulic pump, as a result of the swash plate 412a being positioned in the neutral state, and consequently stops output from the hydraulic motor to the planetary gear mechanism 412B.

The planetary gear mechanism 412B is provided with a sun gear, three planetary gears arranged so as to be distributed at equal intervals around the sun gear, a carrier that rotatably supports each planetary gear, a ring gear that engages with the three planet gears, and an output shaft (one power transmission shaft 430) joined to the forward-reverse switching device 413. Note that, in this embodiment, the carrier forms a gear portion that engages, on an outer periphery thereof, with an output gear attached to the power transmission shaft 430 on the engine E side, and is relatively rotatably supported by a boss portion of the sun gear.

As a result of the abovementioned configuration, the HMT 412 is able to steplessly shift transmission of power to the drive wheels, namely, the front wheels 402a or the rear wheels 402b or both pairs of wheels, by changing the angle of the swash plate 412a of the hydrostatic shift mechanism 412A. Control of the swash plate 412a is realized by hydraulic control of a hydraulic control unit 408 that operates based on control instructions from the shift control unit 403.

A hydraulic pump P serving as a hydraulic power source of hydraulically-actuated devices HD in the present invention is provided. This hydraulic pump P is a mechanical pump that receives rotational power from the power transmission shaft 430, and the number of rotations of the pump shaft thereof is dependent on the number of engine revolutions. In other words, the supplied amount of operating oil of the hydraulic pump P is dependent on the number of engine revolutions. The hydraulically-driven devices HD to which operating oil is supplied from this hydraulic pump P via the hydraulic control unit 408 constituted by a hydraulic control valve or the like are the lift cylinder 101, the power steering cylinder 102, and the clutch 411 of the transmission 410, as far as FIG. 28 or FIG. 29 are concerned. The hydraulic operation implement T for the lift cylinder 101 is the lift lever 422, and the hydraulic operation implement T for the power steering cylinder 102 is the steering wheel 421. Note that because various hydraulic cylinders and hydraulic motors are further provided depending on the work device W mounted to the tractor, the number of hydraulically-driven devices HD to which operating oil is supplied by the hydraulic pump P will also increase. The lift cylinder 101 and the power steering cylinder 102 are merely examples of hydraulically-driven devices HD to which operating oil is supplied by the hydraulic pump P.

Figure 31:
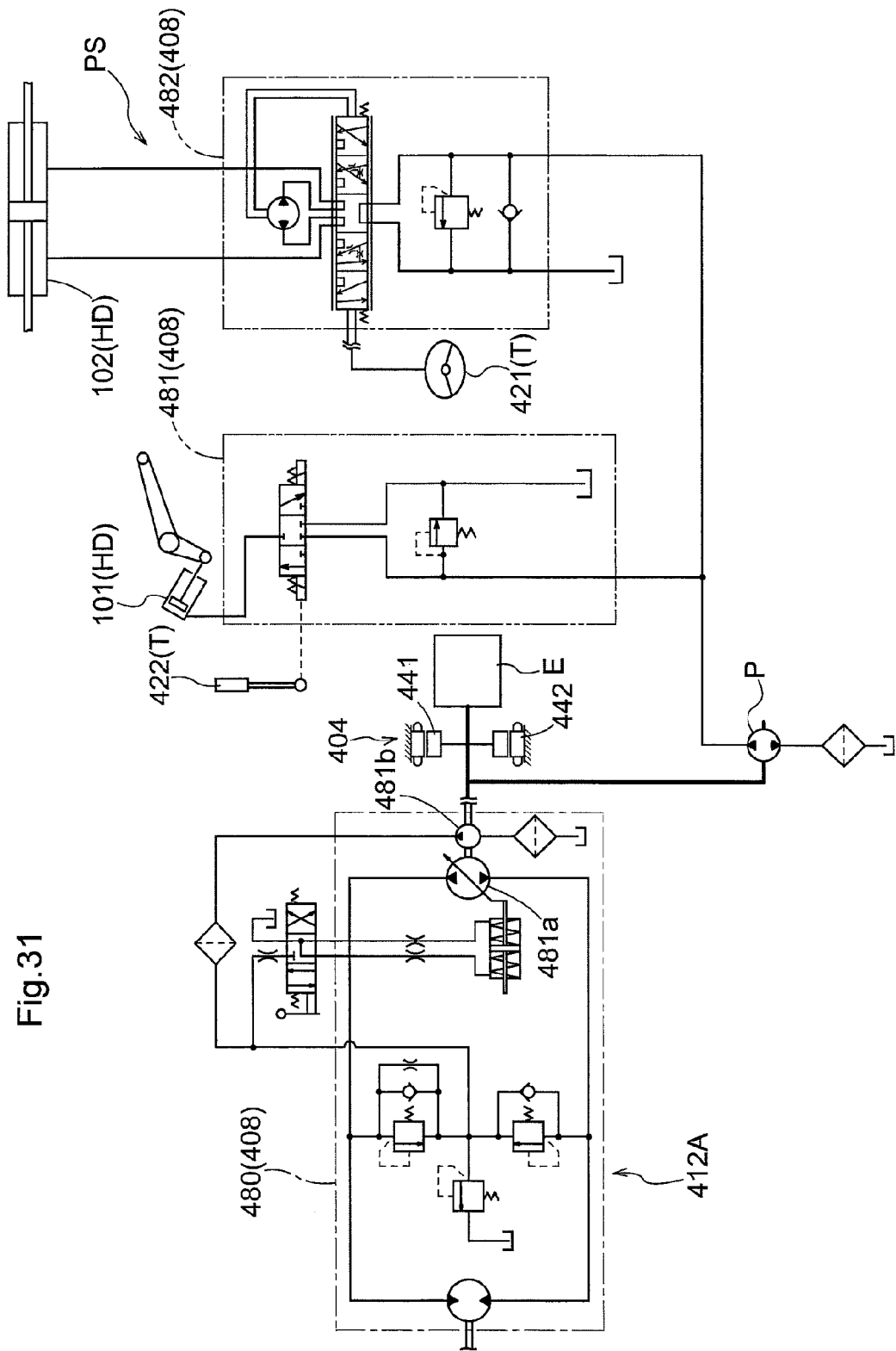
FIG. 31 is a hydraulic circuit diagram schematically showing the relationship between a hydraulic pump and hydraulically-actuated devices provided in the tractor.

FIG. 31 is a hydraulic circuit diagram schematically showing the relationship between the abovementioned hydraulic pump P, hydraulically-driven devices HD, and hydraulic operation implements T. A hydraulic circuit 480 of the hydrostatic transmission mechanism 412A that constitutes the HMT 412, a hydraulic circuit 480 of the lift cylinder (hydraulically-driven device HD) 101 that lifts the tilling device (work device) W up and down, and the power steering hydraulic circuit 482 of the hydraulic power steering device PS are shown in this hydraulic circuit, and other hydraulic circuits such as the main clutch 431 and the shift clutch 410a have been omitted. Note that the hydraulic circuit 480 of the hydrostatic transmission mechanism 412A is provided with a swash plate control type hydraulic pump 481a and a charge pump 481b that are driven by the power of the engine E and the motor generator 404 as a hydraulic power supply source. The forward and reverse rotation speed of the hydraulic motor that is rotated by the operating oil supplied from the hydraulic pump 481a is changed by adjusting the angle of the swash plate of the hydraulic pump using a swash plate adjustment mechanism including the swash plate control valve. In other words, the hydraulic circuit 480 of the hydrostatic transmission mechanism 412A has its own hydraulic pump 481a, and operating oil is not directly supplied by the hydraulic pump P.

The hydraulic system pump P is connected to the hydraulic circuit 481 of the lift cylinder 101 and the power steering hydraulic circuit 482 as a hydraulic power supply source. The amount of operating oil required by the hydraulic circuit 481 is determined by the operation behavior of the lift lever 422 serving as a hydraulic operation implement T. The operation behavior of the lift lever 422 is detected by a lift lever sensor 492. The amount of operating oil required by the power steering hydraulic circuit 482 is determined by the operation behavior of the steering wheel 421 serving as an hydraulic operation implement T. The operation behavior of the steering wheel 421 is detected by a steering sensor 491. The lift lever sensor 492 and the steering sensor 491 are connected to a vehicle state detection unit 409, and signals therefrom are transmitted to the required functional unit after undergoing required signal processing in the vehicle state detection unit 409. It should be obvious that the sensors may be connected to the functional unit directly rather than via the vehicle state detection unit 409. Note that a shift lever sensor 493 that detects the operation position of the shift lever 423 is also connected to the vehicle state detection unit 409.

As discussed in greater detail below, it is determined by the hydraulic management unit 405 whether the amount of operating oil required by the hydraulic circuit 481 of the lift cylinder 101 and the power steering hydraulic circuit 482 can be supplied by the hydraulic pump P. The hydraulic management unit 405, in the case where a supply shortage of operating oil arises, increases the number of engine revolutions to avoid the supply shortage of operating oil.

Next, an electronic control system for controlling the abovementioned power system will be described.

The electronic control system of the tractor, as shown in FIGS. 28 and 29, includes the engine control unit 405A, a motor control unit 405B, an assist control unit 406, the hydraulic management unit 405, the vehicle state detection unit 409, the shift control unit 403, and a work device control unit W0 for controlling operation of the tilling device (work device) W. These various control units, called ECUs, are connected by in-vehicle LAN so as to enable data communication. It should be obvious that although it is possible to freely integrate or further partition the various control units that are here formed in a partitioned configuration, the configuration in this embodiment gives priority to ease of understanding of the description given in the present invention, and this is not intended to limit the invention.

The engine control unit 405A is a core functional part for performing electronic control of the engine E as is known well, and performs control that is based on a program set in advance and various types of engine control, such as constant revolution control and constant torque control, for example, according to the operational state of the engine E that is estimated using an external operation input signal, an internal sensor signal or the like.

A control function for performing a shift operation on the transmission 410 based on a shift operation instruction given by a shift operation implement such as the shift change pedal 426 or a shift ratio change instruction from the hydraulic management unit 405 is built into the shift control unit 403. Furthermore, the shift control unit 403 changes the shift ratio by displacing the angle of the swash plate 412a of the HMT 412, based on a shift ratio increase instruction or a shift ratio change instruction from the hydraulic management unit 405. Shift control is possible with both an operation signal input by an intentional operation and an operation signal input generated mechanically. The shift change pedal 426, which functions as an intentional shift operation implement for performing a shift operation, is held in an arbitrary position by a position maintenance mechanism 426a in order to implement constant speed travel. The operation position of the shift change pedal 426 is detected by a pedal sensor 490. The pedal sensor 490 is also connected to the vehicle state detection unit 409.

Control of the motor generator 404, or in other words, assist control of the engine E, is performed by the assist control unit 406. In particular, this assist control is used in order to handle sudden increases in engine load (rotational load) that occur during energy saving driving in which the number of engine revolutions is reduced to the maximum extent possible. A sudden increase in rotational load that occurs during energy saving driving leads to a reduction in the revolutions of the engine E, or in other words, a drop in vehicle speed, and further leads to engine stall. Particularly in the case of a work vehicle that work travels at a constant vehicle speed, the engine E is frequently operated in the constant speed control mode, at which time situations arise where an abrupt load is placed on the power transmission means depending on work conditions and ground surface conditions, resulting in the revolutions of the engine E being reduced. A reduction in engine revolutions leads to a drop in vehicle speed and a shortage of drive power for the work device. In order to avoid this, the rotational load placed on the engine E and the power transmission means for transmitting engine power is detected, and the engine E is assisted by driving the motor generator 404 for a short time to at least partially compensate for the load.

In order to perform this assist control, the assist control unit 406 has a function of generating load information indicating the rotational load that is received by the engine E, based on input parameters that are taken from engine control information provided by the engine control unit 405A or from detection information output by various sensors. Exemplary input parameters that are used in order to generate load information include the number of revolutions (revolution speed) of the engine E, the number of rotations (rotation speed) of the power transmission shaft 430 constituting the transmission 410, engine torque calculated by the engine control unit 405A, the torque of the power transmission shaft 430, vehicle speed, and the work state of a work device W (tilling depth, traction, force acting on the loader, etc.), although the input parameters that are actually used depend on the sensors provided in the work vehicle. Because a vehicle speed sensor and a rotation detection sensor of the power transmission shaft 430 are highly likely to be provided as standard, it is advantageous to use a vehicle speed variation value and a rotation speed variation value of the power transmission shaft 430 as input parameters. These input parameters are sent through the vehicle state detection module unit that processes signals from various sensors. In order to detect a sudden increase in rotational load, information indicating the sudden increase in rotational load based on the differential value or difference value of temporal rotational loads may be used as load information. Alternatively, load information indicating an increase in rotational load that triggers assist control simply by threshold decision may be used as load information.

The assist control module 406 determines whether to execute assist control of the engine E using the motor generator 404, based on the load information. For example, in the case where the battery charge amount is a prescribed value or less, assist control is terminated or partially executed. Furthermore, execution of subsequent assist control is prohibited for a prescribed time period after assist control has been executed. Furthermore, the assist control module 406 determines the assist characteristics defining the assist amount and assist time period of assist control, based on the load information. Furthermore, the assist control module 406 outputs an assist control signal to a motor control unit 405B based on the determined assist characteristics. The motor control unit 405B outputs a motor control signal to an inverter part 405b based on the assist control signal, and controls the motor generator 404. Note that, apart from assist control, the motor control unit 405B is able to control the motor generator 404 to function as a generator and charge the battery B, by sending a power generation instruction to the inverter part 405b. Also, the motor generator 404 performs zero torque drive as a result of the motor control unit 405B sending a zero torque control signal to the inverter part 405b.

Figure 32:
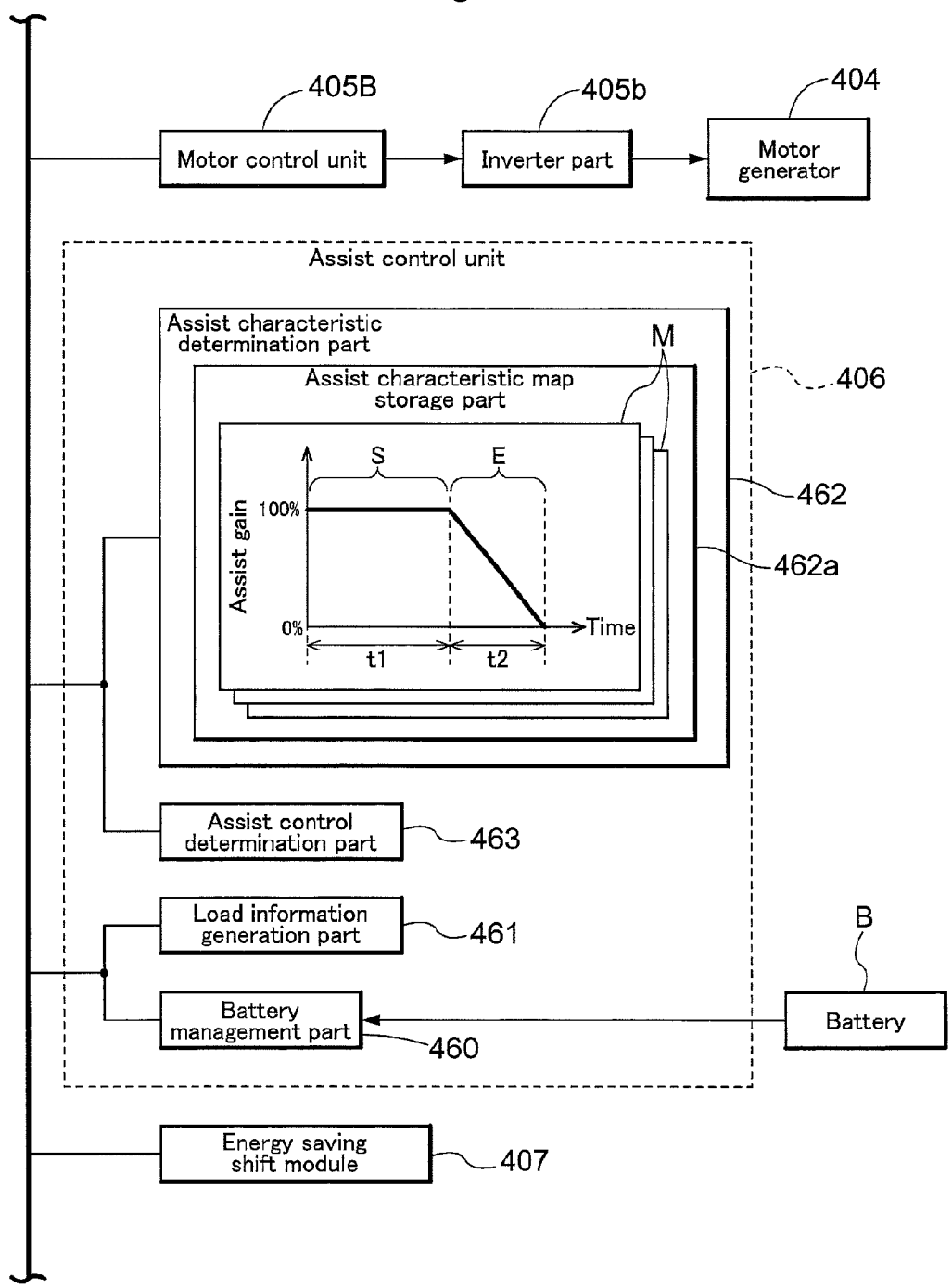
FIG. 32 is a functional block diagram of an assist control unit.

In order to achieve the abovementioned function, the battery management part 460, the load information generation part 461 that generates load information, the assist characteristic determination part 462 that includes the assist characteristic map storage part 462a, and the assist control determination part 463 are, as shown in FIG. 32, built into the assist control unit 406. The battery management part 460 calculates the charge amount based on charge information from the battery B, and outputs battery information including this charge amount.

The assist characteristic determination part 463 determines an appropriate assist characteristic W(t), based on a load amount L read out from the load information and a charge amount SC read out from the battery information. This assist characteristic is derived from the general equation $W(t)=\Gamma[L, SC]$. In other words, the assist characteristic can be represented with a graph for determining the temporal assist amount. In practice, as discussed below, a plurality of assist characteristics are mapped and stored, and an optimal assist characteristic is selected based on the load amount L and the charge amount SC. When the assist characteristic has been determined, the motor control unit 405B generates an assist control signal based on this assist characteristic, performs drive control of the motor generator 404 through the inverter part 405b, and compensates for the increase in load occurring on the engine E or the power transmission means. Because the electric motor has high torque responsiveness, a drop in revolutions is thereby avoided, even when a sudden increase in travel load or workload occurs. The case where the load increase is sustained or where the charge amount of the battery B is low will be handled by adjusting the shift ratio of an energy saving shift module 407.

The assist characteristic map storage part 462a has a function of creating and storing in advance a plurality of assist characteristic maps M obtained by mapping assist characteristics as described above, or creating and setting an appropriate assist characteristic map M when needed. As schematically illustrated, these assist characteristics can be represented with a graph for determining the temporal assist amount. In the example illustrated schematically in FIG. 32, the horizontal axis is time and the vertical axis is assist gain. The assist gain is a percentage of the maximum assist amount (motor torque) that is calculated according to the load amount read out from the load information, and takes a value between 0% and 100%. In other words, the amount of assist by the motor generator 404 is, in practice, derived by multiplying the maximum assist amount by the assist gain obtained from the assist characteristic map M. The assist characteristics in this embodiment consist of a start assist characteristic area S in which a constant assist amount is maintained for a prescribed time period and an end assist characteristic area E in which the assist amount is reduced to zero over time. A time period t1 of the start assist characteristic area S is from 1.5 to 2.5 seconds, and preferably 2 seconds, and a time period t2 of the end assist characteristic area E is from 1.5 to 2.5 seconds, and preferably 2 seconds. In the illustrated assist characteristic map M, the assist gain in the start assist characteristic area S is constant at 100%, and in the end assist characteristic area E is linear. It should be obvious that any given shape can be employed for the decreasing trend thereof. It is also possible to employ a nonlinear graph in both the start assist characteristic area S and the end assist characteristic area E. The assist characteristic calculation part 462 determines the optimal assist characteristic map M from the load amount read out from the load information and the charge amount read out from the battery information. In the other assist characteristic maps M, the assist gain in the start assist characteristic area S takes a value in a range of about 10% to less than 100%, and in the end assist characteristic area E various assist characteristics that serve as decreasing functions are shown. In other words, the assist amount that is actually produced by the motor generator 404 varies each time depending on either the load amount or the charge amount or both of these amounts. Note that continuous execution of assist control that is based on these assist characteristics is prohibited by the assist control determination part 463. The execution interval of assist control, or in other words, the prohibition period, may be changed depending on the charge amount of the battery B or may be determined in advance depending on the capacity of the battery B. This prohibition period may also be varied depending on the type of work. In either case, the prohibition period is set so as to not bring about an abrupt drop in the battery charge amount.

Figure 25:
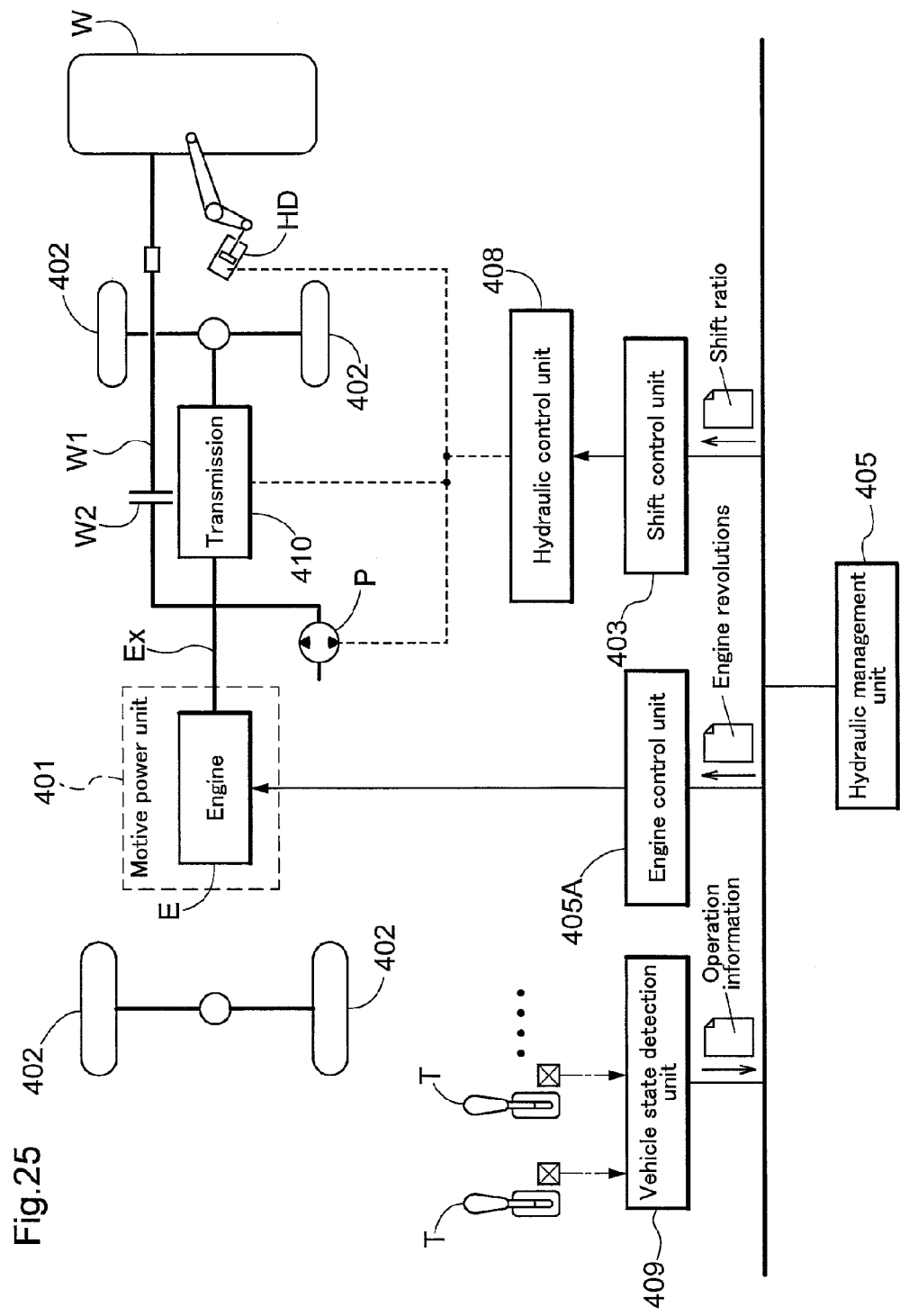
FIG. 25 is a schematic diagram illustrating the basic configuration of a work vehicle according to a fourth embodiment of the present invention.
Figure 33:
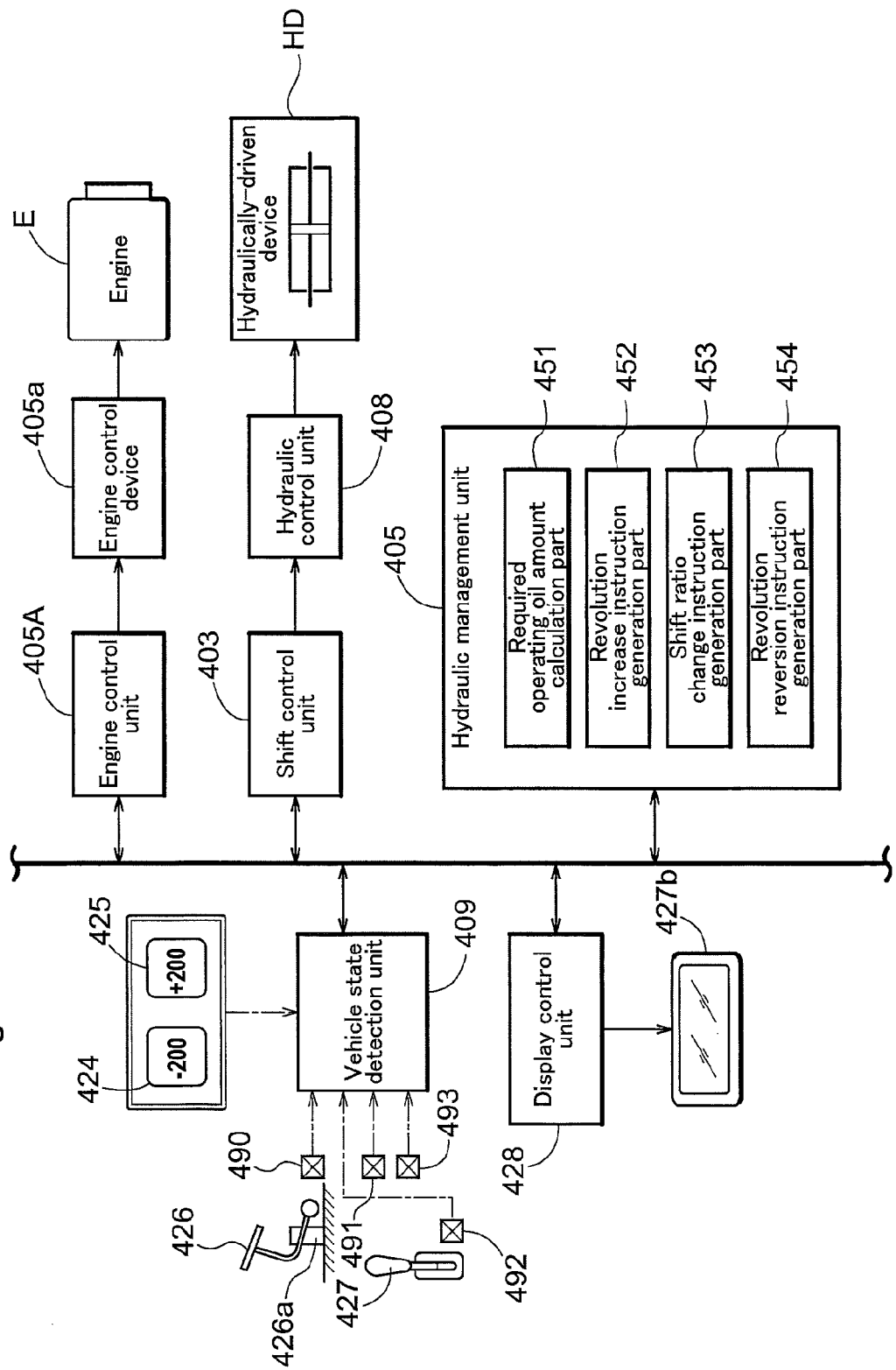
FIG. 33 is a functional block diagram of a hydraulic management unit.

The hydraulic management unit 405 in this embodiment is provided with a function of the hydraulic management unit 405 described using FIG. 25. Accordingly, a required operating oil amount calculation part 451, a revolution increase instruction generation part 452, a shift ratio change instruction generation part 453, and a revolution reversion instruction generation part 454 are, as shown in FIG. 33, built into the hydraulic management unit 405. The required operating oil amount calculation part 451 calculates the amount of operating oil required by the power steering cylinder 102 and the lift cylinder 101 based on operation information indicating the operation behavior of the steering wheel 421 and the operation behavior of the lift lever 422 sent from the vehicle state detection unit 409. The revolution increase instruction generation part 452 generates the an engine revolution increase instruction, in the case where it is determined that there is an operating oil shortage to the power steering cylinder 102 or the lift cylinder 101 based on the required amount of operating oil calculated by the required operating oil amount calculation part 451. The engine revolution increase instruction is an instruction for increasing the number of revolutions with respect to the current number of engine revolutions set by the engine control unit 405A. As for the value by which the number of revolutions is increased, a prescribed value, such as 200 rpm, for example, may be used, or a value derived through calculation or mapping each time may be used. The number of revolutions of the engine E increases as a result of the engine revolution increase instruction thus generated being given to the engine control unit 5A.

The revolution reversion instruction generation part 454 generates a revolution reversion instruction for cancelling the engine revolution increase instruction given previously, in the case where it is determined that operating oil shortage will not occur at the original number of engine revolutions even if an increase in engine revolutions according to an engine revolution increase instruction is not carried out. At this time, a revolution reversion instruction for reducing the increase in engine revolutions according to the engine revolution increase instruction given previously over a plurality of times. In either case, the number of revolutions of the engine E decreases as a result of this engine revolution increase instruction being given to the engine control unit 405A.

The shift ratio change instruction generation part 453 gives a shift ratio change instruction for changing the shift ratio change so as to offset the increase in engine revolutions resulting from the engine revolution increase instruction to the shift control unit 403, in order to maintain the speed of the tractor so as to avoid a sudden acceleration. The shift control unit 403 increases the shift ratio by adjusting the swash plate 412a of the hydraulic pump of the hydrostatic transmission mechanism 412A via the hydraulic control unit 408, and thereby avoids an increase in vehicle speed following the increase in engine revolutions. With the same objective, the shift ratio change instruction generation part 453 gives a shift ratio change instruction for changing the shift ratio so as to offset the reduction in engine revolutions resulting from the engine revolution reversion instruction to the shift control unit 403. The shift control unit 403 reduces the shift ratio by adjusting the swash plate 412a via the hydraulic control unit 408, and thereby avoids a drop in vehicle speed following the reduction in engine revolutions.

The operating oil amount supply control function of the hydraulic management unit 405 is used at the time of work travel, and essentially is not required at the time of road travel. For this reason, it is advantageous to limit the operating oil amount supply control function of the hydraulic management unit 405 at the time of road travel. Thus, in this embodiment, the operation position of the shift lever 423 that switches the shift step of the gear transmission 414 provided with shift steps for road travel and shift steps for work is used. In other words, it is detected that the gear transmission 414 has switched to a shift step for road travel based on the signal from the shift lever sensor 493, at which time an increase in engine revolutions resulting from an engine revolution increase instruction is prohibited.

In this embodiment, the energy saving shift module 407 that realizes temporary engine revolution reduction processing based on an operation by the driver for energy saving driving and engine revolution reversion processing for cancelling this engine revolution reduction processing is built into the abovementioned shift control unit 403. Because this engine revolution reduction processing and engine revolution reversion processing are similar to the abovementioned processing for increasing engine revolutions resulting from an engine revolution increase instruction and processing for reducing engine revolutions resulting from an engine revolution reversion instruction, common construction can be advantageously implemented.

As shown in FIG. 34, the energy saving shift module 407, in order to realize these functions, includes a revolution reduction instruction generation part 471, a shift ratio change instruction generation part 472, a reduction processing history memory 473, a load determination part 474, and a forced reversion control part 475.

The revolution reduction instruction generation part 471 generates a revolution reduction instruction for reducing the current number of engine revolutions by 200 rpm based on an operation instruction resulting from the driver pressing the reduction button 390, and sends the revolution reduction instruction to the engine control unit 405A. At this time, the shift ratio change instruction generation part 472 derives a change value of the shift ratio for compensating for the reduction in engine revolutions, generates a shift ratio change instruction based on the derived change value, and sends this shift ratio change instruction to the hydraulic control unit 408, such that the reduction in engine revolutions resulting from the revolution reduction instruction is not accompanied by a drop in vehicle speed. Although the number of revolutions of the engine E is controlled using a basic number of engine revolutions set by the operation position of the accelerator lever 432 as a control target, this revolution reduction instruction is for reducing this basic number of engine revolutions, and, in this embodiment, is able to instruct a plurality of reductions in the number of revolutions, such as four reductions, for example. In other words, a reduction of 200 rpm from the basic number of engine revolutions is instructed with the first revolution reduction instruction, and a further reduction of 200 rpm, or in other words, a reduction of 400 rpm from the basic number of engine revolutions, is instructed with the second revolution reduction instruction. It should be obvious that a reduction in vehicle speed following the reduction in engine revolutions is compensated for by a shift ratio change instruction from the shift ratio change instruction generation part 472 each time.

Furthermore, in the case where the driver presses the reversion button 425, a reversion operation instruction is given to the energy saving shift module 407, and the revolution reduction instruction generation part 471 sends a reversion instruction for cancelling one of the accumulated number of revolution reduction instructions set at that point in time to the engine control unit 405A. Thus, in a state where the revolution reduction instruction has only been set once, the engine revolution reduction for that one time is canceled, and the target number of revolutions of the engine E in the engine control unit 405A will be the original basic number of engine revolutions. In the state where the revolution reduction instruction has been set twice, one engine revolution reduction is canceled, and the target number of revolutions of the engine E in the engine control unit 405A will be a number of revolutions that is 200 rpm less than the basic number of engine revolutions. If the reversion button 425 is pressed in a state where a reduction in engine revolutions resulting from a revolution reduction instruction has not been set, a revolution reduction instruction is not generated. The reversion button 425 only performs processing for cancelling a revolution reduction instruction. Naturally, in the case where the engine revolution reduction is corrected by a reversion operation instruction resulting from operation of the reversion button 425, an increase in vehicle speed following the correction is compensated for by a shift ratio change instruction from the shift ratio change instruction generation part 472, and a constant vehicle speed is maintained at the same time.

The number of times that the revolution reduction instruction has been set in the engine control unit 405A by the revolution reduction instruction generation part 471 thus needs to be recorded, with the reduction processing history memory 473 being provided for this reason. A memory structure such as a stack memory is suitable for the reduction processing history memory 473, and when the revolution reduction instruction has been generated, information relating to the reduction in revolutions is written (pushed) to the reduction processing history memory 473, and when the reversion instruction has been generated, information relating to the reduction in revolutions written most recently is read and deleted (popped). It should be obvious that a memory structure such as a history memory that records revolution reduction instructions and reversion operation instructions in time-series may also be employed. In either case, when the revolution reduction instruction has been sent to the engine control unit 405A by the revolution reduction instruction generation part 471, information on the 200-rpm engine revolution reduction resulting from one operation of the reduction button 424 is written to the reduction processing history memory 473 together with information on the shift ratio change when needed. The current operation history of the reduction button 424 and the amount of reduction in the number of engine revolutions currently instructed to the engine control unit 405A and the current shift ratio can then be known by accessing the reduction processing history memory 473.

The load determination part 474 has a function of determining whether engine load exceeds a prescribed level, and in the case where it is determined that engine load exceeds the prescribed level, a reversion instruction for cancelling the reduction in the target number of engine revolutions and the change in the compensation shift ratio that were set by the revolution reduction instruction is generated. For example, the load determination part 474 outputs a reversion operation instruction for canceling the reduction in engine revolutions and the change in compensation shift ratio performed earlier, in the case where it is determined that the engine load exceeds a prescribed level in the prohibition period in which the assist control by the assist control module 406 is prohibited.

Apart from engine load, the forced reversion control part 475 forcibly outputs a reversion operation instruction in the case where a prescribed cancellation condition set in advance is satisfied, and cancels reduction in the number of engine revolutions set in the engine control unit 405A and the change in the compensation shift ratio performed by the shift control unit 403. As for this cancellation condition, a typical condition is detection of a situation that does not require constant speed travel, such as the case where there is a switch from a work travel mode in which constant speed travel is required to a open road travel mode in which it is necessary to travel while arbitrarily adjusting vehicle speed. Also, in the case where the ignition key is turned off and vehicle operation is ended, it is preferable to forcibly cancel any reduction in engine revolutions.

Note that when the basic number of engine revolutions is adjusted by operating an accelerator operation device, the number of engine revolutions is changed intentionally, but even at this time, a revolution reduction instruction is carried through. Energy saving driving can thereby be maintained, even when the accelerator operation device is operated frequently. Similarly, the shift ratio of the transmission 410 is also intentionally changed by the shift pedal 426 serving as a shift operation device, but even at this time the change in the number of engine revolutions following the change in the shift ratio and the subsequent reduction in the number of revolutions and setting of the compensation shift ratio following the reduction in the number of revolutions are carried out.

Other Embodiments of the Fourth Embodiment (1) In the abovementioned embodiment, the motive power unit 401 is a hybrid type motive power unit constituted by the engine E and the motor generator 404, but may be constituted only by the engine E.

(2) In the abovementioned embodiment, stepless shifting using the HMT 412 for the transmission 410 was employed, but multistep shifting using a multistep gear transmission may be employed.

INDUSTRIAL APPLICABILITY

The present invention is applicable to various types of vehicle provided with an internal combustion engine. In addition to tractors, examples of such vehicles include agricultural work vehicles such as ride-on rice transplanters, lawnmowers and combine harvesters and construction vehicles such as front loaders.

REFERENCE SIGNS LIST

10 Transmission
30 Power transmission shaft
31 Clutch
4 Motor generator
40 Motor housing
5 Power management unit
50 Assistant control determination part
51 Load Information generation part
52 Motor Assist characteristic calculation part
52a Motor Assist characteristic map storage part
53 Motor Assistant control prohibition determination part
54 Battery management part
55 Driving mode selection part
6 Engine control unit
60 Engine control device (common rail)
7 Motor control unit
70 Inverter part
8 Shift control unit
80 Mechanical assist shift ratio calculation part
9 Working device
S Vehicle state detection unit
B Battery
E Internal combustion engine

The invention claimed is:

1. A vehicle comprising:
   a motive power unit that supplies power to a travel device via power transmission means and includes at least an engine;
   an engine control unit that sets a number of engine revolutions of the engine;
   a transmission provided to the power transmission means;
   a shift control unit that adjusts a shift ratio of the transmission;
   a hydraulic pump in which a supplied amount of operating oil changes depending on the number of revolutions of the power supplied from the motive power unit;
   a hydraulically-driven device that is driven with operating oil supplied from the hydraulic pump;
   a hydraulic operation implement that operates the hydraulically-driven device;
   a sensor that detects operation behavior of the hydraulic operation implement as operation information for the hydraulically-driven device;
   a required operating oil amount calculation part that calculates a required amount of operating oil required by the hydraulically-driven device based on the operation information for the hydraulically-driven device;
   a hydraulic management unit that determines whether supply shortage of operating oil for the hydraulically-driven device arises or not based on the supplied amount of operating oil that is obtained from the number of engine revolutions, and also based on the required amount of operating oil;
   a revolution increase instruction generation part that gives to the engine control unit an engine revolution increase instruction for increasing the number of engine revolutions set by the engine control unit, in a case where the hydraulic management unit determines that there is a shortage of the supplied amount of operating oil supplied to the hydraulically-driven device; and
   a shift ratio change instruction generation part that gives, to the shift control unit a shift ratio change instruction for changing the shift ratio in a case where the hydraulic management unit determines that there is a shortage of the supplied amount of operating oil, so as to offset the increase in engine revolutions resulting from the engine revolution increase instruction in order to maintain work vehicle speed.

2. The vehicle according to claim 1,
   wherein the required operating oil amount calculation part calculates the required amount of operating oil based on an operation input of the hydraulic operation implement included in the operation information.

3. The vehicle according to claim 1,
   wherein in a case where the operating oil supply shortage will be eliminated even if the number of engine revolutions is reduced, an engine revolution reversion instruction that cancels the engine revolution increase instruction is given to the engine control unit, and
   wherein a shift ratio change instruction for changing the shift ratio so as to offset the reduction in the number of engine revolutions resulting from the engine revolution reversion instruction in order to maintain work vehicle speed is given to the shift control unit.

4. The vehicle according to claim 1,
   wherein the transmission includes a continuously variable transmission, and
   wherein the engine revolution increase instruction and the engine revolution reversion instruction target the continuously variable transmission.

5. The vehicle according to claim 1,
   wherein the transmission includes a multistep transmission provided with a shift step for road travel and a shift step for work, and
   wherein in a case where the multistep transmission is in the shift step for road travel, an increase in engine revolutions resulting from the engine revolution increase instruction is prohibited.

6. The vehicle according to claim 1,
   wherein the motive power unit is provided with a motor unit that assists the engine.

* * * * *